US012562795B2

(12) United States Patent (10) Patent No.: US 12,562,795 B2

Su et al. (45) Date of Patent: Feb. 24, 2026

(54) METHOD AND APPARATUS FOR TRANSMITTING CSI REPORT

(71) Applicant: Telefonaktiebolaget LM Ericsson (publ), Stockholm (SE)

(72) Inventors: Ling Su, Beijing (CN); Zhipeng Lin, Jiangsu (CN); Ritesh Shreevastav, Upplands Väsby (SE); Robert Mark Harrison, Grapevine, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 374 days.

(21) Appl. No.: 18/018,289

(22) PCT Filed: Jul. 14, 2021

(86) PCT No.: PCT/CN2021/106292

§ 371 (c)(1),
(2) Date: Jan. 27, 2023

(87) PCT Pub. No.: WO2022/022286

PCT Pub. Date: Feb. 3, 2022

(65) Prior Publication Data

US 2023/0291451 A1 Sep. 14, 2023

(30) Foreign Application Priority Data

Jul. 31, 2020 (WO) ................ PCT/CN2020/106298

(51) Int. Cl.
*H04B 7/06* (2006.01)
*H04W 72/1268* (2023.01)
*H04W 72/21* (2023.01)

(52) U.S. Cl.
CPC ...... *H04B 7/0626* (2013.01); *H04W 72/1268* (2013.01); *H04W 72/21* (2023.01)

(58) Field of Classification Search
CPC ............ H04B 7/0626; H04W 72/1268; H04W 72/21; H04W 24/10; H04L 5/0012;
(Continued)

(56) References Cited

U.S. PATENT DOCUMENTS

2018/0324793 A1 11/2018 Kim et al.
2020/0028635 A1 1/2020 Lee et al.
(Continued)

FOREIGN PATENT DOCUMENTS

| EP | 3664348 A1 | 6/2020 |
| JP | 2017-506440 A | 3/2017 |
| WO | 2019154401 A1 | 8/2019 |
| WO | 2019194663 A1 | 10/2019 |
| WO | 2020145769 A1 | 7/2020 |
| WO | 2020026296 A1 | 8/2021 |

OTHER PUBLICATIONS

International Search Report and Written Opinion of the International Searching Authority, PCT/CN2021/106292, mailed Jan. 25, 2022, 23 pages.
(Continued)

*Primary Examiner* — Rina C Pancholi
(74) *Attorney, Agent, or Firm* — Sage Patent Group

(57) ABSTRACT

Embodiments of the present disclosure provide methods and apparatus for transmitting CSI report. For example, a first aspect of the present disclosure provides a method performed at a terminal device, including: transmitting a first CSI report; transmitting a second CSI report; wherein at least a portion of the second CSI report is obtained based on the first CSI report. For example, a second aspect of the present disclosure provides a method performed at a terminal device, including: transmitting a first CSI report; and transmitting, to a network node, a change indicator about whether at least a portion of the first CSI report changes. According to embodiments of the present disclosure, the
(Continued)

| CSI nominal repetition 1 | CSI nominal repetition 2 | CSI nominal repetition 3 | CSI nominal repetition 4 |
|---|---|---|---|

Slot n   Slot n+1   Slot n+2   Slot n+3

CSI repetition Type B without UL-SCH success rate of transmitting a CSI report may be improved and the payload for transmitting a CSI report may be reduced.

18 Claims, 33 Drawing Sheets

(58) Field of Classification Search
    CPC ....... H04L 5/0044; H04L 1/0027; H04L 1/08;
                H04L 1/1887; H04L 5/0053; H04L
                5/0055; H04L 5/0057; H04L 1/0026
    See application file for complete search history.

(56) References Cited

U.S. PATENT DOCUMENTS

| | | | |
|---|---|---|---|
| 2020/0029335 A1 | 1/2020 | Yang et al. | |
| 2020/0214006 A1* | 7/2020 | Choi | H04L 1/0006 |
| 2021/0112623 A1 | 4/2021 | Bae et al. | |
| 2021/0194556 A1* | 6/2021 | Ly | H04L 27/227 |
| 2021/0258966 A1* | 8/2021 | Yoshioka | H04L 1/1858 |
| 2021/0336726 A1 | 10/2021 | Takeda et al. | |
| 2022/0104224 A1 | 3/2022 | Choi et al. | |

OTHER PUBLICATIONS

International Preliminary Report on Patentability of the International Preliminary Examining Authority, PCT/CN2021/106292, mailed Oct. 18, 2022, 7 pages.
3GPP TS 38.214 v16.2.0; 3rd Generation Partnership Project; Technical Specification Group Radio Access Network; NR; Physical layer procedures for data (Release 16), 163 pages.
3GPP TS 38.213 v16.2.0; 3rd Generation Partnership Project; Technical Specification Group Radio Access Network; NR; Physical layer procedures for control (Release 16), 176 pages.
Office Action for Japanese Patent Application No. 2023-505787 dated Oct. 25, 2024, 3 pages.
Ericsson, "Remaining Issue of PUSCH Enhancements for NR URLLC," 3GPP TSG-RAN WG1 Meeting #100bis, online, Apr. 20-30, 2020, R1-2001786, 12 pages.
Office Action for Japanese Patent Application No. 2023-505787 dated Apr. 26, 2024, 5 pages.
Qualcomm Incorporated, "Remaining issues for multiplexing UCI on Pusch," 3GPP TSG RAN WG1 Meeting #92bis, Sanya, China, Apr. 16-20, 2018, R1-1804804, 10 pages.

* cited by examiner

CSI repetition Type A without UL-SCH

CSI repetition Type B without UL-SCH

Option 1

Multiplexing CSI repetition Type A with UL-SCH without repetition

Multiplexing CSI repetition Type A with UL-SCH repetition Type A, slot bitmap 1011

Multiplexing CSI repetition Type A with UL-SCH repetition Type B

Multiplexing CSI repetition Type B with UL-SCH

Multiplexing CSI repetition Type B with UL-SCH

Multiplexing CSI repetition Type B with UL-SCH repetition Type B

CSI repetition Type A with overlapping CG-PUSCH

METHOD AND APPARATUS FOR TRANSMITTING CSI REPORT

CROSS REFERENCE TO RELATED APPLICATIONS

This application is a 35 U.S.C. § 371 national stage application of PCT International Application No. PCT/CN2021/106292 filed on Jul. 14, 2021, which in turn claims foreign priority to International Patent Application No. PCT/CN2020/106298, filed on Jul. 31, 2020, the disclosures and content of which are incorporated by reference herein in their entirety.

TECHNICAL FIELD

The present disclosure relates generally to the technology of wireless communication, and in particular, to methods and apparatuses for transmitting CSI report.

BACKGROUND

This section introduces aspects that may facilitate better understanding of the present disclosure. Accordingly, the statements of this section are to be read in this light and are not to be understood as admissions about what is in the prior art or what is not in the prior art.

In the wireless communication system, a terminal device may transmit a channel state information, CSI, report to a network. The CSI report may carry measurement result generated by the terminal device about the transmission channel (e.g. specified transmission resources). Based on such CSI report, the network node may schedule the terminal device on transmission resources with better transmission quality for the terminal device.

Therefore, it is important to transmit the CSI report correctly and efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Improved methods and apparatuses for transmitting CSI report may be provided. Particularly, the success rate of transmitting a CSI report may be improved and the payload for transmitting a CSI report may be reduced.

A first aspect of the present disclosure provides a method performed at a terminal device, comprising: transmitting a first CSI report; transmitting a second CSI report; wherein at least a portion of the second CSI report is obtained based on the first CSI report.

In embodiments of the present disclosure, the second CSI report is a retransmission of the first CSI report; and the terminal device transmits the second CSI report, in response to a request from a network node.

In embodiments of the present disclosure, the request is indicated by a downlink control information, DCI, field.

In embodiments of the present disclosure, a first state of the DCI field indicates a retransmission of the first CSI report; and a second state of the DCI field indicates an initial transmission a third CSI report.

In embodiments of the present disclosure, the DCI field comprises a new data indicator, NDI.

In embodiments of the present disclosure, the DCI field indicates whether to retransmit all of the first CSI report, or a portion of the first CSI report.

In embodiments of the present disclosure, the portion of the first CSI report comprises at least one of: a wide band measurement result, a subband measurement result, a part 1, a part 2, or a specified measurement quantity of the first CSI report.

In embodiments of the present disclosure, the first CSI report is carried by at least one code block group, CBG; and the DCI field indicates whether each CBG of the at least one CBG is to be retransmitted.

In embodiments of the present disclosure, a number and/or a size of the at least one CBG is fixed, or configured through signalling, or associated to a type or a quantity of the first CSI report.

In embodiments of the present disclosure, when the first CSI report is transmitted together with uplink shared channel, UL-SCH, data, on a physical uplink shared channel, PUSCH, the DCI field comprises a first subfield to indicate whether to retransmit the first CSI report; and the DCI field further comprises a second subfield to indicate whether to retransmit the UL-SCH data.

In embodiments of the present disclosure, the request comprises code block group transmission information, CBGTI, for the retransmission of the first CSI report, and CBGTI for a retransmission of the UL-SCH data transmitted together with the first CSI report.

In embodiments of the present disclosure, the second CSI report is mapped to at least one layer of a PUSCH carrying the second CSI report; and the at least one layer of the PUSCH is predetermined, or configured by a network node.

In embodiments of the present disclosure, the second CSI report is transmitted within a first time duration after the first CSI report.

In embodiments of the present disclosure, a transmission parameter for retransmitting the first CSI report is predetermined, or configured by a network node through a radio resource control, RRC, signalling, or a DCI field; and the transmission parameter comprises at least one of a redundant version, or a frequency hopping.

In embodiments of the present disclosure, a hybrid automatic repeat request, HARQ, process is configured for the first CSI report and the second CSI report.

A second aspect of the present disclosure provides a method performed at a terminal device, comprising: transmitting a first CSI report; and transmitting, to a network node, a change indicator about whether at least a portion of the first CSI report changes.

In embodiments of the present disclosure, the method further comprises: receiving, from the network node, a request for the change indicator; the request for the change indicator is carried by a layer one signaling or an RRC signaling.

In embodiments of the present disclosure, the method further comprises: transmitting a second CSI report on uplink resources granted for the SR.

In embodiments of the present disclosure, transmitting the change indicator comprises: transmitting a scheduling request, SR, for a CSI report.

In embodiments of the present disclosure, the change indicator is multiplexed and transmitted together with a CSI report and/or UL-SCH data.

In embodiments of the present disclosure, the request for the change indicator is about at least one of: a wide band measurement result, a subband measurement result, a part 1, a part 2, or a specified measurement quantity of the first CSI report.

In embodiments of the present disclosure, a support of the SR indicating a CSI change is signaled in downlink control information or RRC signalling.

In embodiments of the present disclosure, the change indicator is valid within a second time duration after the first CSI report; and the second time duration is predetermined, or configured by an RRC signalling or a layer one signalling.

In embodiments of the present disclosure, the second time duration is equal to or less than a period configured for a periodic CSI report.

In embodiments of the present disclosure, the change indicator is carried on a physical uplink control channel, PUCCH, or a PUSCH with configured grant.

A third aspect of the present disclosure provides a method performed at a terminal device, comprising: transmitting a first CSI report; transmitting a second CSI report; wherein the second CSI report is a repetition of the first CSI report.

In embodiments of the present disclosure, the first CSI report and the second CSI report are transmitted on PUSCH, and without UL-SCH data.

In embodiments of the present disclosure, the first CSI report and the second CSI report are arranged to be transmitted in a first slot and a second slot respectively, while occupying the symbol positions with the same symbol indexes; or the first CSI report and the second CSI report are arranged to occupy continuous symbol positions.

In embodiments of the present disclosure, if transmission resources of at least one CSI report of the first CSI report and the second report cross over a slot border, or overlap with at least one symbol position invalid for CSI report, the at least one CSI report is omitted.

In embodiments of the present disclosure, if transmission resources of at least one CSI report of the first CSI report and the second report cross over a slot border, or overlap with at least one symbol position invalid for CSI report, the at least one symbol position of the transmission resources is omitted, and excluded from resources for the at least one CSI report.

In embodiments of the present disclosure, the at least one symbol position invalid for CSI report comprises at least one of: a downlink symbol, or an invalid symbol indicated by a DCI.

In embodiments of the present disclosure, the transmission resources of at least one CSI report is divided by the slot border, and/or the at least one symbol position invalid for CSI report, to at least one segment; and a segment of the at least one segment is omitted, if the segment is less than a predetermined number of symbols.

In embodiments of the present disclosure, a segment of the at least one segment is selected for carrying portions of the at least one CSI report, based on a priority sequence of the portions.

In embodiments of the present disclosure, the segment is selected based on a size of the segment, and/or a start time of transmission of the segment.

In embodiments of the present disclosure, the segment with a size at least enough for a part 1 of the at least one CSI report is selected; a segment with a size less than the part 1 is dropped; the selected segment carries the part 1; and the selected segment further carries portions of a part 2 of the at least one CSI report, based on a priority sequence of the portions of the part 2, if the selected segment has enough extra resources besides carrying the part 1.

In embodiments of the present disclosure, the method performed at the terminal device further comprises: receiving a configuration about at least one of: a number of repetitions of a CSI report; allocated transmission resources for at least one repetition of a CSI report; a frequency hopping manner of repetitions of a CSI report; a precoder cycling manner of repetitions of a CSI report; redundant versions, RV, of repetitions of a CSI report; physical priority indexes of repetitions of a CSI report; or a manner for processing a collision with invalid symbol positions.

In embodiments of the present disclosure, transmission resources of at least one CSI report of the first CSI report and the second report overlaps with a resource for one or more PUSCH transmissions for UL-SCH data, in a slot.

In embodiments of the present disclosure, the at least one CSI report comprises a complete CSI report; an PUSCH transmission of the one or more PUSCH transmissions comprises a complete PUSCH transmission or a segmented PUSCH transmission; the complete CSI report comprises a CSI report not divided by any of a slot border and a symbol position invalid for CSI report; the complete PUSCH transmission comprises a nominal PUSCH transmission and a segmented PUSCH transmission comprises one of multiple actual PUSCH transmissions segmented from a nominal PUSCH transmission.

In embodiments of the present disclosure, the at least one CSI report and the UL-SCH data are arranged simultaneously by a DCI; and the at least one CSI report has the same priority with the UL-SCH data.

In embodiments of the present disclosure, the at least one CSI report and the UL-SCH data are arranged by different DCI.

In embodiments of the present disclosure, the at least one CSI report is multiplexed with the one or more PUSCH transmissions, based on at least one of: a configuration via RRC, a configuration via DCI, a length of the at least one CSI report, or a size of the PUSCH transmission.

In embodiments of the present disclosure, the at least one CSI report is multiplexed with the one or more PUSCH transmissions further based on at least one of: a bitmap of the one or more PUSCH transmissions, or a redundant version of the one or more PUSCH transmissions; and each bit of the bitmap indicates whether a corresponding PUSCH transmission of the one or more PUSCH transmissions is allowed to be multiplexed.

In embodiments of the present disclosure, the at least one CSI report comprises one or more CSI report repetitions; the at least one CSI report is multiplexed with the PUSCH transmission further based on at least one of: a bitmap of the CSI report repetitions, or a redundant version of the CSI report repetitions; and each bit of the bitmap indicates whether a corresponding repetition of the CSI report repetitions is allowed to be multiplexed.

In embodiments of the present disclosure, the at least one CSI report is multiplexed with the one or more PUSCH transmissions in one or more slots further based on at least one of: a bitmap of the one or more slots; and each bit of the bitmap indicates whether the at least one CSI report is allowed to be multiplexed on one or more PUSCH transmissions in a corresponding slot of the one or more slots.

In embodiments of the present disclosure, the at least one CSI report is multiplexed with the PUSCH transmission after a timeline check is passed, if the at least one CSI report is an initial repetition; and a coding rate check is optional for the at least one CSI report to be multiplexed with the PUSCH transmission.

In embodiments of the present disclosure, the PUSCH transmission is divided to a plurality of segments around the at least one CSI report; and a segment of the PUSCH transmission with a start time aligning with the at least one CSI report is dropped, or is multiplexed with the at least one CSI report.

In embodiments of the present disclosure, the transmission resources of the at least one CSI report overlap with at least resources for a first PUSCH transmission for UL-SCH data and a second PUSCH transmission for UL-SCH data.

In embodiments of the present disclosure, one PUSCH transmission of the first PUSCH transmission and the second PUSCH transmission is selected for multiplexing with the at least one CSI report, based on at least one of: a time order, available resources, a redundant version of the one UL-SCH data, or a configuration via RRC or DCI.

In embodiments of the present disclosure, transmission resources of the first CSI report and transmission resources of the second CSI report overlap with a resource for the PUSCH transmission for UL-SCH data; and the first CSI report and the second CSI report are multiplexed with the PUSCH transmission.

In embodiments of the present disclosure, a part 1 of the first CSI report and a part 1 of the second CSI report are arranged together, and a part 2 of the first CSI report and a part 2 of the second CSI report are arranged together, in the PUSCH transmission.

In embodiments of the present disclosure, transmission resources of the first CSI report overlap with a resource for a first PUSCH transmission for UL-SCH data, and transmission resources of the second report overlap with a resource for a second PUSCH transmission for UL-SCH data; and the first CSI report is multiplexed with the first PUSCH transmission, and the second CSI report is multiplexed with the second PUSCH transmission.

In embodiments of the present disclosure, a first number of CSI report is allowed to be multiplexed with one PUSCH transmission; and a second number of CSI report is allowed to be multiplexed with PUSCH transmissions in one slot.

In embodiments of the present disclosure, the at least one CSI report comprises a segment, generated form dividing a CSI report by a slot border and/or a symbol position invalid for CSI report; and the at least one CSI report is dropped; or wherein a part 1 of the at least one CSI report is multiplexed with the PUSCH transmission, at least a portion of a part 2 of the at least one CSI report is dropped.

In embodiments of the present disclosure, the PUSCH transmission has a configured grant; and the at least one CSI report is dropped, if a priority of the at least CSI report is less than the PUSCH transmission.

In embodiments of the present disclosure, transmission resources of at least one CSI report of the first CSI report and the second report overlap with a resource for a PUCCH transmission.

In embodiments of the present disclosure, the at least one CSI report or the PUCCH transmission is dropped according to a priority order.

In embodiments of the present disclosure, at least a portion of the at least one CSI report is multiplexed with the PUCCH transmission; or the PUCCH transmission is multiplexed on a PUSCH, if the at least one CSI report is arranged on the PUSCH.

In embodiments of the present disclosure, the PUCCH transmission is for a scheduling request, or acknowledge information of hybrid automatic retransmission request, HARQ.

A fourth aspect of the present disclosure provides a method performed at a terminal device, comprising: transmitting at least one CSI report in a PUSCH transmission.

In embodiments of the present disclosure, the at least one CSI report is encoded together with an UL-SCH data in a medium access control protocol data unit, MAC PDU.

In embodiments of the present disclosure, the at least one CSI report repeats in a plurality of portions of the PUSCH transmission, or distributed in the plurality of portions of the PUSCH transmission.

In embodiments of the present disclosure, the plurality of portions of the PUSCH transmission comprise: a plurality of segments, or a plurality of code block groups, CBG.

In embodiments of the present disclosure, the at least one CSI report comprises a nominal repetition, and/or an actual repetition.

A fifth aspect of the present disclosure provides a method performed at a terminal device, comprising: transmitting at least one CSI report as medium access control, MAC, information.

In embodiments of the present disclosure, the method further comprises: receiving a reporting configuration for the at least one CSI report about at least one of: a reference signal, a rank, a channel quality, a precoding matrix, a reference signal received power, a reference signal received quality, a timing advance, a power headroom, or a time for reporting; wherein the reporting configuration is included in a MAC control element, CE, or DCI, or RRC signalling.

In embodiments of the present disclosure, the MAC CE is a semi-persistent, SP, CSI reporting on PUCCH Activation/Deactivation MAC CE, extended with the reporting configuration and an extension indication about an existence of the reporting configuration.

In embodiments of the present disclosure, a priority of the at least one CSI report is higher than user plane data; and/or the priority of the at least one CSI report is determined based on a measurement result.

A sixth aspect of the present disclosure provides a method performed at a terminal device, comprising: transmitting an aperiodic CSI, A-CSI, report on PUCCH.

In embodiments of the present disclosure, if transmission resources of the A-CSI report overlap with transmission resources for another CSI report, the A-CSI report is dropped, or kept, or delayed, based on a priority order, and/or a content of the A-CSI report.

In embodiments of the present disclosure, the A-CSI report on PUCCH has a priority lower than a A-CSI report on PUSCH, and higher than a semi persistent CSI, SP CSI, on PUCCH, and a periodic CSI, P CSI, on PUCCH.

In embodiments of the present disclosure, a SP CSI on PUSCH has a priority lower than a A-CSI report on PUSCH, and higher than a SP CSI on PUCCH, and a P CSI on PUCCH; the A-CSI report on PUCCH has a priority higher than the SP CSI on PUSCH; or the A-CSI report on PUCCH has a priority lower than the SP CSI on PUSCH.

In embodiments of the present disclosure, if transmission resources of the A-CSI report overlap with a resource for a PUSCH transmission for UL-SCH data, the A-CSI report is dropped, or kept, or multiplexed with the PUSCH transmission, based on a priority order, and/or a content of the A-CSI report.

In embodiments of the present disclosure, the A-CSI report comprises at least one repetition.

In embodiments of the present disclosure, wherein the A-CSI report is transmitted in every PUCCH repetition, if the PUCCH repetition is configured.

In embodiments of the present disclosure, the A-CSI report with repetition has a same or different priority with an A-CSI report without repetition.

In embodiments of the present disclosure, if transmission resources of a repetition of the A-CSI report overlap with a resource for a PUSCH transmission for UL-SCH data, the repetition of the A-CSI report is dropped, or kept, or multiplexed with the PUSCH transmission, based on a priority order, and/or a content of the A-CSI report.

In embodiments of the present disclosure, a first bitmap is configured with each bit indicating whether a corresponding repetition of the A-CSI report is allowed to be dropped; and a second bitmap is configured with each bit indicating whether a corresponding repetition of the PUSCH transmission is allowed to be dropped, if the PUSCH transmission has at least one repetition.

A seventh aspect of the present disclosure provides a method performed at a terminal device, comprising: transmitting repetitions of control information on PUCCH; wherein the repetitions are configured via RRC signalling and activated by DCI.

In embodiments of the present disclosure, a configuration for the repetitions includes at least one of: an inter-repetition frequency hopping, an inter-slot frequency hopping, a number of repetitions, a frequency and time domain pattern, a gap in frequency domain and/or time domain between repetitions, or a transmitter chain.

In embodiments of the present disclosure, the repetitions are with PUCCH format 0, or PUCCH format 2.

In embodiments of the present disclosure, the control information comprises any of: a SR, acknowledge information of HARQ, P CSI, SP CSI, or A-CSI.

A eighth aspect of the present disclosure provides a method performed at a terminal device, comprising: transmitting control information on PUCCH; wherein transmission resources for the control information on the PUCCH are configured with larger than 16 physical resource blocks, PRB, or more than one slot; and/or wherein a plurality sets of PUCCH resources of the same format are concatenated for the control information; and/or wherein the control information is transmitted with a PUCCH format other than PUCCH format 0 to format 4.

A ninth aspect of the present disclosure provides a method performed at a network node, comprising: receiving a first CSI report; receiving a second CSI report; wherein at least a portion of the second CSI report is obtained based on the first CSI report.

A tenth aspect of the present disclosure provides a method performed at a network node, comprising: receiving a first CSI report; and receiving, from a terminal device, a change indicator about whether at least a portion of the first CSI report changes.

In embodiments of the present disclosure, the method further comprises: transmitting, to the terminal device, a request for the change indicator; wherein the request for the change indicator is carried by a layer one signaling or an RRC signaling.

In embodiments of the present disclosure, the method further comprises: receiving a second CSI report on uplink resources granted for the SR.

In embodiments of the present disclosure, receiving the change indicator comprises: receiving a scheduling request, SR, for a CSI report.

An eleventh aspect of the present disclosure provides a method performed at a network node, comprising: receiving a first CSI report; receiving a second CSI report; wherein the second CSI report is a repetition of the first CSI report.

A twelfth aspect of the present disclosure provides a method performed at a network node, comprising: receiving at least one CSI report in a PUSCH transmission.

A thirteenth aspect of the present disclosure provides a method performed at a network node, comprising: receiving at least one CSI report as medium access control, MAC, information.

A fourteenth aspect of the present disclosure provides a method performed at a network node, comprising: receiving an aperiodic CSI, A-CSI, report on PUCCH.

A fifteenth aspect of the present disclosure provides a method performed at a network node, comprising: receiving repetitions of control information on PUCCH; wherein the repetitions are configured via RRC signalling and activated by DCI.

A sixteenth aspect of the present disclosure provides a method performed at a network node, comprising: receiving control information on PUCCH; wherein transmission resources for the control information on the PUCCH are configured with larger than 16 physical resource blocks, PRB, or more than one slot; and/or wherein a plurality sets of PUCCH resources of the same format are concatenated for the control information; and/or wherein the control information is transmitted with a PUCCH format other than PUCCH format 0 to format 4.

A seventeenth aspect of the present disclosure provides a network node, comprising: a processor; and a memory, the memory containing instructions executable by the processor, whereby the terminal device is operative to perform the method according to any embodiments above described.

An eighteenth aspect of the present disclosure provides a terminal device, comprising: a processor; and a memory, the memory containing instructions executable by the processor, whereby the terminal device is operative to perform the method according to any embodiments above described.

A nineteenth aspect of the present disclosure provides a computer-readable storage medium storing instructions which when executed by at least one processor, cause the at least one processor to perform the method according to any embodiments above described.

Embodiments herein afford many advantages. For example, in embodiments herein, the success rate of transmitting a CSI report may be improved and the payload for transmitting a CSI report may be reduced. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
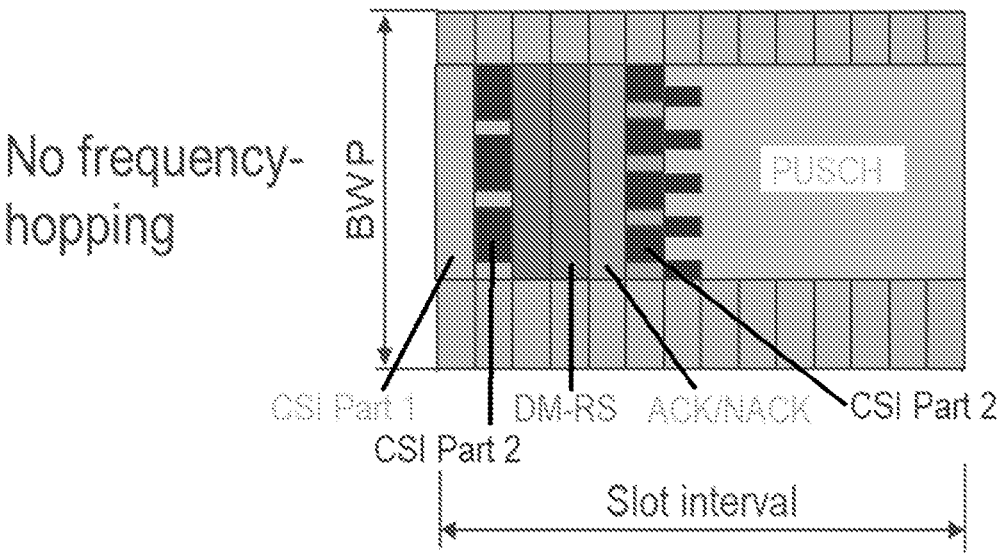
FIG. 1A shows an exemplary mapping manner for rate matched ACK/NACK.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise 5$^{th}$ generation (5G), new radio (NR), 4$^{th}$ generation (4G), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "network node" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms.

These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

In standards or specifications about the wireless communication system, several CSI reporting types and implementation details thereof are defined. For example, in new radio, NR, system (e.g., release 15 and release 16), the following types of CSI reporting are supported.

For Periodic CSI Reporting (P-CSI Reporting), CSI is reported periodically by the terminal device, such as any kind of user equipment, UE. Parameters such as periodicity and slot offset are configured semi-statically, by higher layer signaling from a network node, such as the gNB, to the UE.

For Aperiodic CSI Reporting (AP CSI Reporting), this type of CSI reporting involves a single-shot (i.e., one time) CSI report by the UE which is dynamically triggered by the gNB, e.g. by the downlink control information, DCI in physical downlink control channel, PDCCH. Some of the parameters related to the configuration of the aperiodic CSI report is semi-statically configured from the gNB to the UE but the triggering is dynamic.

For Semi-Persistent CSI Reporting (SP CSI Reporting), similar to periodic CSI reporting, semi-persistent CSI reporting has a periodicity and slot offset which may be semi-statically configured by the gNB to the UE. However, a dynamic trigger from gNB to UE may be needed to allow the UE to begin semi-persistent CSI reporting. In some cases, a dynamic trigger from gNB to UE may be needed to command the UE to stop the semi-persistent transmission of CSI reports.

Different types of CSI reporting can be sent on different channels. As summarized in below table, in NR Release-15, P-CSI is sent on PUCCH and A-CSI is sent on physical uplink shared channel, PUSCH.

| | Periodic | Semi-Persistent | Aperiodic |
|---|---|---|---|
| Type I WB | PUCCH Format 2, PUCCH Format 3, 4 | PUCCH Format 2 PUSCH | PUSCH |
| Type I SB | | PUCCH Format 3 or 4 PUSCH | PUSCH |
| Type II WB | | PUCCH Format 3 or 4 PUSCH | PUSCH |
| Type II SB | | PUSCH | PUSCH |
| Type II Part 1 only | | PUCCH Format 3 or 4 (UE capability) | |

For Type I and Type II CSI feedback on PUSCH, a CSI report comprises of two parts. Part 1 has a fixed payload size and is used to identify the number of information bits in Part 2. Part 1 shall be transmitted in its entirety before Part 2.

Part 1 and Part 2 can be constructed in two types (Type I and Type II) depending on the content.

Type I:

Part 1: RI/CRI, CQI for the $1^{st}$ CW; wherein RI refers to a rank indication, CRI refers to channel state information reference signal resource indication, CQI refers to channel quality indication, CW refers to Codeword;

Part 2: PMI, CQI for the $2^{nd}$ CW (when RI>4); wherein PMI refers to precoding matrix indication.

Type II:

Part 1 contains RI, CQI and indication of the number of non-zero wideband amplitude coefficients per layer. Fixed payload size is used for part 1.

Part 2 contains remaining PMI.

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'ssb-Index-RSRP' or 'cri-RI-LI-PMI-CQI'.

There are several principles of uplink control information UCI (such as a CSI) for mapping on PUSCH.

Figure 1B:
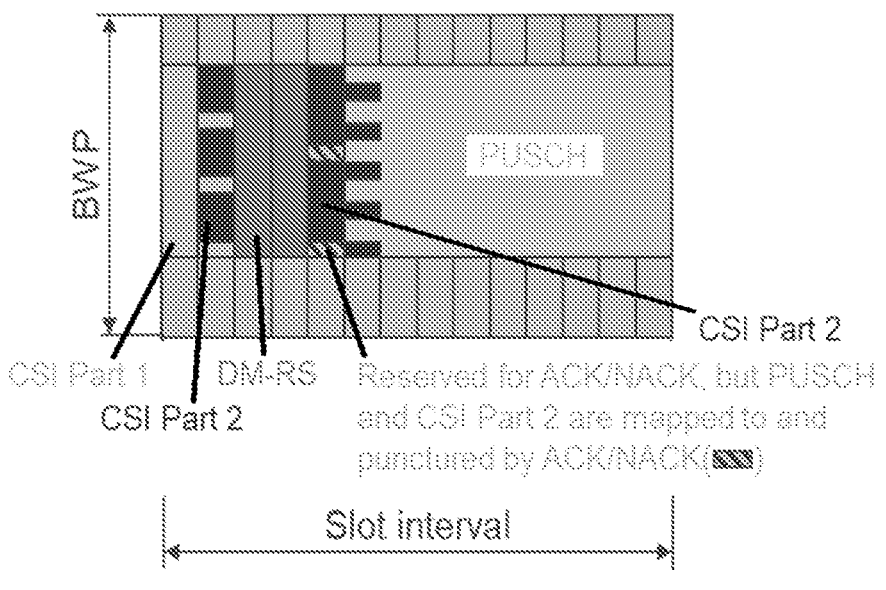
FIG. 1B shows an exemplary mapping manner for punctured ACK/NACK.

FIG. 1A shows an exemplary mapping manner for rate matched ACK/NACK; FIG. 1B shows an exemplary mapping manner for punctured ACK/NACK.

As to CSI Part 1, for rate matched acknowledge/non-acknowledge, ACK/NACK, CSI Part 1 is mapped from first available non-DM-RS (non-demodulation reference signal) symbol, and mapped around ACK/NACK resource elements, REs. For punctured ACK/NACK, CSI Part 1 is mapped from first available non-DM-RS symbol, mapping around those REs reserved for ACK/NACK puncturing (PUSCH and CSI Part 2 can be mapped on reserved resources, but will eventually be punctured).

As to CSI part 2, the CSI part 2 is mapped from first available non-DM-RS symbol, following CSI Part 1. For punctured ACK/NACK, CSI Part 2 can be mapped on resources reserved for ACK/NACK (and will then be punctured by ACK/NACK).

Such UCI is not frequency division multiplexed (FDMed) with DM-RS.

General frequency-domain mapping procedure for all UCI types may be configured. Symbol(s) is(are) filled up completely with modulations symbols of one UCI type (if enough UCI modulation symbols are available), followed by one symbol where remaining UCI modulation symbols of this type are mapped on a comb across PUSCH bandwidth.

Priority rules may be defined for CSI reports.

CSI reports are associated with a priority value $Pri_{iCSI}$(y, k, c, s)=2 $N_{cells} \cdot M_s \cdot y + N_{cells} \cdot M_s \cdot k + M_s \cdot c + s$; where Y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP, and k=1 for CSI reports not carrying L1-RSRP; L1-RSRP refers to layer 1 reference signal received power;

c is the serving cell index and $N_{cells}$ is the value of the higher layer parameter maxNrofServingCells;

s is the reportConfigID and $M_s$ is the value of the higher layer parameter maxNrofCSI-ReportConfigurations.

A first CSI report is said to have priority over second CSI report if the associated $Pri_{iCSI}$(y, k, c, s) value is lower for the first report than for the second report.

Two CSI reports are said to collide if the time occupancy of the physical channels scheduled to carry the CSI reports overlap in at least one Orthogonal Frequency Division Multiplexing (OFDM) symbol and are transmitted on the same carrier. When a UE is configured to transmit two colliding CSI reports, if y values are different between the two CSI reports, the following rules apply except for the case when one of they value is 2 and the other y value is 3 (for CSI reports transmitted on PUSCH, as described in Subclause 5.2.3 in "3GPP TS 38.213" version 16.2.0; for CSI reports transmitted on PUCCH, as described in Subclause 5.2.4 in "3GPP TS 38.213" version 16.2.0):

The CSI report with higher $Pri_{iCSI}$(y, k, c, s) value shall not be sent by the UE.

otherwise, the two CSI reports are multiplexed or either is dropped based on the priority values, as described in Subclause 9.2.5.2 in 3GPP TS 38.213 version 16.2.0. 3GPP TS refers to third generation partnership project technical specification.

Part of Chapter 5.2.4 of 3GPP TS 38.214 version 16.2.0 on P/SP CSI reporting using PUCCH is quoted below.

Periodic CSI reporting on PUCCH formats 2, 3, 4 supports Type I CSI with wideband granularity. Semi persistent CSI reporting on the PUCCH format 2 supports Type I CSI with wideband frequency granularity. Semi-persistent CSI reporting on PUCCH formats 3 or 4 supports Type I CSI with wideband and subband frequency granularities and Type II CSI Part 1.

As omission rules, A UE is not expected to report CSI with a total number of UCI bits and CRC bits larger than 115 bits when configured with PUCCH format 4. For CSI reports transmitted on a PUCCH, if all CSI reports consist of one part, the UE may omit a portion of CSI reports. Omission of CSI is according to the priority order determined from the Prii, CSI(y, k, c, s) value as defined in Subclause 5.2.5. CSI report is omitted beginning with the lowest priority level until the CSI report code rate is less or equal to the one configured by the higher layer parameter maxCodeRate.

If any of the CSI reports consist of two parts, the UE may omit a portion of Part 2 CSI. Omission of Part 2 CSI is according to the priority order shown in Table 5.2.3-1. Part 2 CSI is omitted beginning with the lowest priority level until the Part 2 CSI code rate is less or equal to the one configured by higher layer parameter maxCodeRate.

A-CSI on short PUCCH is discussed in 3GPP Release 15, and some agreements are achieved in meeting RAN1 #90b. However, in the meeting RAN1 #91, no concensus in RAN1 #91 on how to support A-CSI on short PUCCH in Rel-15. Thus, A-CSI on short PUCCH is not part of RAN1 specification for completion by December 2017.

It is provided that some principles may be implemented as follows.

For A-CSI on short PUCCH with single CSI report, downselect from the following alternatives. As alternative 1 (Alt 1), the CSI report is triggered with CSI request field in DL-related DCI. UE-specific or UE-group-specific DCI is to be discussed in control channel session. PUCCH resource indicator field in DL-related DCI indicates the PUCCH resource for the triggered CSI report from a set of higher-layer configured PUCCH resources. As alternative 2, UE-specific UL-related DCI, CSI request field are used to trigger a CSI report. It is indicated in the CSI Report Setting if PUCCH or PUSCH is used. As alternative 3, UE-specific UL-related DCI, indication is used on, if PUCCH or PUSCH is used is determined by bit in DCI.

In choosing the scheme(s) from Alt1, Alt2, and Alt3, consider CA (Carrier Aggregation) (multi-cell) operation as well as transmission of HARQ-ACK and A-CSI in separate TDMed (time division multiplexed) short PUCCH alloca-tions and in a same short PUCCH allocation.

At least for when Type I CSI collides with Type I CSI and Type II CSI collides with Type II CSI, the following priority order for CSI periodicity types applies. Aperiodic CSI>P-CSI; Aperiodic CSI>SP-CSI. CSI on PUSCH has priority over CSI on PUCCH. Only one CSI periodicity type is piggybacked on PUSCH. Lower priority CSI is dropped when there is a collision. Aperiodic CSI on PUCCH is dropped if there is a collision with PUSCH.

A-CSI/SP-CSI on PUSCH with slot aggregation is also discussed.

It is provided that when PUSCH slot aggregation is enabled, if A-CSI triggered by a DCI that schedules a PUSCH in a slot, the A-CSI is multiplexed only in the PUSCH in the first slot.

A-CSI/SP-CSI on PUSCH with repetition Type B is also discussed. However, A-CSI repetition without UL-SCH was not agreed in R16. The agreements may be listed as follows.

For CSI report(s) triggered by DCI on PUSCH repetition Type B without UL-SCH, CSI report(s) is carried on the first nominal repetition. For A-CSI and the first PUSCH carrying SP-CSI after activation, the first nominal repetition is expected to be the same as the first actual repetition. For PUSCH carrying SP-CSI other than the first one after activation, if the first nominal repetition is not the same as the first actual repetition, the first nominal repetition is not transmitted; otherwise, whether/how the first nominal rep-etition is dropped follows Rel-15 behavior for PUSCH repetition Type A with SP-CSI multiplexing. All the other nominal repetitions are discarded, and these repetitions are not considered (i.e., treated as non-existing) when determin-ing UCI multiplexing on PUSCH. For CSI report(s) trig-gered by DCI on PUSCH repetition Type B with UL-SCH, CSI report(s) is transmitted on the first actual repetition.

In fact, it is provided that for A-CSI transmission without UL-SCH, if PUSCH repetition Type B is configured, A-CSI is transmitted in 1st actual repetition of all actual repetitions/ nominal repetitions, last actual repetition, or the longest actual repetition. It may be further provided that A-CSI is sent in all actual repetitions.

CBG-based PUSCH/PDSCH transmission may be used to avoid sending the corrected decoded data in retransmission. However, A-CSI report is still sent as one transport block, TB, instead of being segmented into CBG. On the one hand there is no HARQ or retransmission for A-CSI report. On the other hand, Type II CSI feedback may be over 500 bits, even as large as 1000 bits, but the $N_{info}'$ needs to be larger than 3792 bits to have two CBGs.

The number of code blocks may be set as follows.

$$C = \begin{cases} 1 & \text{if } N_{info}' + 24 \leq K_s \\ \left\lceil \dfrac{N_{info}' + 24}{K_s - 24} \right\rceil & \text{otherwise} \end{cases}$$

where $K_s$=3840 if code rate R≤¼; otherwise, $K_s$=8448; wherein C means number of code blocks; $N_{info}$ means quantized intermediate number of information bits; $K_s$ means the maximum code block size.

Slot aggregation for PUSCH is supported in Rel-15 and renamed to PUSCH Repetition Type A in Rel-16. The name PUSCH repetition Type A is used even if there is only a single repetition, i.e. no slot aggregation. In Rel. 15, a PUSCH transmission that overlaps with DL symbols is not transmitted.

Another repetition format PUSCH repetition Type B is supported in Rel-16, which PUSCH repetition allows back-to-back repetition of PUSCH transmissions. The biggest difference between the two types is that repetition Type A only allows a single repetition in each slot, with each repetition occupying the same symbols. Using this format with a PUSCH length shorter than 14 introduces gaps between repetitions, increasing the overall latency. The other change compared to Rel. 15 is how the number of repetitions is signaled. In Rel. 15, the number of repetitions is semi-statically configured, while in Rel. 16 the number of repeti-tions can be indicated dynamically in DCI. This applies both to dynamic grants and configured grants type 2.

In NR R16, invalid symbols for PUSCH repetition Type B include reserved UL resources. The invalid symbol pattern indicator field is configured in the scheduling DCI. Segmen-tation occurs around symbols that are indicated as downlink, DL, by the semi-static time division duplexing (TDD) pattern and invalid symbols.

Further, several formats and repetition manners are also defined for PUCCH in NR R15 and R16.

As to PUCCH format 2, there may be FDM between encoded UCI and DMRS. UCI is encoded with RM (Reed Muller) codes (≤11 bit UCI+CRC) or Polar codes (>11 bit UCI+CRC) and scrambled. CRC refers to Cyclic Redun-dancy Check.

The number of contiguous PRBs used for PUCCH is determined by Configuration (upper bound), and/or UCI payload and configured max code rate. The number of DM-RS REs per PRB is 4 (REs 1, 4, 7, and 10). The DM-RS are the same as the PN (Pseudo-Noise) sequences of PUSCH DM-RS.

As to simultaneous HARQ-ACK (with/without SR) and CSI, HARQ-ACK and CSI are jointly encoded, not exceed-ing the configured max code rate using the configured PRBs. CSI is dropped if needed, CSI omission rules may be used for CSI on PUSCH.

Figure 1C:
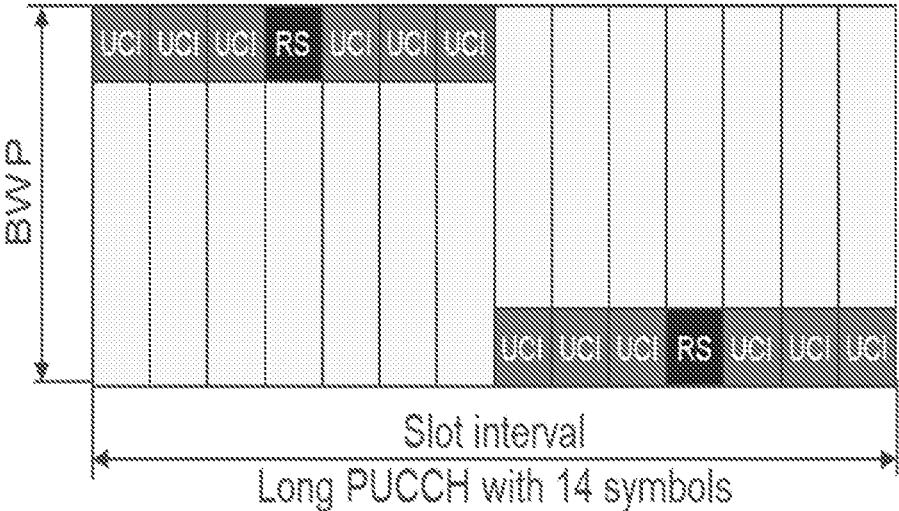
FIG. 1C shows an exemplary transmission arrangement for a long PUCCH with 14 symbols in a slot.
Figure 1D:
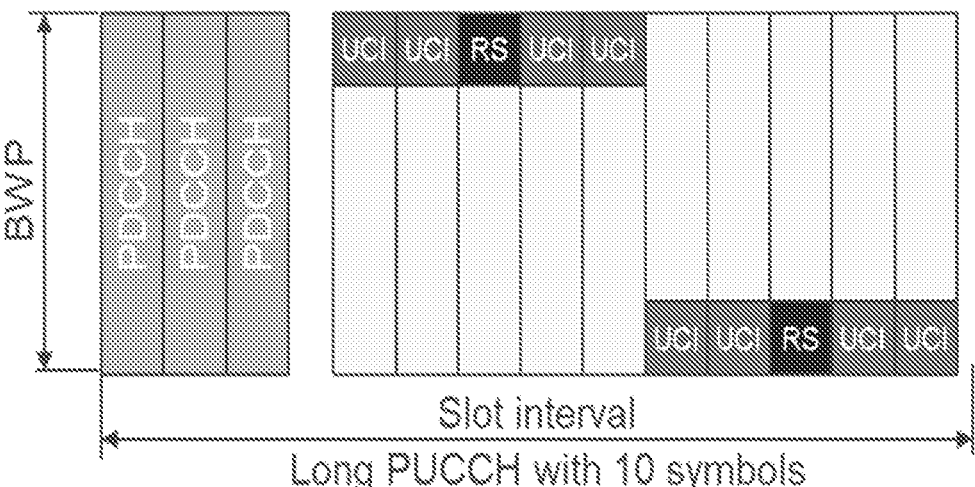
FIG. 1D shows an exemplary transmission arrangement for a for a long PUCCH with 10 symbols in a slot.

FIG. 1C shows an exemplary transmission arrangement for a long PUCCH with 14 symbols in a slot; FIG. 1D shows an exemplary transmission arrangement for a for a long PUCCH with 10 symbols in a slot.

As to PUCCH Format 3, there may be 4-14 symbols long and multiple PRB wide (per frequency-hop). DM-RS and UCI symbols are TDMed to maintain low Peak to Average Power Ratio, PAPR. UCI bits are encoded (RM codes for ≤11 bit UCI+CRC, Polar codes for >11 bit UCI+CRC), scrambled, and transmitted using DFTS-OFDM in UCI symbols. DM-RS symbols are Constant Amplitude Zero Autocorrelation, CAZAC, sequences. Frequency-hopping with one hop within the active UL bandwidth part, BWP, for the UE is supported. There may be UCI multiplexing using PUCCH format 3 or 4. There may be simultaneous transmission of A/N and SR. Similar to Format 2, a bit appended to A/N for the state of SR and all bits are jointly encoded. Simultaneous transmission of A/N (with/without SR) and CSI. A/N (and SR) and CSI part 1 are jointly encoded using configured max code rate. CSI part 2 is separately encoded using the remaining resources. The code rate should not exceed max code rate. CSI is dropped if needed, CSI omission rules may be defined for CSI on PUSCH. The modulated symbols of high priority UCI (A/N+CSI Part 1 or CSI Part 1), are mapped around DMRS, in frequency first, time second manner, as symmetric as possible. The remaining resources are used for the modulated symbols of lower priority UCI (CSI Part 2).

As to PUCCH Format 4, Long-PUCCH for moderate UCI payload with multiplexing capacity is supported based on pre-DFT OCC (OCC referring to Orthogonal Cover Code). Same structure as PUCCH format 3 but with multi-user multiplexing. There may be only one PRB. Maximum 4 users can be multiplexed over one PRB using Pre-discrete Fourier transform (pre-DFT) spreading code. Cyclic shift of DM-RS is chosen from $\{0, 3, 6, 9\}$ using the pre-DFT spreading code index.

As to PUCCH repetition in NR R15 and R16, NR Rel-15 supports slot aggregation of PUCCH, as specified in Chapter 9.2.6 of 38.213 f90. Repetition of PUCCH Format 1, 3, 4 can be configured separately. UCI can be repeated over $\{2$ or $4$ or $8\}$ $N_{PUCCH}{}^{repeat}$ slots. All UCI bits are transmitted in every slot and repeated. Each repetition has the same duration nrofSymbols and starting symbol in each slot startingSymbolIndex. Inter-slot and intra-slot hopping are supported, but not simultaneously.

If the UE determines that, for a PUCCH transmission in a slot, the number of symbols available for the PUCCH transmission is smaller than the value provided by nrofSymbols for the corresponding PUCCH format, the UE does not transmit the PUCCH in the slot.

If UE is provided with a semi-statically configured TDD pattern PUCCH is only mapped to slots that have UL or flexible symbols at the PUCCH location, i.e. slots don't have to be contiguous.

Figure 1E:
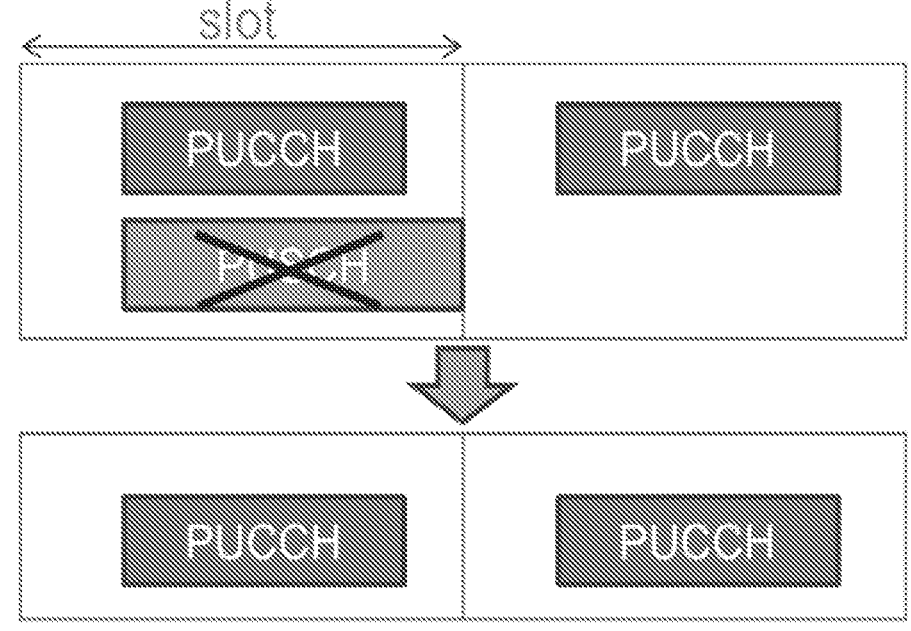
FIG. 1E shows an exemplary case when multi-slot PUCCH repetition overlap with single PUSCH.
Figure 1F:
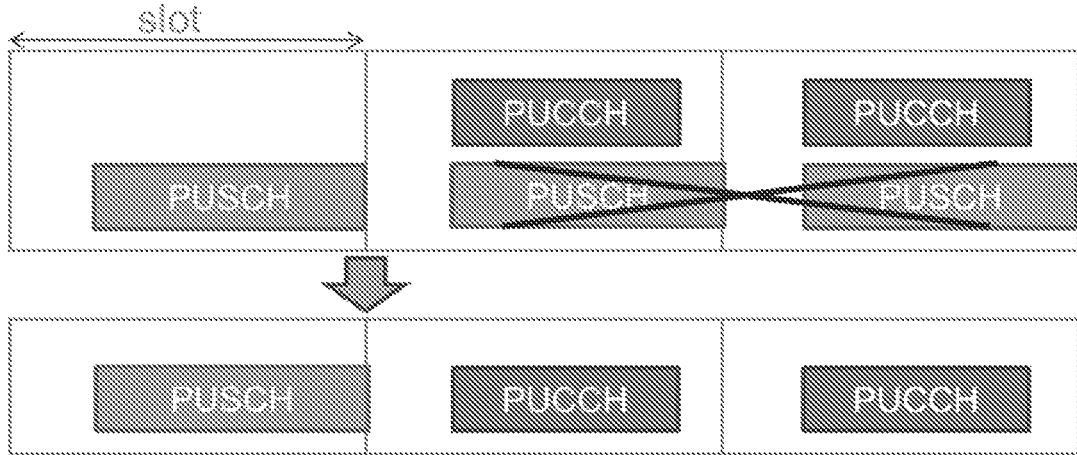
FIG. 1F shows an exemplary case when multi-slot PUCCH repetition overlap with multi-slot PUSCH.

FIG. 1E shows an exemplary case when multi-slot PUCCH repetition overlap with single PUSCH; FIG. 1F shows an exemplary case when multi-slot PUCCH repetition overlap with multi-slot PUSCH.

When multi-slot PUCCH repetition overlap with single/multi-slot PUSCH repetition in time, it is considered for dropping PUSCH without deferral in overlapping slots if the timeline requirement within overlapping slots is met; otherwise; it is considered as the error case for overlapping slots.

A UE does not multiplex different UCI types in a PUCCH transmission with repetitions over $N_{PUCCH}{}^{repeat}{>}1$ slots. If UE transmits two PUCCH with each in one or more slots and the two PUCCH overlap in some slots, for the number of slots and with UCI type priority of HARQ-ACK>SR>CSI with higher priority>CSI with lower priority. If two PUCCH include UCI type with same priority, UE transmits PUCCH starting at an earlier slot. UE transmits PUCCH that includes UCI type with higher priority and doesn't transmit PUCCH that includes UCI type lower priority.

As to Intra-UE prioritization in NR R16, physical (PHY) prioritization between UL transmissions of different PHY priority index is introduced in 3GPP to address resource conflicts between dynamic grant (DG) and configured grant (CG) PUSCH and conflicts involving multiple CGs and also to address UL data/control and control/control resource collision.

Rel-16 supports a two-level PHY priority index indication of:

Scheduling Request (SR): SR configuration may have a PHY priority index indication as an RRC field in SR resource configuration;

HARQ-ACK: PHY priority index may be indicated in DL DCI (Format 1_1 and 1_2) for dynamic assignments while for SPS the PHY priority index may be indicated by RRC configuration;

PUSCH: For DG (Dynamic Grant) PHY priority index, may be indicated in UL DCI (Format 0_1 and 0_2) and for CG the PHY priority index may be indicated by CG configuration.

A-periodic and semi-persistent CSI on PUSCH: PHY priority index may be indicated in UL DCI (Format 0_1 and 0_2).

In Rel-16, UCI (Uplink Control Information) is multiplexed in a PUCCH or a PUSCH if PHY priority index of UCI and the PHY priority index of PUCCH or PUSCH is the same.

The intra-UE PHY prioritization first resolves time-overlapping for PUCCH and/or PUSCH transmissions for same priority, then time-overlapping between priorities is resolved, where the lower-priority PUCCH/PUSCH is not transmitted if it is time-overlapping with a higher-priority PUCCH/PUSCH transmission.

That is, in NR up to Release 16, one CSI report is sent out once and every CSI report is sent independently. If the CSI report is not correctly decoded or fails at CRC error detection, gNB discards the report and triggers UE to send another one. When the UE is requested to send another CSI report, it doesn't consider if CSI has changed. This means the network excludes the possibilities of soft combining of the 2 or more consecutive CSI receptions at gNB, thus improved successful reception and UCI payload reduction cannot be achieved.

In NR up to Release 16, A-CSI report is only supported on PUSCH. On the one hand, even with PUSCH repetition, A-CSI report is only transmitted in one repetition and can't benefit from the performance gain introduced by repetition. On the other hand, there is no support of A-CSI on PUCCH as P/SP-CSI. This weakens A-CSI performance compared with P/SP-CSI.

The issue is that single shot A-CSI transmission on PUSCH may be the bottle neck among other UL/DL channels in NR according to the link budget evaluation in the further NR (such as Rel-17) coverage enhancement study, and the A-CSI is an important information to be used to determine the best downlink beam and proper scheduling information for the downlink transmissions so as to increase the capacity or total throughput of a cell. So, the enhancement of the A-CSI report performance is essential to improve the coverage and capacity of NR.

In the embodiments of the present disclosure, with consideration to improve the CSI report transmission, and related PUCCH/PUSCH transmission manners, embodiments of present disclosure propose methods to enhance the performance of CSI in NR, including CSI retransmission, CSI change indicator, CSI repetition on PUSCH, A-CSI repetition on PUCCH, and so on.

Specifically, the retransmission can be up to network scheduling. The retransmission may also be only allowed when a new CSI is not available. And whether the CSI transmission is a new transmission can be signaled or predetermined by a time requirement.

Further, UE can report CSI change indicator to assist gNB to know when it should request a CSI report, or a changed portion of a CSI report.

Further, CSI repetition Type AB are supported without UL-SCH. The repetition scheme can depend on PUSCH repetition type.

For CSI repetition overlapping with PUSCH with dynamic grant, below cases are handled: a case of one CSI repetition overlapping with one PUSCH in a slot, a case of one CSI repetition overlapping with multiple PUSCH in a slot, a case of N CSI repetitions overlapping with one PUSCH in a slot, a case of N CSI repetitions overlapping with multiple PUSCH in a slot, a case of segmented CSI actual repetition overlapping with PUSCH in a slot, and a case of CSI repetition overlapping with CG-PUSCH or other UCI.

Further, A-CSI (with or without repetition) is supported on PUCCH.

More detailed embodiments are described below.

Figure 2A:
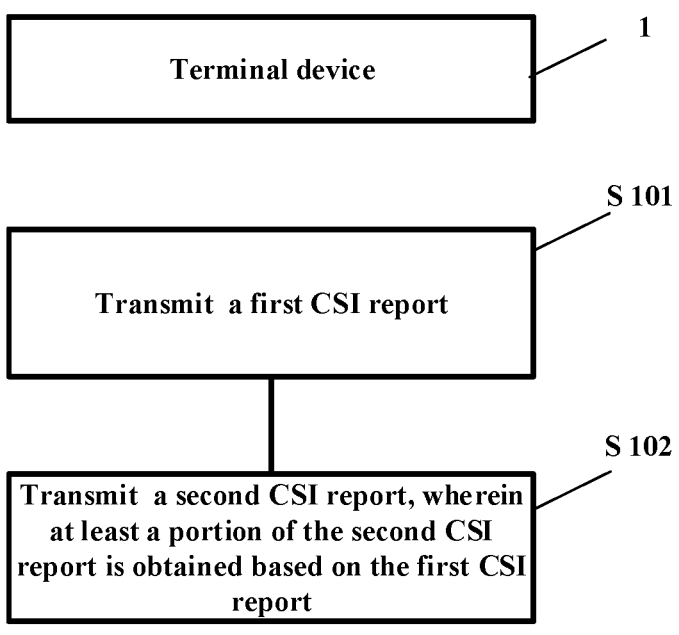
FIG. 2A is an exemplary flow chart for a method performed at a terminal device for transmitting a CSI report, according to embodiments of the present disclosure.
Figure 2B:
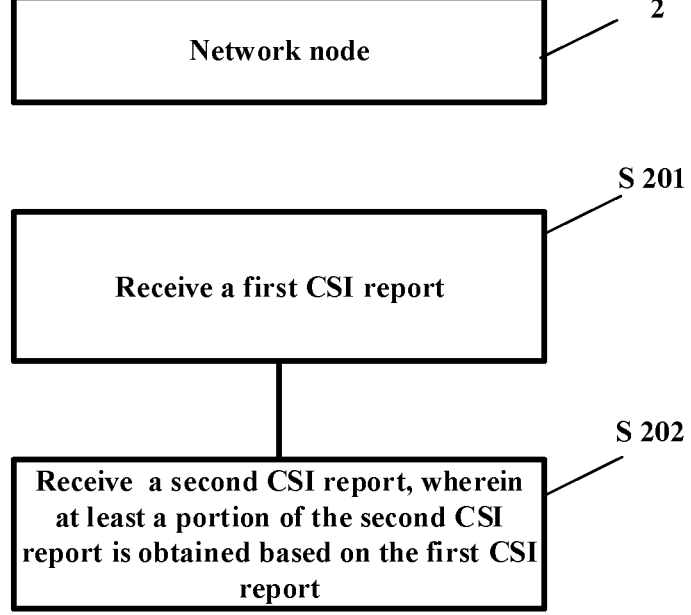
FIG. 2B is an exemplary flow chart for a method performed at a network node for transmitting a CSI report, according to embodiments of the present disclosure.

FIG. 2A is an exemplary flow chart for a method performed at a terminal device for transmitting a CSI report, according to embodiments of the present disclosure; FIG. 2B is an exemplary flow chart for a method performed at a network node for transmitting a CSI report, according to embodiments of the present disclosure.

As shown in FIG. 2A, the method performed at a terminal device comprises: transmitting (S101) a first CSI report; transmitting (S102) a second CSI report; wherein at least a portion of the second CSI report is obtained based on the first CSI report.

As shown in FIG. 2B, the method performed at a network node comprises: receiving (S201) a first CSI report; receiving (S202) a second CSI report; wherein at least a portion of the second CSI report is obtained based on the first CSI report.

In embodiments of the present disclosure, the second CSI report is a retransmission of the first CSI report; and the terminal device transmits the second CSI report, in response to a request from a network node.

In embodiments of the present disclosure, the request is indicated by a downlink control information, DCI, field.

In embodiments of the present disclosure, a first state of the DCI field indicates a retransmission of the first CSI report; and a second state of the DCI field indicates an initial transmission a third CSI report.

In embodiments of the present disclosure, the DCI field comprises a new data indicator, NDI.

In embodiments of the present disclosure, the DCI field indicates whether to retransmit all of the first CSI report, or a portion of the first CSI report.

In embodiments of the present disclosure, the portion of the first CSI report comprises at least one of: a wide band measurement result, a subband measurement result, a part 1, a part 2, or a specified measurement quantity of the first CSI report.

In embodiments of the present disclosure, the first CSI report is carried by at least one code block group, CBG; and the DCI field indicates whether each CBG of the at least one CBG is to be retransmitted.

In embodiments of the present disclosure, a number and/or a size of the at least one CBG is fixed, or configured through signalling, or associated to a type or a quantity of the first CSI report.

In embodiments of the present disclosure, when the first CSI report is transmitted together with uplink shared channel, UL-SCH, data, on a physical uplink shared channel, PUSCH, the DCI field comprises a first subfield to indicate whether to retransmit the first CSI report; and the DCI field further comprises a second subfield to indicate whether to retransmit the UL-SCH data.

In embodiments of the present disclosure, the request comprises code block group transmission information, CBGTI, for the retransmission of the first CSI report, and CBGTI for a retransmission of the UL-SCH data transmitted together with the first CSI report.

In embodiments of the present disclosure, the second CSI report is mapped to at least one layer of a PUSCH carrying the second CSI report; and the at least one layer of the PUSCH is predetermined, or configured by a network node.

In embodiments of the present disclosure, the second CSI report is transmitted within a first time duration after the first CSI report.

In embodiments of the present disclosure, a transmission parameter for retransmitting the first CSI report is predetermined, or configured by a network node through a radio resource control, RRC, signalling, or a DCI field; and the transmission parameter comprises at least one of a redundant version, or a frequency hopping.

In embodiments of the present disclosure, a hybrid automatic repeat request, HARQ, process is configured for the first CSI report and the second CSI report.

According to embodiments of the present disclosure, with the retransmission mechanism of the CSI report, the success rate of transmitting a CSI report may be improved and the payload for transmitting a CSI report may be reduced.

Figure 2C:
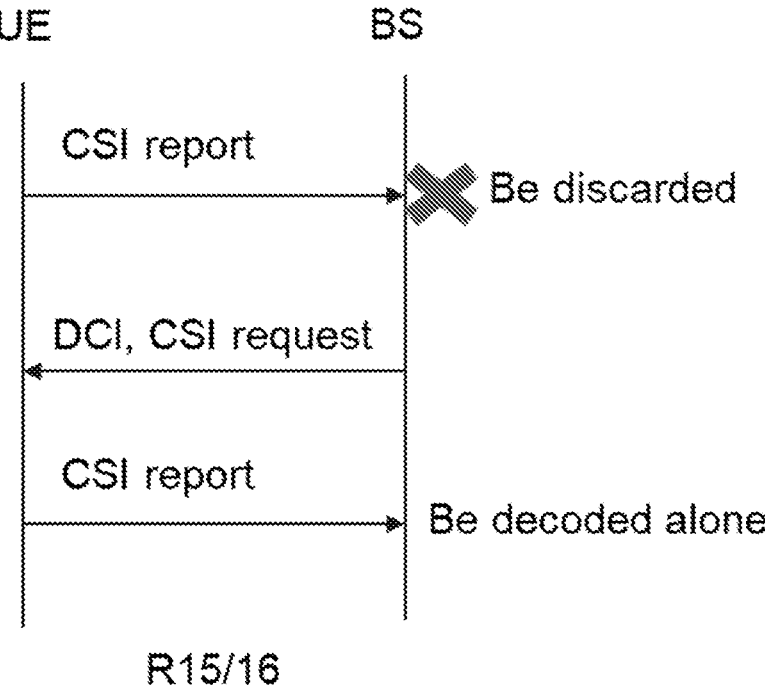
FIG. 2C shows a procedure in R15/R16.
Figure 2D:
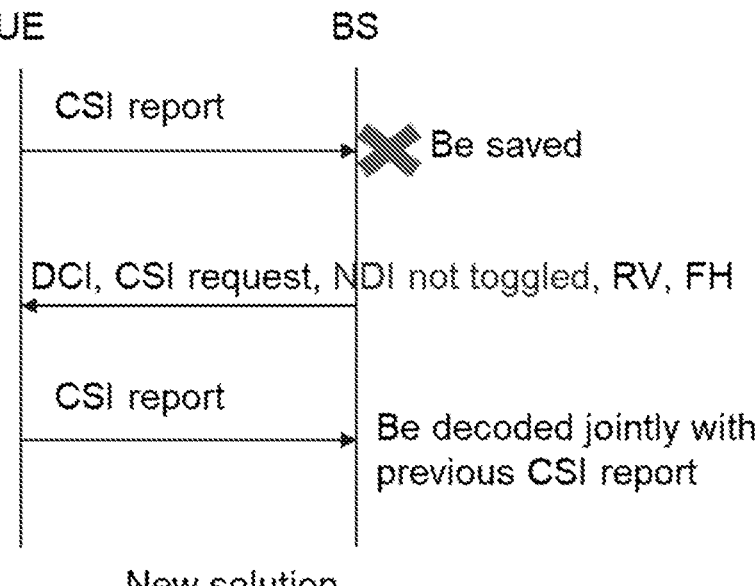
FIG. 2D shows an exemplary procedure according to embodiments of the present disclosure.

FIG. 2C shows a procedure in R15/R16; FIG. 2D shows an exemplary procedure according to embodiments of the present disclosure.

In R15/R16, the CSI report, which is not received correctly, is discard. The base station, BS, sends CSI request for another new CSI report, which is decoded alone.

In the proposed solution of the present disclosure, if one CSI report is not correctly decoded or it is regarded as broken either by CRC check for CSI payload size>=12 or implementation methods, this CSI report is saved for later use and gNB triggers UE to retransmit the previous CSI report or part of it. UE doesn't need to remeasure the channel. Retransmitted CSI report is valid if the time gap between two consecutive CSI reports is short or the channel is predicted as stable.

Retransmission of CSI can be triggered by NDI field in DCI0_0 and DCI0_1. E.g. Toggled NDI means that a new CSI report is requested. Non-toggled NDI means that retransmission of previous CSI report is requested. After receiving the retransmission, gNB can do soft combining of two receptions of the same CSI report.

For example, a plurality of further detailed embodiments may be further listed below.

In embodiments of the present disclosure, gNB can trigger UE to retransmit a CSI report by layer one signaling, e.g. in DCI0_0 or DCI0_1 or DCI 0_2 or a new DCI. Particularly, an NDI field can be used.

In embodiments of the present disclosure, for CSI report on a PUSCH without UL-SCH, NDI field in DCI indicates initial transmission of a CSI report or retransmission.

In embodiments of the present disclosure, for CSI with UL-SCH, retransmission or a new transmission of CSI and/or UL-SCH can be determined with one or more of the following methods.

As one method, CSI and UL-SCH data retransmission indication are determined by one NDI field, e.g. a 2-bit NDI field with one bit for CSI retransmission indication and another bit for UL-SCH retransmission indication.

As one method, CSI and UL-SCH data retransmissions are indicated by separate fields. E.g. one field "NDI" is used to determine whether a new UL-SCH date is expected or a retransmission of UL-SCH data is expected; another field "NDI2" (or name it as "NSI" since it's a "new CSI Indication", not for "data") is defined to determine whether a new CSI or a retransmission of CSI.

In embodiments of the present disclosure, the retransmission of CSI report can be one or more of the following: only the retransmission of a full CSI report transmitted in the initial transmission; the retransmission of a full CSI report or only a subset of the CSI report transmitted in the initial transmission.

In embodiments of the present disclosure, retransmission of the whole or part of the previous CSI report is determined by a L1 signaling in DCI, e.g. the L1 signaling can be new CSI indication field and/or a CSI request field and/or a separate signaling in DCI0_0 or DCI0_1 or DCI 0_2 or a new DCI format.

In embodiments of the present disclosure, assuming there're 2 parameters, one parameter is "new CSI indication" to indicate whether a new CSI should be transmitted, or a retransmission of CSI is expected, and the other parameter is "CSI request" field used to indicate the requested CSI format.

When new CSI indication field is not toggled, in case CSI request field is absent in DCI, UE retransmits the whole previous CSI report; in case CSI request field is present in DCI, it can be used to indicate which parts of CSI e.g. WB/SB, Part1/2 or some reporting quantities are to be retransmitted.

When new CSI indication field is toggled, in case CSI request field is absent in DCI, UE transmits a complete new CSI report; in case CSI request field is present in DCI, it can be used to indicate which part of CSI is expected to be reported In embodiments of the present disclosure, similar to previous embodiments, assuming there're 2 parameters, one parameter is "new CSI indication" used to indicate whether a new CSI should be transmitted, or a retransmission of CSI is expected, but the other parameter "CSI request" field is used to only indicate whether a CSI is requested.

When CSI request field is not present, neither CSI initial transmission nor CSI retransmission is expected.

When CSI request is present, if new CSI indication field is toggled, UE transmits a full new CSI report, if new CSI indication field is not toggled, UE retransmits the full CSI report.

In embodiments of the present disclosure, when initial transmission of CSI report is on a PUSCH which is a CBG-based transmission, the retransmission of CSI report can be also CBG-based retransmissions.

As an example, if gNB fails to decode some CSI report in one CBG, gNB sends NDI and CBGTI in DCI, jointly indicating the CSI report corresponding to which CBG needs further retransmission. If NDI is not toggled, and CBGTI corresponding to this CBG has value 1, the CSI on this CBG is indicated to be retransmitted.

In embodiments of the present disclosure, number and/or size of CBG for CSI can be derived with one or more of the following methods. They may be configured in RRC signaling, e.g. in system information block type 1, SIB1, or physical layer signaling, e.g. in DCI. They may be fixed values. They may depend on CSI reporting Type and reporting quantities of CSI.

In embodiments of the present disclosure, for CSI with UL-SCH, if both CSI and UL-SCH use CBG-based transmission, gNB provides separate CBGTI of CSI report and UL-SCH for retransmission.

In embodiments of the present disclosure, a start and the duration of a validity period for CSI report retransmission is used to determine when a retransmission of CSI is valid, where the start and/or the duration of the time period can be configured in RRC or physical layer signaling or can be predetermined.

As an example, UE is not expected to retransmit a previous CSI report when the scheduled retransmission is out of the validity period after the initial transmission of the CSI report.

In embodiments of the present disclosure, RV, frequency hopping of the retransmission relative to previous transmission of the same CSI report can be configured in RRC, DCI or predetermined.

In embodiments of the present disclosure, the retransmission of CSI can be mapped to one or multiple or all layers of simultaneous UL-SCH PUSCH. Number of PUSCH layers and which specific layers that CSI can be multiplexed on is configurable or predetermined. If not specifically configured, CSI retransmission is mapped to the same layers of PUSCH as initial CSI transmission or all PUSCH layers if PUSCH to carry CSI retransmission has fewer layers than that carries initial CSI transmission.

UL-SCH PUSCH that carries the retransmission of CSI may have different number of spatial layers from the PUSCH that has carried the initial transmission of the CSI report. Since it is retransmission, gNB doesn't have to configure the retransmission of CSI report mapping on all layers.

For example, if it is a two-layer PUSCH that carried initial CSI transmission, and it is a four-layer PUSCH that will carry retransmission of A-CSI report, by default A-CSI retransmission is mapped to the first two layers of PUSCH as it was in initial transmission.

In embodiments of the present disclosure, only one HARQ process is needed for CSI report retransmission, which means no extra HARQ process is needed for CSI. For example, compared to NR data with 16 HARQ processes and LTE with 8 HARQ processes, the computation resources and transmission resource regarding HARQ process may be saved.

Figure 3A:
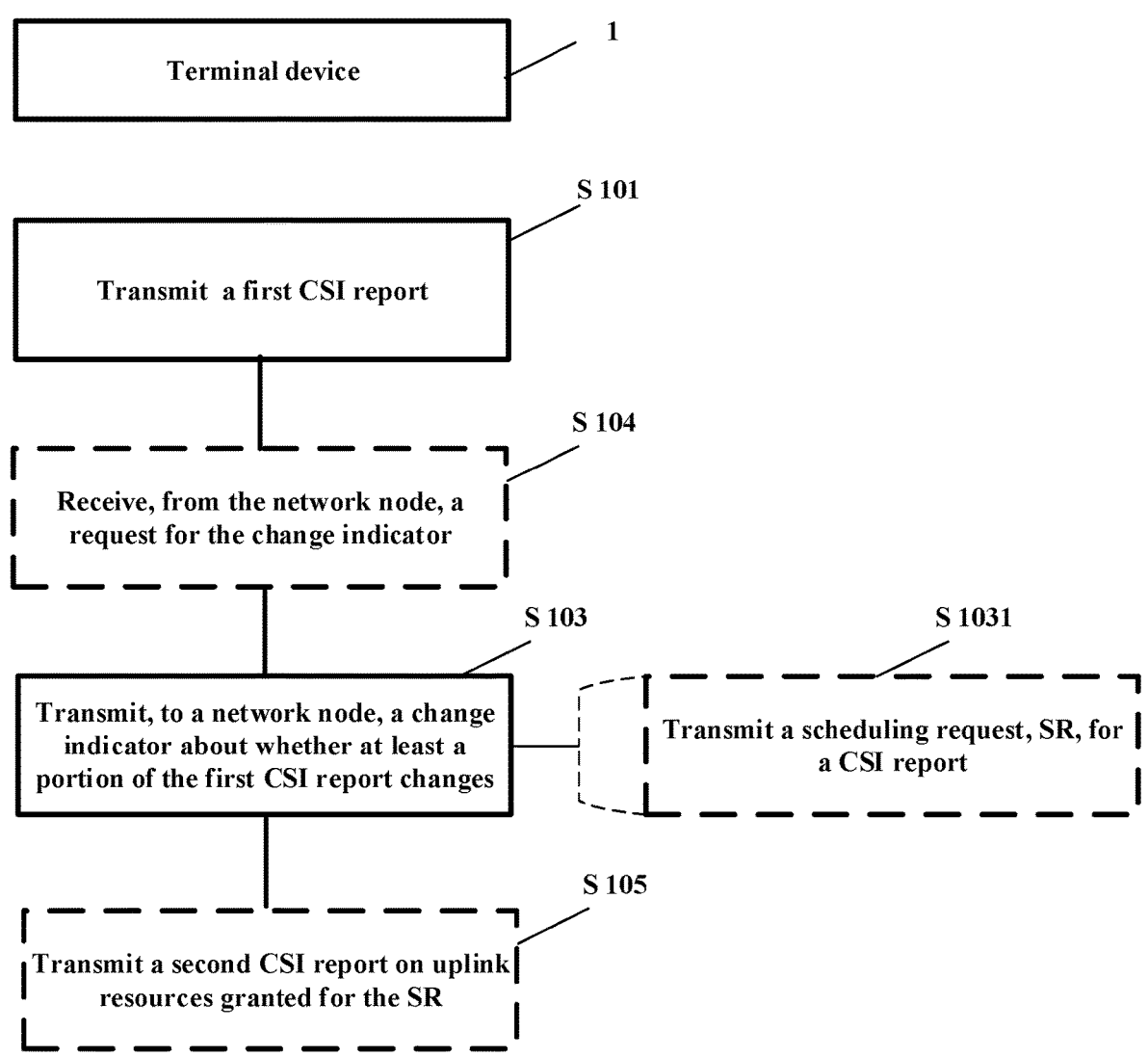
FIG. 3A is an exemplary flow chart for a method performed at a terminal device for transmitting a CSI report change indicator, according to embodiments of the present disclosure.
Figure 3B:
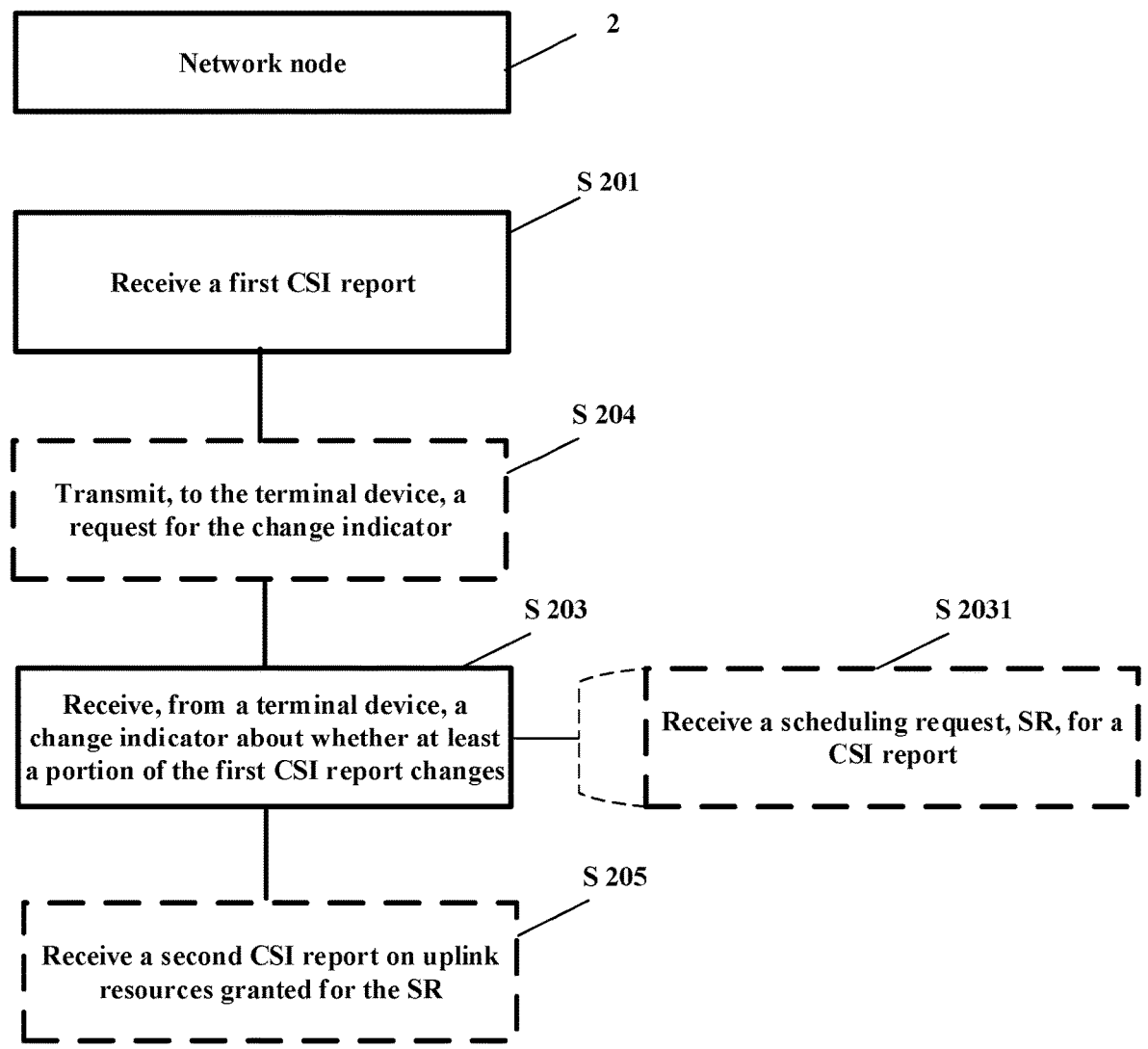
FIG. 3B is an exemplary flow chart for a method performed at a network node for transmitting a CSI report change indicator, according to embodiments of the present disclosure.

FIG. 3A is an exemplary flow chart for a method performed at a terminal device for transmitting a CSI report change indicator, according to embodiments of the present disclosure; FIG. 3B is an exemplary flow chart for a method performed at a network node for transmitting a CSI report change indicator, according to embodiments of the present disclosure.

As shown in FIG. 3A, the method performed at a terminal device may comprise: transmitting (S101) a first CSI report; and transmitting (S103), to a network node, a change indicator about whether at least a portion of the first CSI report changes.

In embodiments of the present disclosure, the method further comprises: receiving (S104), from the network node, a request for the change indicator; the request for the change indicator is carried by a layer one signaling or an RRC signaling.

In embodiments of the present disclosure, the method further comprises: transmitting (S105) a second CSI report on uplink resources granted for the SR.

In embodiments of the present disclosure, transmitting the change indicator comprises: transmitting (S1031) a scheduling request, SR, for a CSI report.

As shown in FIG. 3B, the method performed at a network node comprises: receiving (S201) a first CSI report; and receiving (S203), from a terminal device, a change indicator about whether at least a portion of the first CSI report changes.

In embodiments of the present disclosure, the method further comprises: transmitting (S204), to the terminal device, a request for the change indicator; wherein the request for the change indicator is carried by a layer one signaling or an RRC signaling.

In embodiments of the present disclosure, the method further comprises: receiving (S205) a second CSI report on uplink resources granted for the SR.

In embodiments of the present disclosure, receiving the change indicator comprises: receiving (S2031) a scheduling request, SR, for a CSI report.

According to embodiments of the present disclosure, when a portion of or all of the CSI report is not changed, the portion or all of the CSI report needs not to be transmitted. Only an indicator is used to indicate that the portion or all of the CSI report is not changed. Further, when the same partition or all of the CSI report is transmitted, soft combing can be used to improve the decoding.

Thus, the transmission success rate of the CSI report is improved, and the payload for transmitting the CSI report may be reduced.

In embodiments of the present disclosure, the change indicator is multiplexed and transmitted together with a CSI report and/or UL-SCH data.

In embodiments of the present disclosure, the request for the change indicator is about at least one of: a wide band measurement result, a subband measurement result, a part 1, a part 2, or a specified measurement quantity of the first CSI report.

In embodiments of the present disclosure, a support of the SR indicating a CSI change is signaled in downlink control information or RRC signalling.

In embodiments of the present disclosure, the change indicator is valid within a second time duration after the first CSI report; and the second time duration is predetermined, or configured by an RRC signalling or a layer one signalling.

In embodiments of the present disclosure, the second time duration is equal to or less than a period configured for a periodic CSI report.

In embodiments of the present disclosure, the change indicator is carried on a physical uplink control channel, PUCCH, or a PUSCH with configured grant.

For example, one CSI report, such as A-CSI report may be failed to be decoded on the gNB side, in which case whether gNB should trigger another A-CSI report can depend on some indication provided below.

In some cases, UE's new measurement may result in the same CSI report as previous one. Then, instead of reporting CSI report bits, UE can simply report an indicator, called e.g. CSI change indicator/indication in the present disclosure, if requested by gNB, for indicating that the new CSI report remains the same as the previous one.

Figure 3C:
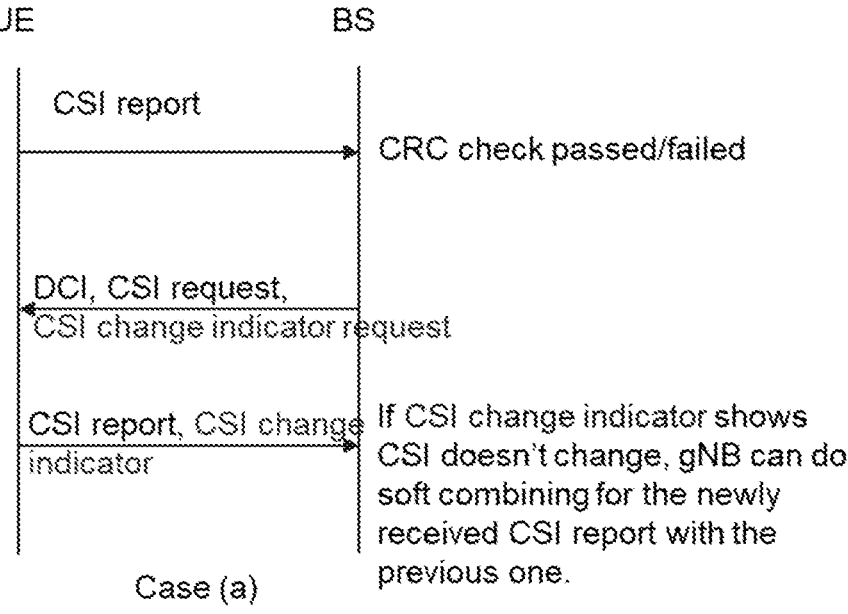
FIG. 3C shows a procedure for transmitting an CSI change indicator according to embodiments of the present disclosure.
Figure 3D:
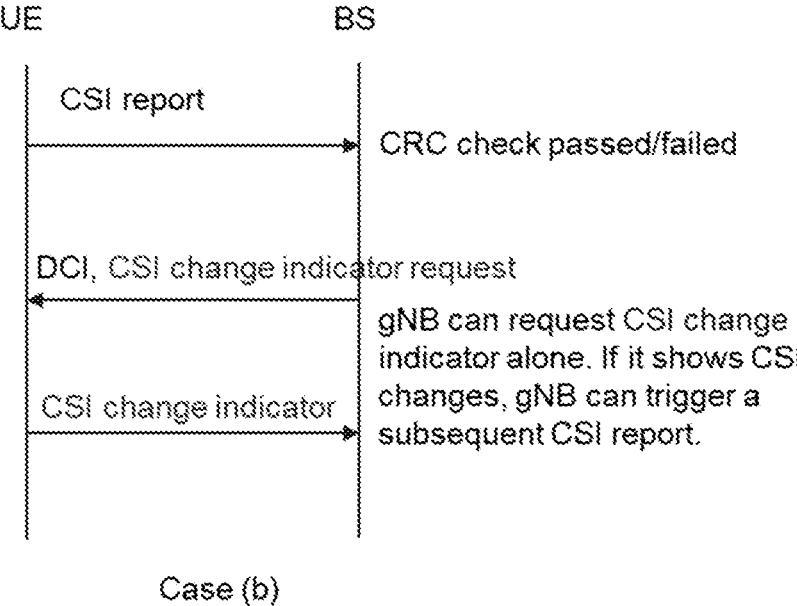
FIG. 3D shows another procedure for transmitting an CSI change indicator according to embodiments of the present disclosure.

FIG. 3C shows a procedure for transmitting an CSI change indicator according to embodiments of the present disclosure; FIG. 3D shows another procedure for transmitting an CSI change indicator according to embodiments of the present disclosure.

As illustrated in case (a) in FIG. 3C, the indicator is sent together with CSI report, which can assist gNB to do soft combining. Case (b) in FIG. 3D illustrates the new indicator is requested to be sent alone without CSI request field in DCI. It reduces CSI report payload if CSI doesn't change. If it indicates that CSI changes, gNB can trigger CSI report.

For example, a plurality of further detailed embodiments may be further listed below.

In embodiments of the present disclosure, a CSI change indicator report is used to indicate whether a CSI is changed compared to the last CSI report, which can be triggered via layer one signaling or RRC signaling. E.g. a CSI change indicator request field can be put in DCI 0-1 or RRC signaling for this purpose.

In embodiments of the present disclosure, CSI change indicator can be sent with or without A/SP/P-CSI report.

In embodiments of the present disclosure, CSI change indicator request field indicates all or some parts of CSI report, for which UE is required to report CSI change indicator. E.g. WB/SB, part1/2 of CSI report, or some reporting quantities of CSI report.

For example, a 1-bit value can indicate if whole CSI report remains the same. A 2-bit field of indicator can reflect CSI part 1 and 2 respectively. The indicator can also show if RI/WB CQI/WB PMI remain the same. If indicator shows some parts of CSI change, gNB can trigger a subsequent CSI of the changed parts.

In embodiments of the present disclosure, CSI change indicator can be sent alone, or be multiplexed with one or both of CSI report and UL-SCH, e.g. as below table shows, wherein "x" means being multiplexed. CSI change indicator, CSI report and UL-SCH data can be separately encoded or jointly encoded. CSI change indicator can be mapped before, after or between CSI part1, CSI part2, DMRS and UL data.

| Case | CSI change indicator | CSI report | UL-SCH |
|------|----------------------|------------|--------|
| 1 | x | | |
| 2 | x | x | |
| 3 | x | | x |
| 4 | x | x | x |

For example, if CSI change indicator, CSI report and UL-SCH are separately encoded and CSI contains two parts, CSI change indicator can be mapped following the latest RE of CSI part 1, as shown in below table.

| CSI part 1 | CSI change indicator | DMRS | CSI part 2 | UL-SCH |
|------------|----------------------|------|------------|--------|
| | | | | |

In embodiments of the present disclosure, the CSI change indicator can be in a form of scheduling request from UE when a CSI change is detected by the UE, where the scheduling request is used to ask grant for A-CSI report. E.g. after successful reception of the Scheduling request, gNB triggers A-CSI report via CSI request.

In embodiments of the present disclosure, the support of such scheduling request for CSI report can be signaled in RRC signaling or layer one signaling.

In embodiments of the present disclosure, start and duration of a time period is defined to determine when the CSI change indication is supposed to be always true, where the start and/or the duration of the time period can be derived based on one or more of the following options. For example, it may be indicated by RRC configuration or layer one signaling or predetermined. Optionally, the duration is equal to or no large than the periodic CSI report period if configured.

In embodiments of the present disclosure, UE reports the CSI change indication only when CSI changes. With this method, if no CSI change indication is received by the network, UE is not expected to receive a CSI request from gNB for CSI report. This reduces unnecessary signaling overhead and improves the efficiency of CSI request and CSI report.

In embodiments of the present disclosure, the report of CSI change indication can be on one or more of the following resources: PUCCH resource; PUSCH resources based configured grant (type 1 or type 2).

Figure 4A:
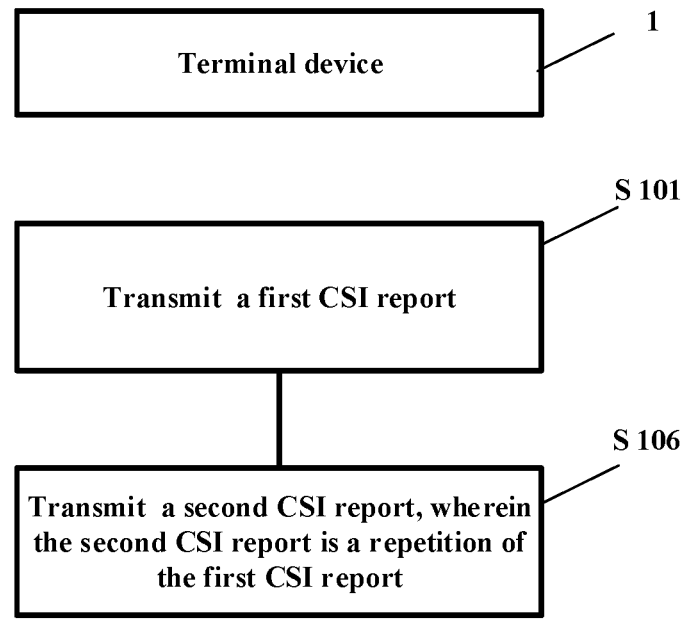
FIG. 4A is an exemplary flow chart for a method performed at a terminal device for transmitting a CSI report with repetitions, according to embodiments of the present disclosure.
Figure 4B:
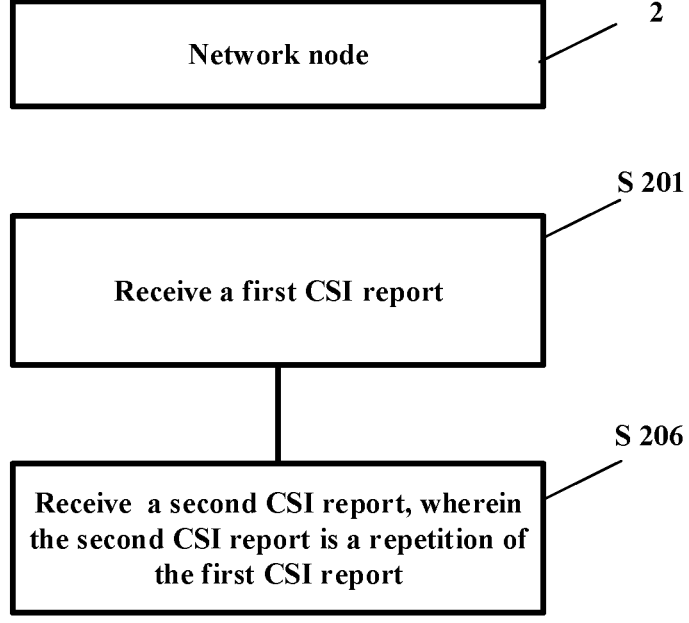
FIG. 4B is an exemplary flow chart for a method performed at a network node for transmitting a CSI report with repetitions, according to embodiments of the present disclosure.

FIG. 4A is an exemplary flow chart for a method performed at a terminal device for transmitting a CSI report with repetitions, according to embodiments of the present disclosure; FIG. 4B is an exemplary flow chart for a method performed at a network node for transmitting a CSI report with repetitions, according to embodiments of the present disclosure.

As shown in FIG. 4A, the method performed at a terminal device comprises: transmitting (S101) a first CSI report; transmitting (S106) a second CSI report; wherein the second CSI report is a repetition of the first CSI report.

As shown in FIG. 4B, the method performed at a network node comprises: receiving (S201) a first CSI report; receiving (S206) a second CSI report; wherein the second CSI report is a repetition of the first CSI report.

In embodiments of the present disclosure, the first CSI report and the second CSI report are transmitted on PUSCH, and without UL-SCH data.

In embodiments of the present disclosure, the first CSI report and the second CSI report are arranged to be transmitted in a first slot and a second slot respectively, while occupying the symbol positions with the same symbol indexes; or the first CSI report and the second CSI report are arranged to occupy continuous symbol positions.

In embodiments of the present disclosure, if transmission resources of at least one CSI report of the first CSI report and the second report cross over a slot border, or overlap with at least one symbol position invalid for CSI report, the at least one CSI report is omitted.

In embodiments of the present disclosure, if transmission resources of at least one CSI report of the first CSI report and the second report cross over a slot border, or overlap with at least one symbol position invalid for CSI report, the at least one symbol position of the transmission resources is omitted, and excluded from resources for the at least one CSI report.

In embodiments of the present disclosure, the at least one symbol position invalid for CSI report comprises at least one of: a downlink symbol, or an invalid symbol indicated by a DCI.

In embodiments of the present disclosure, the transmission resources of at least one CSI report is divided by the slot border, and/or the at least one symbol position invalid for CSI report, to at least one segment; and a segment of the at least one segment is omitted, if the segment is less than a predetermined number of symbols.

In embodiments of the present disclosure, a segment of the at least one segment is selected for carrying portions of the at least one CSI report, based on a priority sequence of the portions.

In embodiments of the present disclosure, the segment is selected based on a size of the segment, and/or a start time of transmission of the segment.

In embodiments of the present disclosure, the segment with a size at least enough for a part 1 of the at least one CSI report is selected; a segment with a size less than the part 1 is dropped; the selected segment carries the part 1; and the selected segment further carries portions of a part 2 of the at least one CSI report, based on a priority sequence of the portions of the part 2, if the selected segment has enough extra resources besides carrying the part 1.

In embodiments of the present disclosure, the method performed at the terminal device further comprises: receiving a configuration about at least one of: a number of repetitions of a CSI report; allocated transmission resources for at least one repetition of a CSI report; a frequency hopping manner of repetitions of a CSI report; a precoder cycling manner of repetitions of a CSI report; redundant versions, RV, of repetitions of a CSI report; physical priority indexes of repetitions of a CSI report; or a manner for processing a collision with invalid symbol positions.

In embodiments of the present disclosure, transmission resources of at least one CSI report of the first CSI report and the second report overlaps with a resource for one or more PUSCH transmissions for UL-SCH data, in a slot.

In embodiments of the present disclosure, the at least one CSI report comprises a complete CSI report; an PUSCH transmission of the one or more PUSCH transmissions comprises a complete PUSCH transmission or a segmented PUSCH transmission; the complete CSI report comprises a CSI report not divided by any of a slot border and a symbol position invalid for CSI report; the complete PUSCH transmission comprises a nominal PUSCH transmission and a segmented PUSCH transmission comprises one of multiple actual PUSCH transmissions segmented from a nominal PUSCH transmission.

In embodiments of the present disclosure, the at least one CSI report and the UL-SCH data are arranged simultaneously by a DCI; and the at least one CSI report has the same priority with the UL-SCH data.

The "priority" may mean the priority to determine whether to transmit both signals or only one of them should be transmitted and which one should be prioritized. The examples for priority indicator and its application can be found in subclause 9 in 38.213 version 16.2.0.

In embodiments of the present disclosure, the at least one CSI report and the UL-SCH data are arranged by different DCI.

In embodiments of the present disclosure, the at least one CSI report is multiplexed with the one or more PUSCH transmissions, based on at least one of: a configuration via RRC, a configuration via DCI, a length of the at least one CSI report, or a size of the PUSCH transmission.

In embodiments of the present disclosure, the at least one CSI report is multiplexed with the one or more PUSCH transmissions further based on at least one of: a bitmap of the one or more PUSCH transmissions, or a redundant version of the one or more PUSCH transmissions; and each bit of the bitmap indicates whether a corresponding PUSCH transmission of the one or more PUSCH transmissions is allowed to be multiplexed.

In embodiments of the present disclosure, the at least one CSI report comprises one or more CSI report repetitions; the at least one CSI report is multiplexed with the PUSCH transmission further based on at least one of: a bitmap of the CSI report repetitions, or a redundant version of the CSI report repetitions; and each bit of the bitmap indicates whether a corresponding repetition of the CSI report repetitions is allowed to be multiplexed.

In embodiments of the present disclosure, the at least one CSI report is multiplexed with the one or more PUSCH transmissions in one or more slots further based on at least one of: a bitmap of the one or more slots; and each bit of the bitmap indicates whether the at least one CSI report is allowed to be multiplexed on one or more PUSCH transmissions in a corresponding slot of the one or more slots.

In embodiments of the present disclosure, the at least one CSI report is multiplexed with the PUSCH transmission after a timeline check is passed, if the at least one CSI report is an initial repetition; and a coding rate check is optional for the at least one CSI report to be multiplexed with the PUSCH transmission.

In embodiments of the present disclosure, the PUSCH transmission is divided to a plurality of segments around the at least one CSI report; and a segment of the PUSCH transmission with a start time aligning with the at least one CSI report is dropped, or is multiplexed with the at least one CSI report.

In embodiments of the present disclosure, the transmission resources of the at least one CSI report overlap with at least resources for a first PUSCH transmission for UL-SCH data and a second PUSCH transmission for UL-SCH data.

In embodiments of the present disclosure, one PUSCH transmission of the first PUSCH transmission and the second PUSCH transmission is selected for multiplexing with the at least one CSI report, based on at least one of: a time order, available resources, a redundant version of the one UL-SCH data, or a configuration via RRC or DCI.

In embodiments of the present disclosure, transmission resources of the first CSI report and transmission resources of the second CSI report overlap with a resource for the PUSCH transmission for UL-SCH data; and the first CSI report and the second CSI report are multiplexed with the PUSCH transmission.

In embodiments of the present disclosure, a part 1 of the first CSI report and a part 1 of the second CSI report are arranged together, and a part 2 of the first CSI report and a part 2 of the second CSI report are arranged together, in the PUSCH transmission.

In embodiments of the present disclosure, transmission resources of the first CSI report overlap with a resource for a first PUSCH transmission for UL-SCH data, and transmission resources of the second report overlap with a resource for a second PUSCH transmission for UL-SCH data; and the first CSI report is multiplexed with the first PUSCH transmission, and the second CSI report is multiplexed with the second PUSCH transmission.

In embodiments of the present disclosure, a first number of CSI report is allowed to be multiplexed with one PUSCH transmission; and a second number of CSI report is allowed to be multiplexed with PUSCH transmissions in one slot.

In embodiments of the present disclosure, the at least one CSI report comprises a segment, generated form dividing a CSI report by a slot border and/or a symbol position invalid for CSI report; and the at least one CSI report is dropped; or wherein a part 1 of the at least one CSI report is multiplexed with the PUSCH transmission, at least a portion of a part 2 of the at least one CSI report is dropped.

In embodiments of the present disclosure, the PUSCH transmission has a configured grant; and the at least one CSI report is dropped, if a priority of the at least CSI report is less than the PUSCH transmission.

In embodiments of the present disclosure, transmission resources of at least one CSI report of the first CSI report and the second report overlap with a resource for a PUCCH transmission.

In embodiments of the present disclosure, the at least one CSI report or the PUCCH transmission is dropped according to a priority order.

In embodiments of the present disclosure, at least a portion of the at least one CSI report is multiplexed with the PUCCH transmission; or the PUCCH transmission is multiplexed on a PUSCH, if the at least one CSI report is arranged on the PUSCH.

In embodiments of the present disclosure, the PUCCH transmission is for a scheduling request, or acknowledge information of hybrid automatic retransmission request, HARQ.

For example, a plurality of further detailed embodiments may be further listed below.

In the methods provided in the present disclosure, CSI report on PUSCH without UL-SCH data can repeat multiple times to improve robustness. Like R16 PUSCH repetition definition, in the present disclosure a CSI repetition without segmentation is called nominal repetition. Any nominal repetitions that cross the slot border or contain invalid symbols are then segmented, creating actual repetitions. There are two kinds of CSI repetition, Type A and Type B. "CSI report" mentioned in the present disclosure can be periodic, semi-persistent, or aperiodic CSI.

Figure 4C:
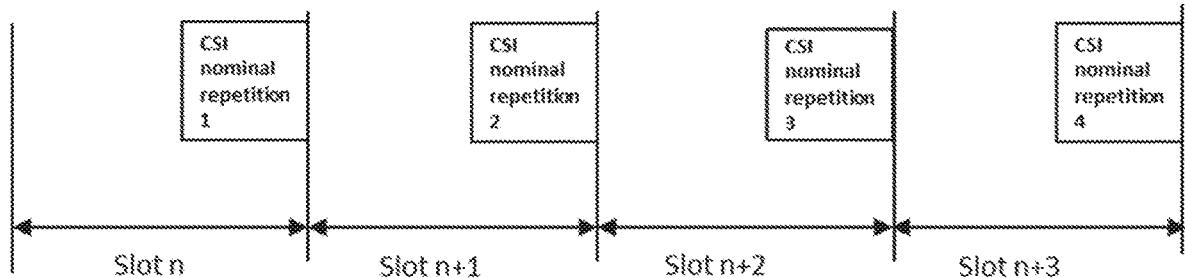
FIG. 4C shows CSI repetition Type A without UL-SCH.

FIG. 4C shows CSI repetition Type A without UL-SCH.

In embodiments of the present disclosure, CSI repetition Type A supports CSI repetitions in continuous slots, with one CSI repetition occupying the same symbols in a slot.

Figure 4D:
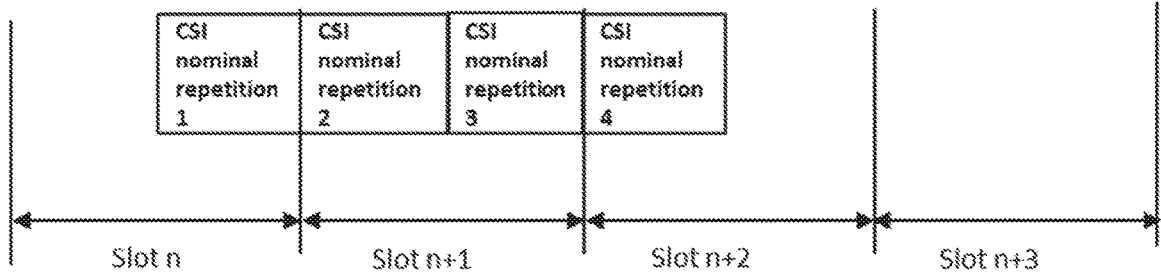
FIG. 4D shows CSI repetition Type B without UL-SCH.

FIG. 4D shows CSI repetition Type B without UL-SCH.

In embodiments of the present disclosure, CSI repetition Type B supports CSI repetitions in continuous symbols.

In embodiments of the present disclosure, when one CSI repetition Type A overlaps with DL symbols indicated by the semi-static TDD pattern or invalid symbols by invalid symbol pattern indicator field in the scheduling DCI, or when one CSI repetition Type B crosses slot border or overlaps with DL/invalid symbols, one or more options can be applied.

If all symbols of one CSI repetition overlaps with DL/invalid symbols, this CSI repetition is omitted. The omitted repetition can be counted or not in total number of repetitions. The omitted repetition can be counted for RV cycling or not.

If one or multiple but not all symbols of one repetition overlaps with DL/invalid symbols or CSI repetition Type B crosses slot border, one or more options can be applied.

Figure 4E:
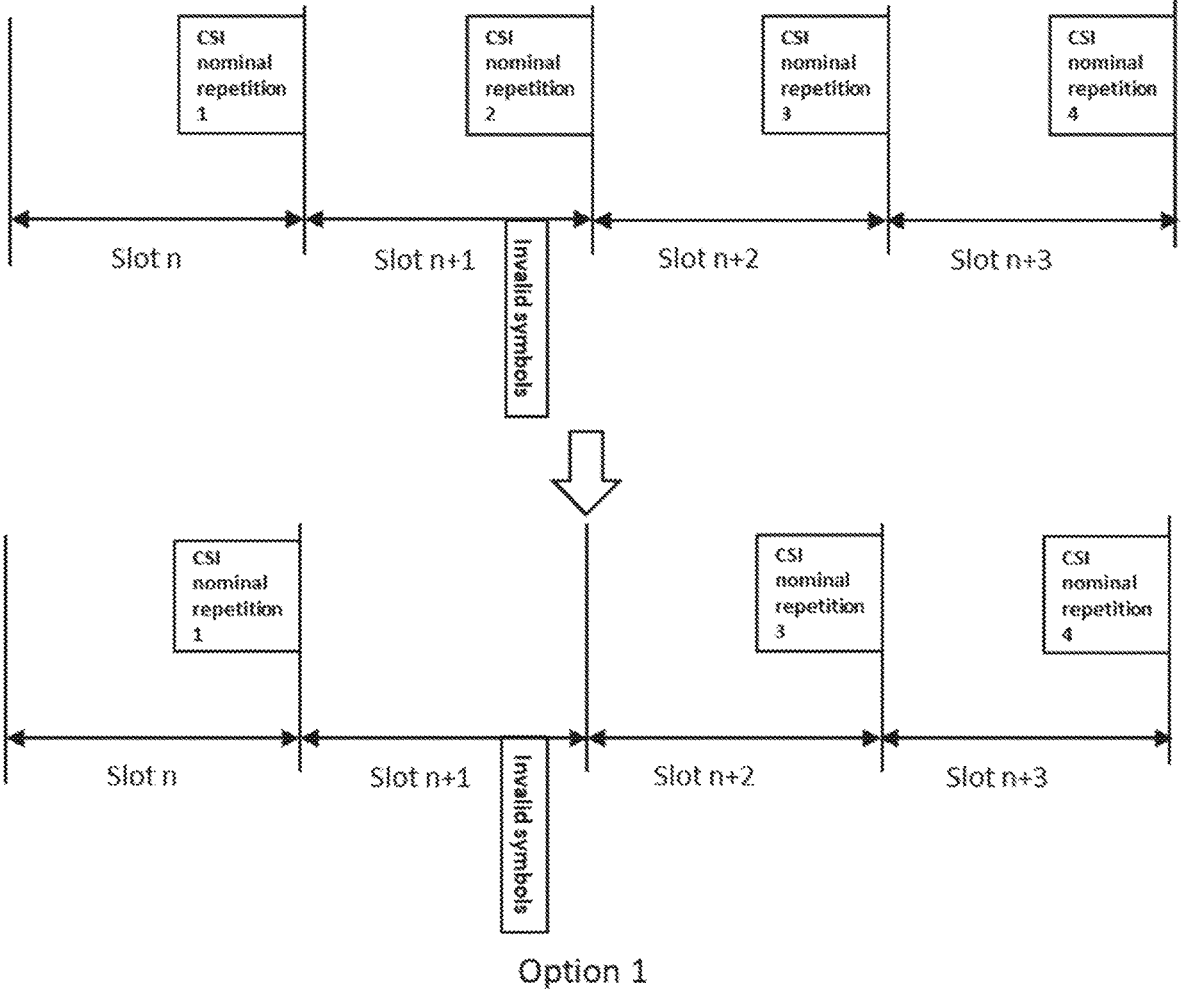
FIG. 4E shows an exemplary option for CSI repetitions overlapping with invalid symbols.
Figure 4F:
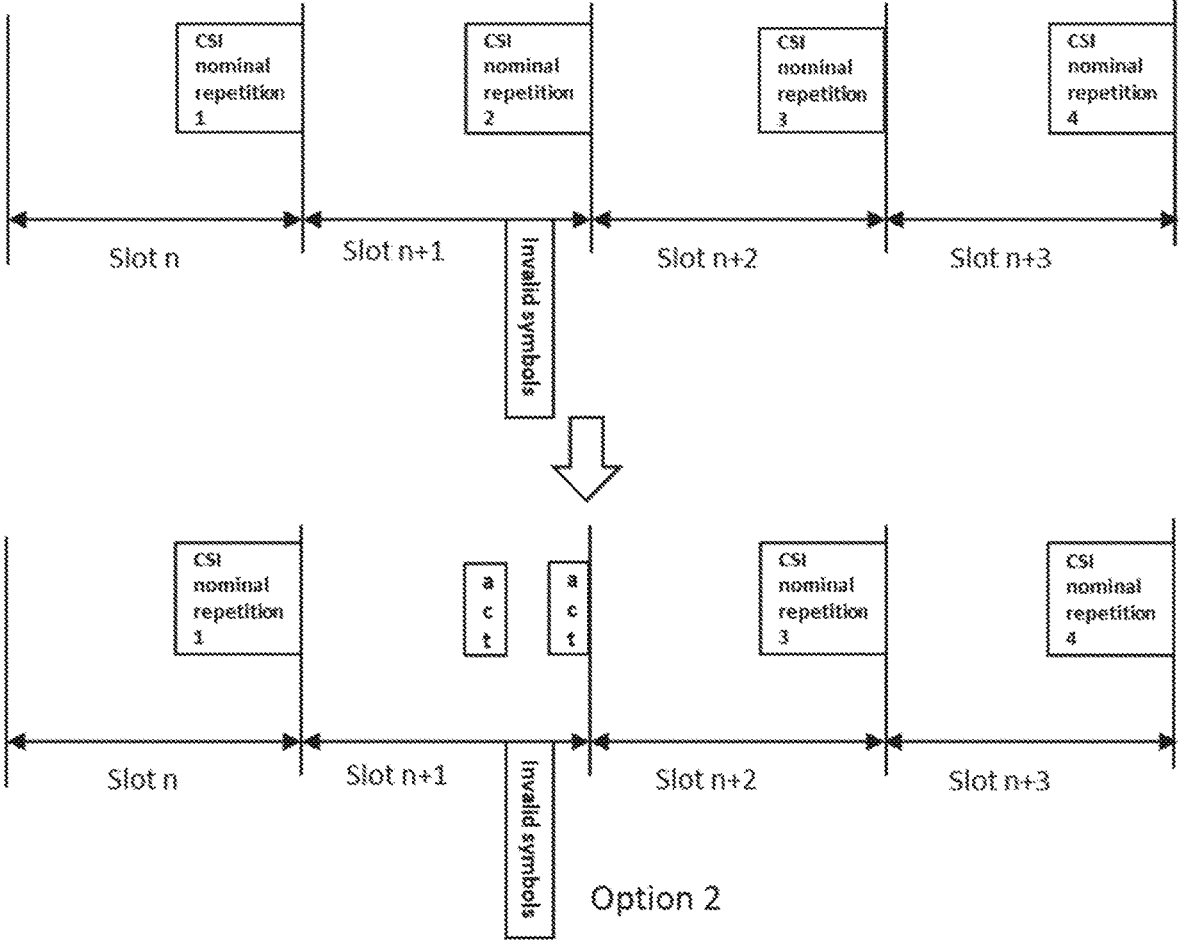
FIG. 4F shows another exemplary option for CSI repetitions overlapping with invalid symbols.
Figure 4G:
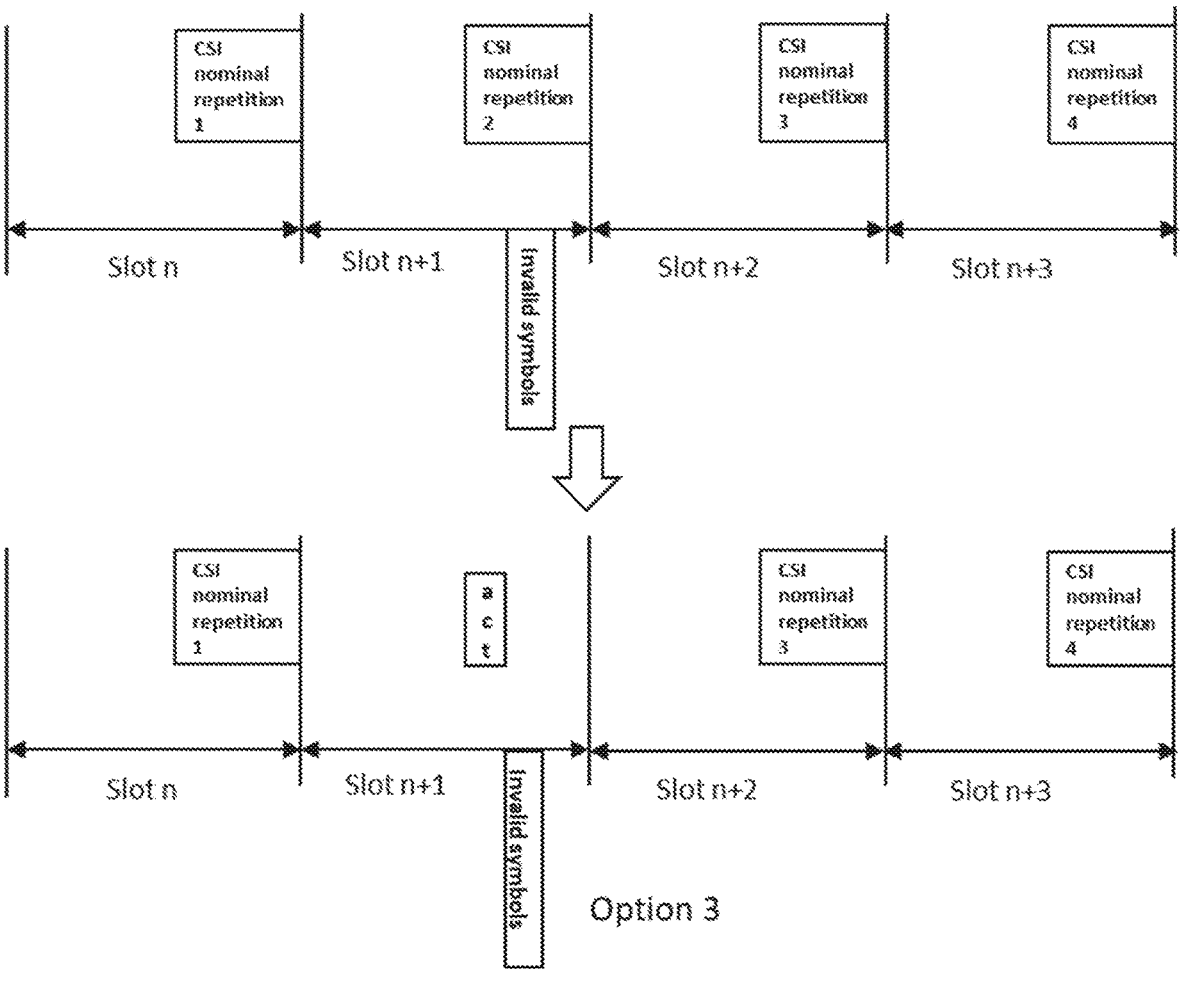
FIG. 4G shows another exemplary option for CSI repetitions overlapping with invalid symbols.

FIG. 4E shows an exemplary option for CSI repetitions overlapping with invalid symbols; FIG. 4F shows another exemplary option for CSI repetitions overlapping with invalid symbols; FIG. 4G shows another exemplary option for CSI repetitions overlapping with invalid symbols.

Option 1, the whole repetition is omitted. The omitted repetition can be counted or not in total number of repetitions. The omitted repetition can be counted for RV cycling or not.

Option 2, the nominal repetition is segmented into actual repetitions (act in the figure) around DL symbols/invalid symbols and slot border. The Transport Block Size is determined based on the length of the nominal repetitions. A variant may be that the Transport Block Size is determined based on the length of the actual repetitions. Omission rule for CSI part 2 can be applied according to the any priority order, such as this shown in Table 5.2.3-1 in 38.214 version 16.2.0.

A minimum length of actual CSI repetition X can be configured. Segment with less than X OFDM symbols can be omitted. X is an integer number, such as 2, etc.

Option 3, if one nominal repetition may lead to one or multiple actual repetitions, CSI is transmitted in only one actual repetition for one nominal repetition.

The actual repetition can be selected in several ways 1) the longest one 2) the earliest one 3) the earliest one that meet certain payload size, e.g. big enough for CSI part 1.

In the chosen actual repetition, if its size is not large enough for CSI report, all or portion of CSI report part 2 is dropped according to any priority order, such as this in Table 5.2.3-1 in 38.214 version 16.2.0. If UCI payload size is still not satisfied, CSI part 1 is dropped.

A comparison of option 2 and 3 may be like follows. On overlapping with DL/invalid symbols, difference between option 2 and 3 is that, in option 2, what CSI is transmitted in actual repetition depends on the index of transmitted symbols in a nominal repetition. But in option 3, every CSI repetition, even if it is segmented, transmits payload from its beginning, namely CSI part 1.

For example, in above figure CSI nominal repetition #2 has collision with DL/invalid symbols in the middle several symbols, option 2 will result in portions of CSI report are sent in CSI repetitions. But option 3 will see UE sends CSI part 1 in CSI actual repetition #2.

For CSI report with two parts, CSI part 1 is more important than part 2 and determines the size of CSI part 2. A special case is that the beginning portion, which contains CSI part 1, of every CSI nominal repetition collides with DL/invalid symbols. In this case, with option 2, CSI part 1 can't be sent and gNB can't decode CSI part 2 even if it is received multiple times. Thus, CSI part 1 may be transmitted in priority.

Figure 4H:
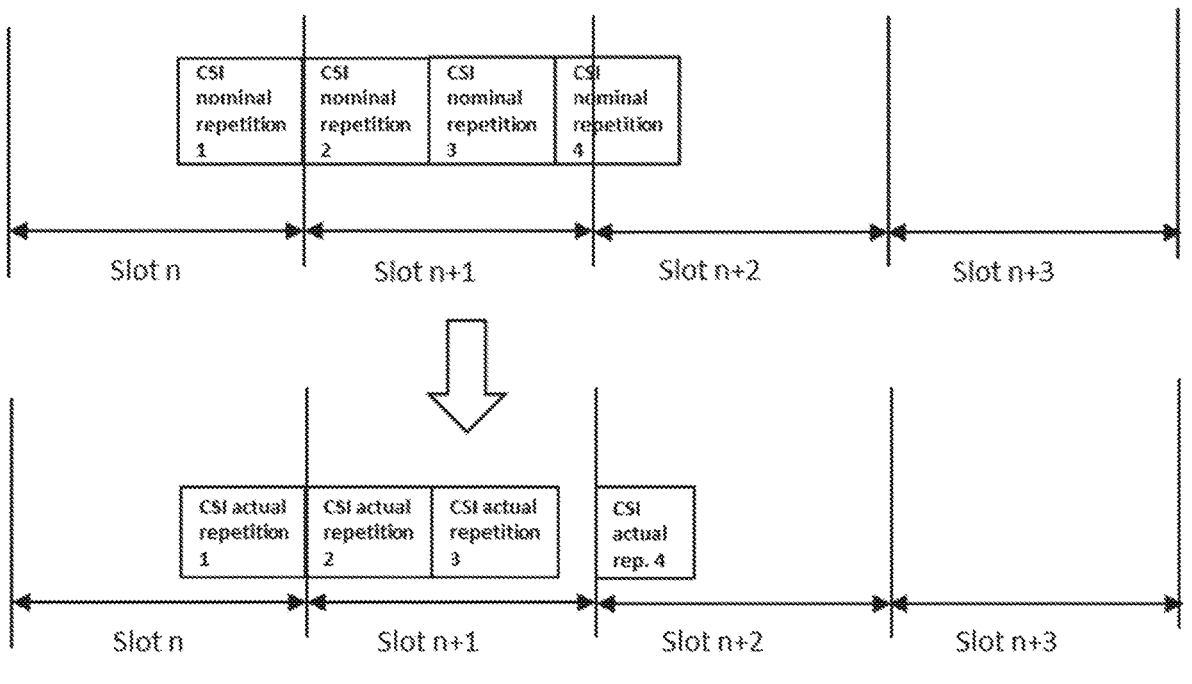
FIG. 4H shows options 2,3 for CSI repetition Type B overlapping with a slot border.

FIG. 4H shows options 2,3 for CSI repetition Type B overlapping with a slot border.

For an example of CSI repetition Type B, in FIG. 4H, CSI is sent with 4 repetitions. The nominal repetition #4 spans two slots. The portion in Slot n+1 is omitted as it has less than X OFDM symbols. According to Option 2, the later portion of CSI is sent in this actual repetition; with Option 3, CSI part 1 is sent in it.

In embodiments of the present disclosure, for CSI repetition Type A and Type B, one or more of the following can be configured in layer one signaling or RRC signaling for CSI repetition on PUSCH without UL-SCH data: reuse of existing parameters/fields, CSI request field in DCI, number of nominal repetitions, time and frequency domain resource allocation for the first repetition, intra-slot or inter-slot frequency hopping, RV, New parameter/fields included, PHY priority index of CSI repetition.

If intra-UE prioritization is activated, priority of CSI with repetition needs to be configured, which can be the same or different from that of CSI report without repetition.

If CSI repetition collides with DL/invalid symbols or other PUSCH, methods such as dropping and dropping rule, segmentation or multiplexing.

In embodiments of the present disclosure, for CSI repetition Type A and Type B, if gNB configures PHY priority index for physical channels, one or more options can be used. All repetitions of one CSI report have the same priority, or different repetitions can be configured different PHY priorities.

In embodiments of the present disclosure, for CSI repetition Type A and Type B, different CSI repetitions can use different RV, precoder cycling/antenna hopping in a predefined order, or indicated by RRC configuration or layer one signaling.

For example, a plurality of further detailed embodiments may be further listed below, for supporting a CSI report repetition multiplexed with UL-SCH data or other types of UCI.

In embodiments of the present disclosure, for CSI repetition Type A and/or Type B, regarding CSI repetition with simultaneous UL-SCH, one or more of the following priority rules are used.

If CSI repetition and UL-SCH are scheduled in the same DCI, CSI report uses UL-SCH's PHY priority index.

If CSI repetition and UL-SCH/other types of UCI are scheduled in separate DCI and have separate PHY priority indices, when one or multiple CSI repetitions overlap with UL-data/other types of UCI in a slot, the overlapping one with lower priority is dropped. If CSI repetition and UL-SCH/other types of UCI have the same PHY priority, multiplexing rule may be applied.

In embodiments of the present disclosure, CSI repetitions can be mapped to one, multiple or all layers of simultaneous UL-SCH PUSCH. Number of PUSCH layers and which particular layers that CSI can be multiplexed on is configurable or predetermined.

CSI repetition and simultaneous UL-SCH can be scheduled by the same or separate DCI, leading to various overlapping cases which are addressed in below embodiments. Embodiments may be about CSI repetition Type AB overlapping with PUSCH with dynamic grant, which may be PUSCH repetition Type A/B. Embodiments may be about CSI repetition overlapping with configured grant-PUSCH w/o repetition. CSI repetition may also overlap with other types of UCI as discussed in embodiments.

Here as agreed in R16, the name PUSCH repetition Type A is used even if there is only a single repetition, i.e. no slot aggregation.

Embodiments about CSI overlapping with PUSCH with dynamic grant may be provided. PUSCH may refer to the PUSCH repetition Type A and repetition Type B. Both nominal and actual repetitions are considered.

TBS of PUSCH is calculated based on the number of REs allocated for PUSCH in a slot excluding DMRS and some overhead. But when CSI repetition is multiplexed on PUSCH, and CSI and PUSCH are scheduled by a separate DCI, REs used for CSI are not excluded for TBS determination. The more RE CSI uses, the less RE remain for PUSCH, the higher code rate of PUSCH is. Subclause 5.4.2.1 in 38.212 version 16.2.0 defines that maximum coding rate of Low-Density Parity-Check (LDPC) code is 948/1024.

In embodiments of the present disclosure, a minimum number of OFDM symbols X can be configured for PUSCH repetition type B. Actual PUSCH repetition with less OFDM number than X won't be multiplexed with CSI repetition. X can be predetermined or configurable.

When CSI repetitions overlaps with PUSCH repetitions within a time period, unconditional multiplexing A-CSI on all PUSCH repetitions may undercut PUSCH performance, especially considering PUSCH repetition is used when radio quality is not good. Therefore, some measures to reduce multiplexing occasions can be taken.

In embodiments of the present disclosure, CSI repetition, PUSCH repetition can be configured as allowed or not for multiplexing CSI on PUSCH, by one or more of rules can be used. For example, a bitmap of slot/repetition may be used. Value 1 of a bit in the bitmap may indicate multiplexing CSI on PUSCH is allowed in the slot/repetition. Optionally, RV, PUSCH repetitions with particular RV can be multiplexed with CSI.

In embodiments of the present disclosure, when multiplexing is not allowed in some slot or some CSI/PUSCH repetition, several options can be supported. 1) DCI/RRC configures either CSI repetition or PUSCH repetition is omitted in such case. 2) Symbols of CSI nominal repetition in the slot are regarded as invalid symbols, around which PUSCH nominal repetition is segmented. Then segmented PUSCH and CSI repetition are sent.

According to length of CSI repetition Type A/B and PUSCH in a slot, the overlapping between CSI and UL-SCH with dynamic grant can be classified into following cases: a case of one CSI nominal repetition overlapping with one PUSCH in a slot, a case of one CSI nominal repetition overlapping with multiple PUSCH in a slot, a case of multiple CSI nominal repetitions overlapping with one PUSCH in a slot, a case of multiple CSI nominal repetitions overlapping with multiple PUSCH in a slot, a case of segmented CSI actual repetition overlapping with PUSCH.

In embodiments of the present disclosure, if timeline check passes, whether segmented PUSCH actual repetition is allowed to be multiplexed with CSI can be determined by one or more of following conditions, such as RRC/DCI configuration, length of PUSCH actual repetition (if it is smaller than a threshold, the PUSCH actual repetition is skipped for CSI multiplexing). Further, if size of segmented PUSCH actual repetition is large enough for CSI part 1 or the single CSI part, then CSI part 1 or the single CSI part can be multiplexed.

Therefore, according to this embodiment, if certain criterion is met, segmented PUSCH actual repetition is also regard as a PUSCH in addition to PUSCH nominal repetition.

Embodiments about One CSI nominal repetition overlapping with one PUSCH in a slot may be described.

In embodiments of the present disclosure, if it is the first CSI repetition that overlaps with UL-SCH in a slot, a UE computation timeline check is needed and PUSCH coding rate check is needed. The timeline check may indicate whether the CSI reporting which is multiplexed on PUSCH meets CSI computation delay requirement. The coding rate check may indicate the whether the code rate of UL-SCH on the resources excluding those used by CSI is less than the maximum coding rate of LDPC code 948/1024.

If both timeline check and PUSCH coding rate check pass, CSI report is multiplexed on overlapping PUSCH.

If timeline check fails but PUSCH coding rate check passes, several options can be supported. 1) Either the first CSI repetition or UL-SCH PUSCH is omitted as configured by DCI/RRC or predefined. 2) PUSCH is segmented around CSI nominal repetition. CSI is multiplexed on the PUSCH part which has the same starting OFDM symbols, given that PUSCH code rate passed. If PUSCH coding rate fails, refer to the following case.

If timeline check passes but PUSCH code rate check fails, several options can be supported. 1) Either the first CSI repetition or UL-SCH PUSCH is omitted as configured by DCI/RRC or predefined. 2) If CSI has two parts, UE drops CSI part 2. If PUSCH code rate is satisfied with CSI part 1, CSI part 1 is multiplexed on PUSCH. Otherwise CSI part 1 is dropped too. If CSI has a single part, it is dropped.

If both timeline check and PUSCH code rate fail, 1) Either the first CSI repetition or UL-SCH PUSCH is omitted as configured by DCI/RRC or predefined.

Below table gives examples of the results of timeline check and coding rate check.

| When 1st CSI repetition overlaps with one PUSCH in a slot | | |
|---|---|---|
| Timeline check for 1st CSI repetition | PUSCH coding rate check | Result |
| passed | passed | CSI multiplexed on PUSCH |
| failed | passed | CSI or UL-SCH is dropped. 2) PUSCH is segmented around CSI and CSI is multiplexed on later part of PUSCH if code rate check passes. |
| passed | failed | CSI or UL-SCH is dropped. 2) CSI part 2 is dropped. CSI part 1 is sent if code rate check passes. |
| failed | failed | CSI or UL-SCH is dropped. |

Figure 4I:
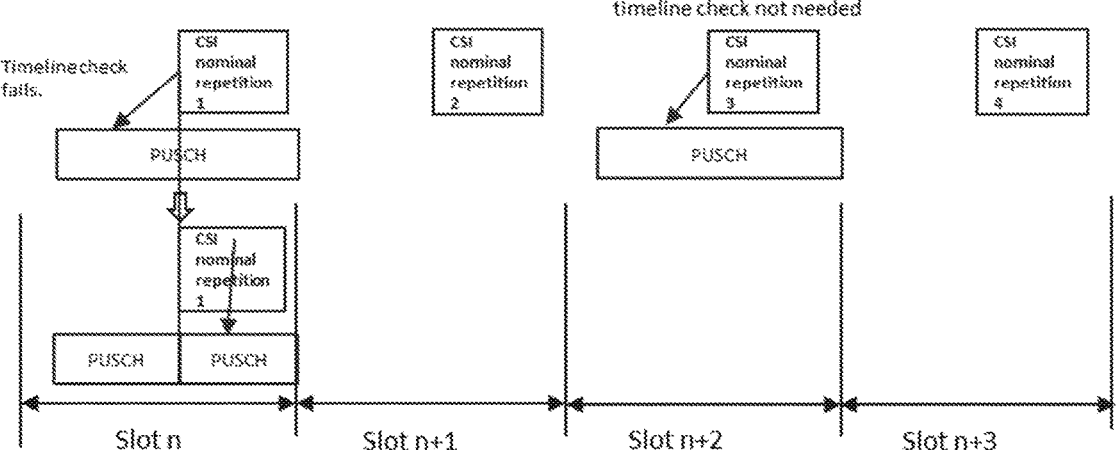
FIG. 4I shows an example for multiplexing CSI repetition Type A with UL-SCH without repetition.

FIG. 4I shows an example for multiplexing CSI repetition Type A with UL-SCH without repetition.

For example, in FIG. 4I, CSI and PUSCH overlap in slot n and n+2. CSI report in slot n is the first CSI repetition. Since timeline check fails in slot n, PUSCH in slot n is segmented into two parts around CSI repetition. Both are transmitted and CSI repetition is multiplexed on 2nd part.

In embodiments of the present disclosure, if CSI repetition other than the first CSI repetition overlaps with UL-SCH, CSI is multiplexed on overlapping PUSCH without timeline check. Methods in embodiments with timeline check passed can be applied directly.

Figure 4J:
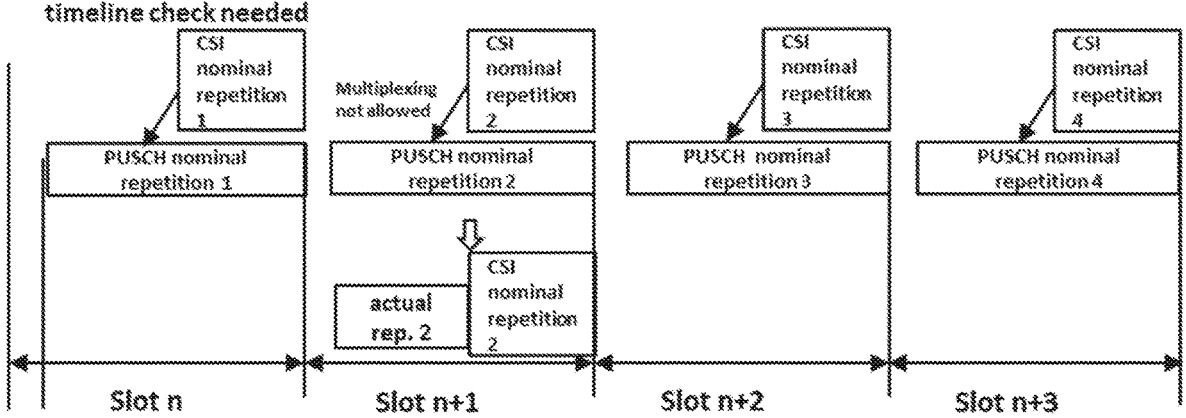
FIG. 4J shows an example for multiplexing CSI repetition Type A with UL-SCH repetition Type A.

FIG. 4J shows an example for multiplexing CSI repetition Type A with UL-SCH repetition Type A.

FIG. 4J illustrates CSI repetitions overlap with PUSCH repetition Type A. A bitmap of slot 1011 is configured. So, in slot n, n+2 and n+3, CSI repetition is multiplexed on PUSCH repetition. In Slot n+1, PUSCH repetition 2 is segmented around CSI repetition 2. UE sends PUSCH Actual repetition 2 and CSI nominal repetition 2 in slot n+1.

Embodiments about one CSI nominal repetition overlapping with multiple PUSCH in a slot may be described.

One CSI repetition overlaps with multiple PUSCH in a slot may include two cases: a case of multiple TDMed PUSCH in a slot, a case of Multiple PUSCH actual repetitions in a slot.

In embodiments of the present disclosure, if one CSI repetition overlaps with multiple PUSCH in a slot, priority of PUSCH as multiplexing candidates can be configured by one or more of below options. CSI is multiplexed on PUSCH from high to low priority.

Option 1 (earliest PUSCH first): UE performs timeline check and PUSCH coding rate check from the first PUSCH to the last PUSCH in the slot, until one PUSCH meets both requirements or all PUSCH don't meet the requirements.

Option 2 (richest PUSCH first): UE performs timeline check and PUSCH coding rate check from the PUSCH with the most available RE resources, to the PUSCH with least available RE resources in the slot, until one PUSCH meets both requirements or all PUSCH don't meet the requirements. Available RE means RE in a slot excluding DMRS and overhead RE reserved by higher layer.

Option 3 the index of PUSCH on which CSI can be multiplexing is configured by RRC/DCI, e.g. odd ones.

Option 4: PUSCH with particular RV can be multiplexed with CSI.

Figure 4K:
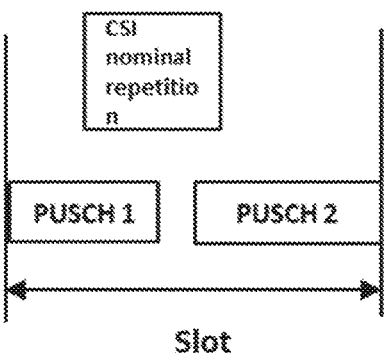
FIG. 4K shows an example for CSI repetition overlapping with more than one UL-SCH repetition.

FIG. 4K shows an example for CSI repetition overlapping with more than one UL-SCH repetition.

For example, as illustrated in FIG. 4K, according to option1 CSI is multiplexed on PUSCH1. According to option 2, CSI is multiplexed on PUSCH 2.

Figure 4L:
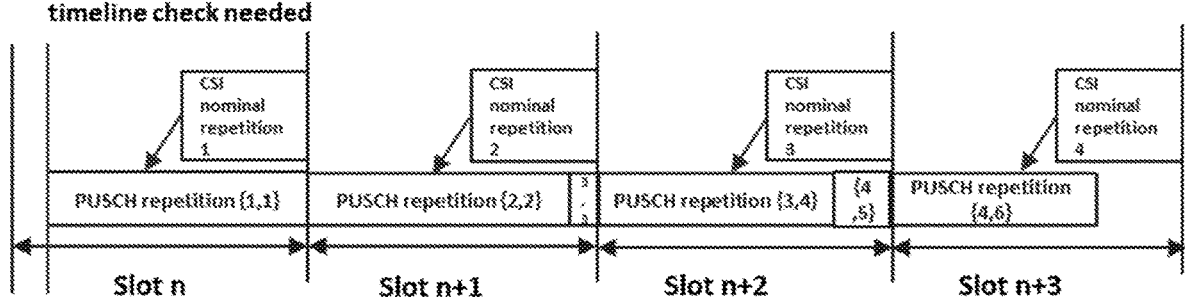
FIG. 4L shows an example for CSI repetition overlapping with UL-SCH repetition Type B.

FIG. 4L shows an example for CSI repetition overlapping with UL-SCH repetition Type B.

For another example, in FIG. 4L, x in PUSCH repetition {x,y} indicates the index of PUSCH nominal repetition and y the index of PUSCH actual repetition. For example, PUSCH repetition {3,4} means a part of PUSCH nominal repetition 3, but a PUSCH actual transmission 4. That is PUSCH nominal repetition (such as #3, #4) is segmented at slot border. According to the option 1 of earliest PUSCH, CSI repetition is multiplexed on PUSCH actual repetition 2 in slot n+1 and PUSCH actual repetition 4 in slot n+2.

Embodiments about multiple CSI nominal repetitions overlapping with one PUSCH in a slot may be described.

In embodiments of the present disclosure, if multiple CSI nominal repetitions overlap with one PUSCH in a slot, a maximum number of CSI repetitions K1 that are allowed to be multiplexed on one PUSCH in a slot is configured by RRC/DCI or predetermined. If PUSCH overlaps with N CSI nominal repetitions in a slot, min(N, K1) times of CSI part 1 are appended together and mapped on PUSCH. Same procedure is applied to CSI part 2. If PUSCH code rate requirement is not met, UE either drops UL-SCH or omits portion of CSI part 2 according to priority order according to DCI/RRC configuration. If CSI consists of a single part, it is treated the same as CSI part 1.

| CSI part 1 | . . . | CSI part 1 | CSI part 2 | . . . | CSI part 2 |
|---|---|---|---|---|---|

Figure 4M:
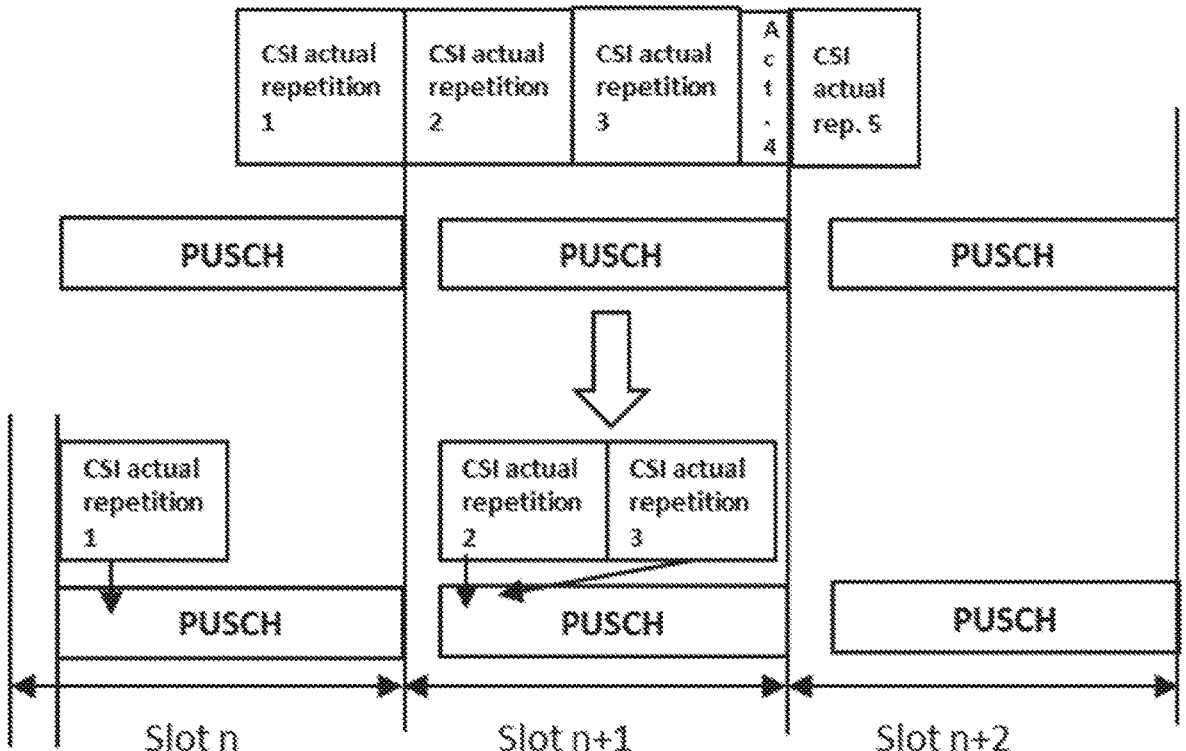
FIG. 4M shows an example for multiplexing CSI repetition type B with UL-SCH.

FIG. 4M shows an example for multiplexing CSI repetition type B with UL-SCH.

For example, in FIG. 4M, there are two CSI nominal repetitions in Slot n+1. When K1=2, gNB allows two CSI reports multiplexed on one PUSCH in a slot. In slot n+1, UE maps two CSI part 1 on continuous resources and then two CSI part 2 on overlapping PUSCH.

Embodiments about multiple CSI nominal repetitions overlapping with multiple PUSCH in a slot may be described.

In embodiments of the present disclosure, if multiple A-CSI actual repetitions overlap with multiple PUSCH in a slot, a maximum number of CSI repetitions K2 that are allowed to be multiplexed on all PUSCH in a slot can be configured by DCURRC or predetermined. With N CSI nominal repetitions in a slot, min(K1, N) CSI reports are multiplexed on the PUSCH with highest priority. If code rate requirement of the PUSCH is not met, UE either drops UL-SCH or omits portion of CSI part 2 according to priority order according to DCURRC configuration. Repeat the step for PUSCH with second highest priority in the slot until min(K2, N) repetitions are multiplexed or there is no more PUSCH left. If CSI consists of a single part, it is treated the same as CSI part 1.

This method reuses the parameter a maximum number of CSI repetitions K1 that are allowed to be multiplexed on one PUSCH in a slot, priority of PUSCH as multiplexing candidates and the method of concatenating multiple CSI part 1 or part 2 mentioned.

Figure 4N:
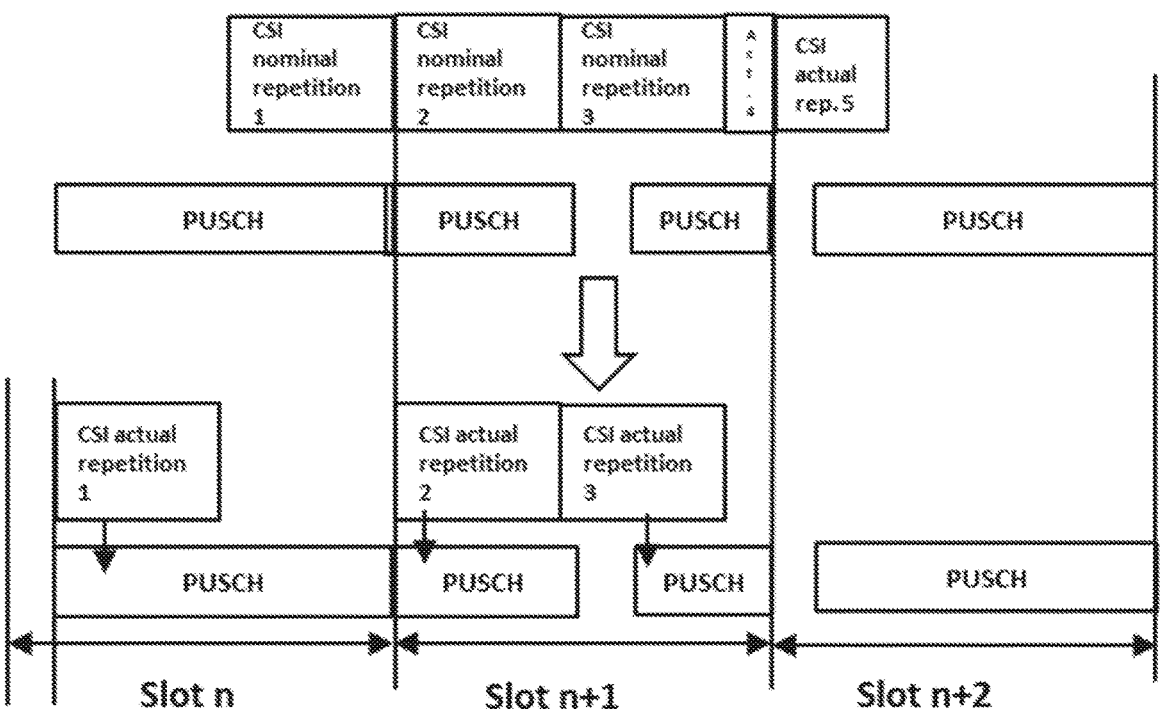
FIG. 4N shows another example for multiplexing CSI repetition type B with UL-SCH.

FIG. 4N shows another example for multiplexing CSI repetition type B with UL-SCH.

For example, in slot n+1 in FIG. 4N, there are two CSI nominal repetitions and two non-contiguous PUSCH. When K1=1, K2=2: gNB allows at most 1 CSI repetition to be multiplexed on one PUSCH and at most 2 CSI repetitions multiplexed on all PUSCH in a slot. In slot n+1, CSI nominal repetition 2 and 3 are multiplexed on two PUSCH respectively.

Figure 4O:
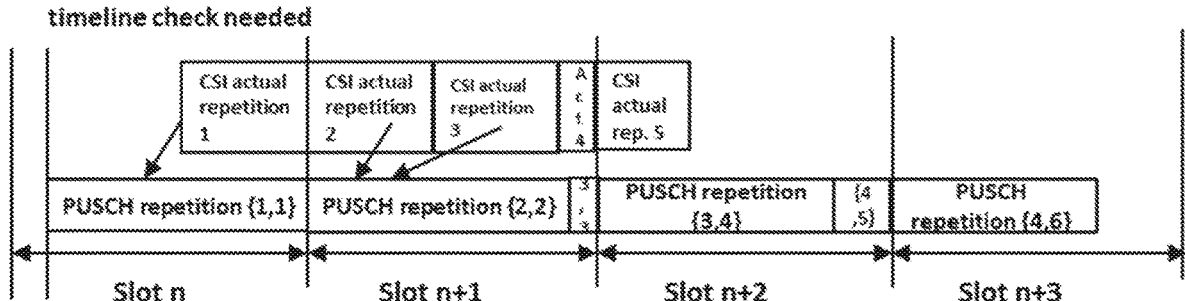
FIG. 4O shows another example for multiplexing CSI repetition type B with UL-SCH repetition type B.

FIG. 4O shows another example for multiplexing CSI repetition type B with UL-SCH repetition type B.

For another example, in FIG. 4O, x in PUSCH repetition {x,y} indicates the index of PUSCH nominal repetition and y the index of PUSCH actual repetition. PUSCH nominal repetition is segmented at slot border. When K1=2: gNB configures that two CSI repetitions can be multiplexed in one actual PUSCH repetition, in slot n+1, CSI repetition 2, 3 are multiplexed on PUSCH actual repetition 2.

Embodiments about segmented CSI actual repetition overlapping with PUSCH in a slot may be described.

If there is one nominal CSI repetition and one or more segmented CSI actual repetitions, methods in one CSI nominal repetition overlapping with one PUSCH in a slot and one CSI nominal repetition overlapping with multiple PUSCH in a slot can be applied.

If there is multiple nominal CSI repetitions and one or more segmented CSI actual repetitions, methods in one CSI nominal repetition overlapping with one PUSCH in a slot and one CSI nominal repetition overlapping with multiple PUSCH in a slot can be applied.

In embodiments of the present disclosure, if there are only segmented CSI repetitions overlapping with PUSCH in a slot, one or more methods can be used. For example, segmented CSI repetitions are dropped in the slot. If the segmented CSI repetitions has complete CSI part 1, CSI part 1 is multiplexed on PUSCH. All or portion of CSI part 2 can be omitted. As illustrated in figures about multiple CSI nominal repetitions overlapping with one PUSCH in a slot and multiple CSI nominal repetitions overlapping with multiple PUSCH in a slot, actual CSI repetition in Slot n+2 may be not mapped on PUSCH.

Further, embodiments about CSI overlapping with PUSCH with configured grant may be described.

Figure 4P:
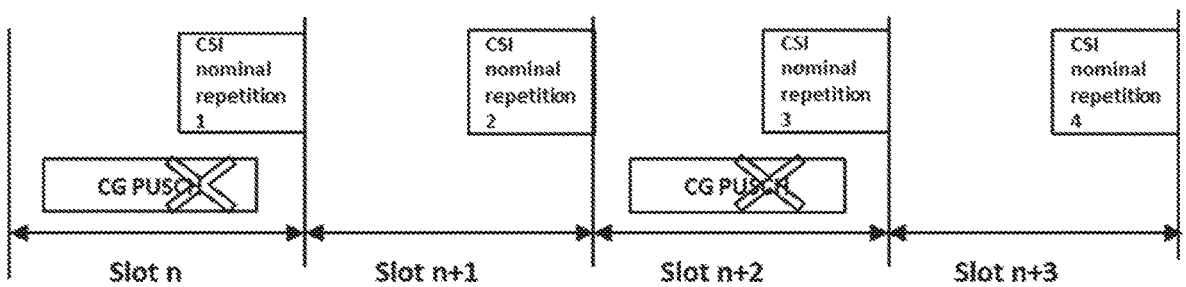
FIG. 4P shows an example for CSI repetition type A overlapping with PUSCH with configured grant.

FIG. 4P shows an example for CSI repetition type A overlapping with PUSCH with configured grant.

In embodiments of the present disclosure, when CSI repetition overlaps with configured grant PUSCH, or configured grant PUSCH repetition Type AB in a slot, the one with lower PHY priority is dropped. If CSI and CG-PUSCH have the same PHY priority or PHY priority is not indicated, configured grant PUSCH in the slot is dropped and UE sends CSI repetition in PUSCH with dynamic grant in the slot.

Further, embodiments about CSI repetition overlapping with SR/HARQ-ACK on PUCCH may be described.

In embodiments of the present disclosure, if CSI repetition on PUSCH and SR/HARQ-ACK overlap in a slot, or if CSI repetitions on PUSCH overlap with PUCCH repetitions in continuous slots, if CSI and SR/HARQ-ACK have the same priority index or PHY priority indexes are not indicated, one or more methods can be used. For example, CSI or SR/HARQ-ACK in the slot is dropped as RRC/DCI configured or predetermined according to priority order of content, e.g. SR/HARQ-ACK>CSI. For example, all or only WB CSI can be multiplexed on PUCCH, e.g. if the PUCCH format supports CSI. For example, HARQ-ACK can be multiplexed on PUSCH.

Figure 5A:
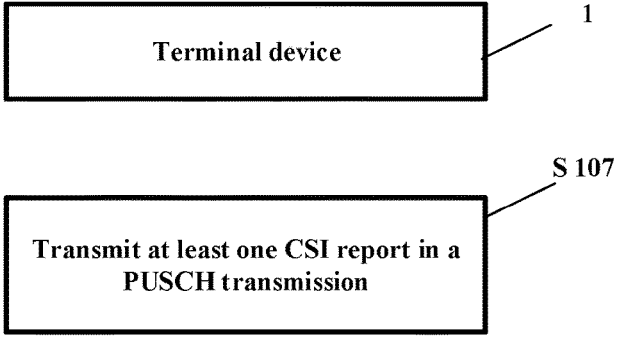
FIG. 5A is an exemplary flow chart for a method performed at a terminal device for transmitting a CSI report in a PUSCH, according to embodiments of the present disclosure.
Figure 5B:
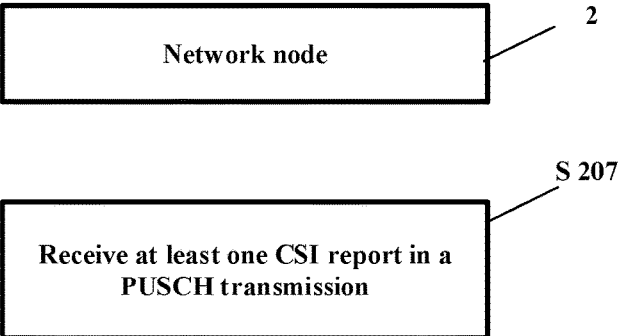
FIG. 5B is an exemplary flow chart for a method performed at a network node for transmitting a CSI report in a PUSCH, according to embodiments of the present disclosure.

FIG. 5A is an exemplary flow chart for a method performed at a terminal device for transmitting a CSI report in a PUSCH, according to embodiments of the present disclosure; FIG. 5B is an exemplary flow chart for a method performed at a network node for transmitting a CSI report in a PUSCH, according to embodiments of the present disclosure.

As shown in FIG. 5A, the method performed at a terminal device comprises: transmitting (S107) at least one CSI report in a PUSCH transmission.

As shown in FIG. 5B, the method performed at a network node comprises: receiving (S207) at least one CSI report in a PUSCH transmission.

In embodiments of the present disclosure, the at least one CSI report is encoded together with an UL-SCH data in a medium access control protocol data unit, MAC PDU.

In embodiments of the present disclosure, the at least one CSI report repeats in a plurality of portions of the PUSCH transmission, or distributed in the plurality of portions of the PUSCH transmission.

In embodiments of the present disclosure, the plurality of portions of the PUSCH transmission comprise: a plurality of segments, or a plurality of code block groups, CBG.

In embodiments of the present disclosure, the at least one CSI report comprises a nominal repetition, and/or an actual repetition.

For example, a plurality of further detailed embodiments may be further listed below, for transmission of CSI and UL-SCH data on one PUSCH.

In embodiments of the present disclosure, the CSI is multiplexed with UL-SCH data, and CSI is repeated to occupy more REs within one PUSCH transmission.

In embodiments of the present disclosure, CSI is encoded together with UL-SCH Data in the same MAC PDU on PUSCH.

In embodiments of the present disclosure, CSI is repeated for a number of times and is part of the TB.

In embodiments of the present disclosure, in case of PUSCH repetition Type B, when segmentation is needed, CSI can be in $1^{st}$ segment or can be repeated in one or more of the segments of one TB, or can be treated the same as UL-SCH and segmented.

In embodiments of the present disclosure, in case of CBG based PUSCH transmission, A-CSI can be in one or more of the CBGs. One or more of the following methods can be applied. For example, only one CSI is transmitted in one CBG, which CBG can be either predetermined or be signalled by L1 signalling or RRC signalling. For example, one CSI is distributed in a set of CBGs. For example, the CSI can be repeated in different CBGs. For example, repetition of CSI on different CBGs means as long as one CBG is correctly decoded, the CSI is decoded.

In embodiments of the present disclosure, the CSI configuration and report can be in a MAC CE or a MAC subheader or MAC PDU.

Figures 6A, 6B:
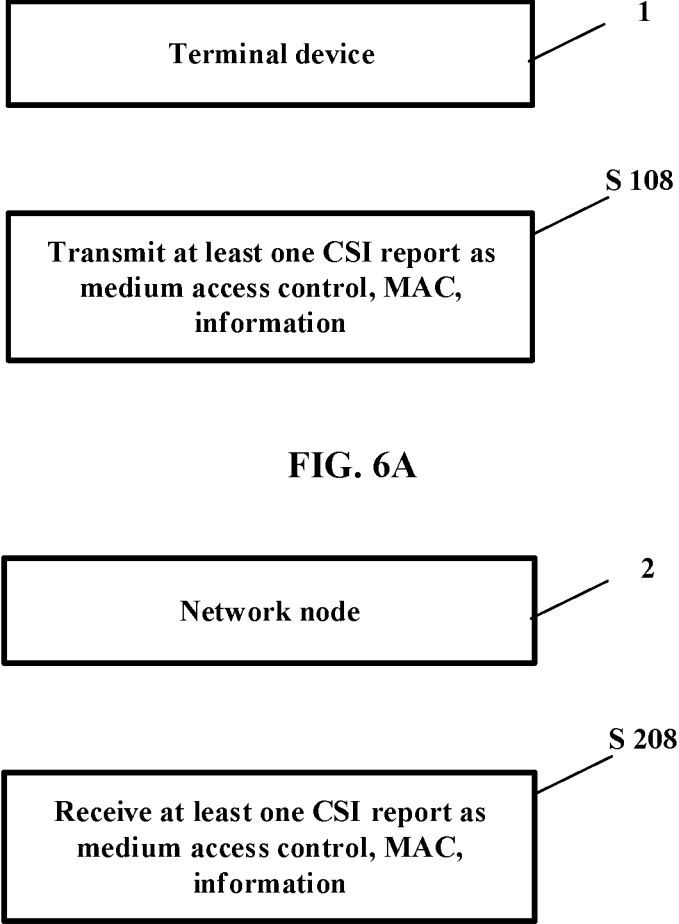
FIG. 6A is an exemplary flow chart for a method performed at a terminal device for transmitting a CSI report as MAC information, according to embodiments of the present disclosure.
FIG. 6B is an exemplary flow chart for a method performed at a network node for transmitting a CSI report as MAC information, according to embodiments of the present disclosure.

FIG. 6A is an exemplary flow chart for a method performed at a terminal device for transmitting a CSI report as MAC information, according to embodiments of the present disclosure; FIG. 6B is an exemplary flow chart for a method performed at a network node for transmitting a CSI report as MAC information, according to embodiments of the present disclosure.

As shown in FIG. 6A, the method performed at a terminal device comprises: transmitting (S108) at least one CSI report as medium access control, MAC, information.

As shown in FIG. 6B, the method performed at a network node comprises: receiving (S208) at least one CSI report as medium access control, MAC, information.

In embodiments of the present disclosure, the method further comprises: receiving a reporting configuration for the at least one CSI report about at least one of: a reference signal, a rank, a channel quality, a precoding matrix, a reference signal received power, a reference signal received quality, a timing advance, a power headroom, or a time for reporting; wherein the reporting configuration is included in a MAC control element, CE, or DCI, or RRC signalling.

In embodiments of the present disclosure, the MAC CE is a semi-persistent, SP, CSI reporting on PUCCH Activation/Deactivation MAC CE, extended with the reporting configuration and an extension indication about an existence of the reporting configuration.

In embodiments of the present disclosure, a priority of the at least one CSI report is higher than user plane data; and/or the priority of the at least one CSI report is determined based on a measurement result.

For example, a plurality of further detailed embodiments may be further listed below, for MAC based configuration and reporting.

In embodiments of the present disclosure, the CSI report can be in a MAC CE or a MAC subheader or MAC PDU, which is transmitted in PUSCH independently or with U-plane data.

This is particularly important when network, NW, asks UE to provide many measurement results from UE, which may not fit in one slot for transmission/reporting and may require multiple slots. Hence a MAC based approach is better since it is faster than higher layer reporting such as RRC or Packet Data Convergence Protocol, PDCP. For SP CSI, a very fast L1 based reporting may not be desired where there is gap between different transmission, Tx, or reception, Rx; hence a MAC based approach is suitable where many measurement results can be aggregated and sent.

The NW may also use a DL MAC CE to specify which measurements UE should send and the UE responds accordingly. Generally, RRC configures which measurements the UE should perform and report for example what kind of quantity (e.g., synchronization signal block, SSB, RSRP, CQI, PMI, RI etc.) should be measured and reported. For faster configurations or for a faster change of the previously configured measurement configuration especially for SP configurations a MAC CE is suggested here. The MAC CE setups which measurements are desired.

Figure 6C:
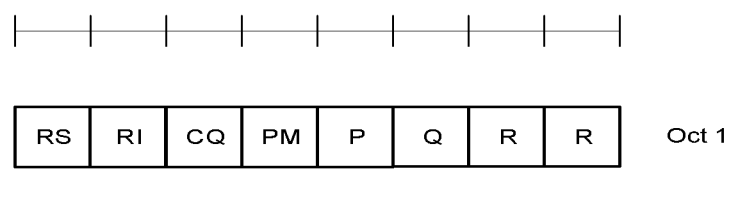
FIG. 6C shows an exemplary CSI report Configuration based on MAC CE.

FIG. 6C shows an exemplary CSI report Configuration based on MAC CE.

FIG. 6C is one example of CSI configuration in MAC CE which basically sets which reference signal and which quantity is desired.

RS is Reference Signal indication, if it is set to 0, SSB is used; if it is set to 1, CSI-RS is used. In this example it is shown with 1 bit. However, the RS can be also designed with multiple bits, for example 2-bits when NW wants both CSI-RS and SSB.

Then the following parameters (RI, CQ, PM, P (representing RSRP), Q (representing RSRQ)) are the measurements quantity that the UE need to perform. For RI, the NW may also specify the maximum number of RI for the UE to report.

Figure 6D:
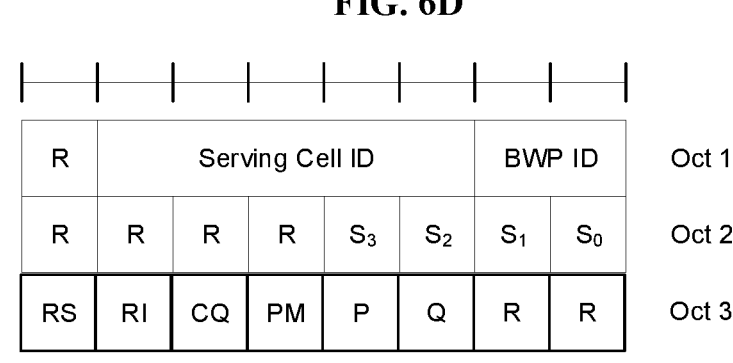
FIG. 6D shows a SP CSI reporting on PUCCH Activation/Deactivation MAC CE.
Figure 6E:
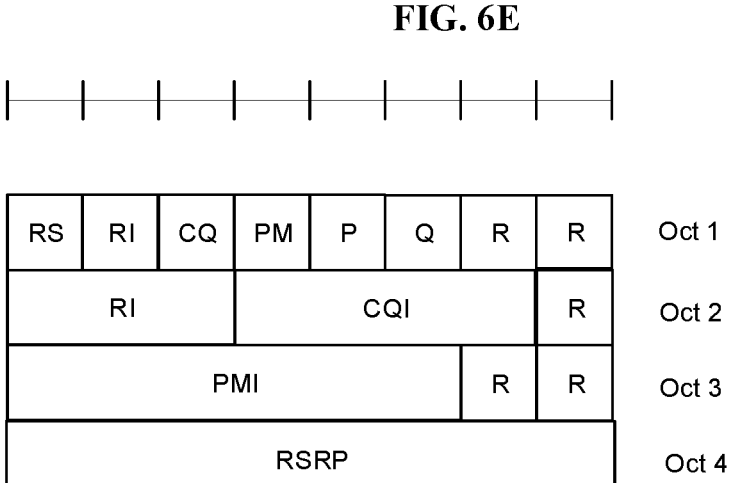
FIG. 6E shows an exemplary SP CSI reporting on PUCCH Activation/Deactivation MAC CE Extended with Oct 3, according to embodiments of the present disclosure.

FIG. 6D shows a SP CSI reporting on PUCCH Activation/Deactivation MAC CE; FIG. 6E shows an exemplary SP CSI reporting on PUCCH Activation/Deactivation MAC CE Extended with Oct 3, according to embodiments of the present disclosure.

It is also possible to append the existing MAC CE for SP CSI reporting on PUCCH Activation/Deactivation MAC CE (TS 38.321 version 16.1.0) with the above octet as shown in Figure SP CSI reporting on PUCCH Activation/Deactivation MAC CE Extended with Oct 3. In such case one of the R bits (Reserved bit) can be repurposed for extension indication, so UE would know that there is presence of Oct 3.

Figure 6F:
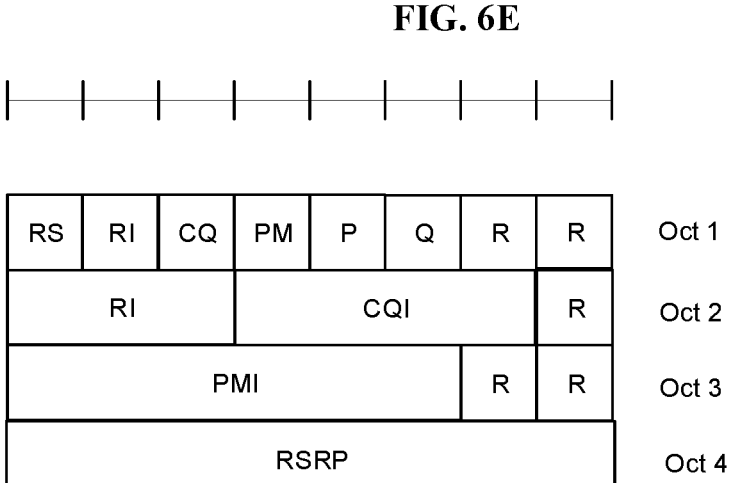
FIG. 6F shows an examplary Measurement Report from UE in MAC CE, according to embodiments of the present disclosure.

FIG. 6F shows an examplary Measurement Report from UE in MAC CE, according to embodiments of the present disclosure.

The NW may also configure to use MAC based reporting independent of the MAC based configuration; i.e. the MAC based measurement reporting can be enabled either also via DCI or RRC. The NW may decide to use MAC based reporting for certain type of services such as Voice where there is enough gap between different Tx/Rx. Thus, there is no immediate requirement for L1 based fast measurement report but rather measurements with longer durations and large quantities (RSRP/RSRQ/PHR/RI/PMI) is desired.

The UE may report which reference signal it used for measurement and which all measurements are available in the bits used in Oct1. For example, if RI bit it set to 1, it implies measurement related to Rank Indicator are available. If it is set to 0, it implies the bits in Oct2 for RI is to be considered missing or ignore.

It is also possible to configure and append other measurements such as RSRQ, Timing advance, PHR etc. Further when UE is configured with SP configurations, NW may specify when the UE shall perform the measurement. For example, the UE should perform the measurement immediately after the last transmission/reception; or just before the next transmission/reception or in some time slot in between. This may also be specified by the NW in the DL MAC CE.

Reserved logic channel IDs, LCIDs or extended LCIDs, eLCIDs have to be used for this purpose (MAC based configuration and reporting).

In embodiments of the present disclosure, CSI report in MAC layer can be repeated continuously. The NW in DL MAC CE or in RRC or via DCI may specify the number of repetitions needed and provide the UL grant accordingly. The NW will decide the number of repetitions based upon the UL Signal to Interference plus Noise Ratio (SINR) computed, PHR, measured reception power, rxPower, and IpN(interference plus noise can be used to estimate the UL SINR); further SRS based measurements may also be performed by the NW to ascertain the quality and needed number of repetitions in UL.

In embodiments of the present disclosure, CSI Report in MAC layer or CSI reporting via PUSCH is considered to have higher priority than the user plane data. The priority can be also influenced based upon some measurement threshold such as CQI/RSRP threshold. If below certain threshold UE may be considered in poor coverage and hence it is essential for the NW to understand the different measurement statistics in order to take efficient decision on how to schedule the DL data and on how to provide UL grant. If such threshold conditions are met UE first prioritizes sending the CSI report. In such cases (threshold met, poor coverage threshold met), NW may even prioritize which CSI report the UE should basically send. This can be preconfigured via RRC or provided dynamically via MAC CE or DCI.

Figures 7A, 7B:
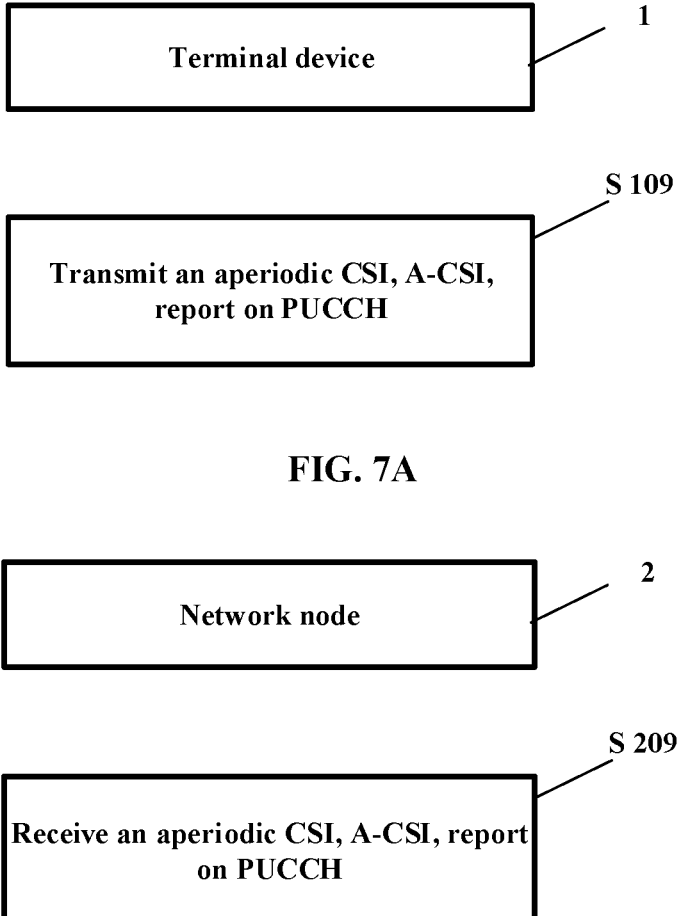
FIG. 7A is an exemplary flow chart for a method performed at a terminal device for transmitting an aperiodic CSI, A-CSI, report on PUCCH, according to embodiments of the present disclosure.
FIG. 7B is an exemplary flow chart for a method performed at a network node for transmitting a CSI report an aperiodic CSI, A-CSI, report on PUCCH, according to embodiments of the present disclosure.

FIG. 7A is an exemplary flow chart for a method performed at a terminal device for transmitting an aperiodic CSI, A-CSI, report on PUCCH, according to embodiments of the present disclosure; FIG. 7B is an exemplary flow chart for a method performed at a network node for transmitting a CSI report an aperiodic CSI, A-CSI, report on PUCCH, according to embodiments of the present disclosure.

As shown in FIG. 7A, the method performed at a terminal device comprises: transmitting (S109) an aperiodic CSI, A-CSI, report on PUCCH.

As shown in FIG. 7B, the method performed at a network node, comprises: receiving (S209) an aperiodic CSI, A-CSI, report on PUCCH.

In embodiments of the present disclosure, the A-CSI report is transmitted with PUCCH format 2, or 3, or 4, based on report quantities of the at least one CSI report.

In embodiments of the present disclosure, if transmission resources of the A-CSI report overlap with transmission resources for another CSI report, the A-CSI report is dropped, or kept, or delayed, based on a priority order, and/or a content of the A-CSI report.

In embodiments of the present disclosure, the A-CSI report on PUCCH has a priority lower than a A-CSI report on PUSCH, and higher than a semi persistent CSI, SP CSI, on PUCCH, and a periodic CSI, P CSI, on PUCCH.

In embodiments of the present disclosure, a SP CSI on PUSCH has a priority lower than a A-CSI report on PUSCH, and higher than a SP CSI on PUCCH, and a P CSI on PUCCH; the A-CSI report on PUCCH has a priority higher than the SP CSI on PUSCH; or the A-CSI report on PUCCH has a priority lower than the SP CSI on PUSCH.

In embodiments of the present disclosure, if transmission resources of the A-CSI report overlap with a resource for a PUSCH transmission for UL-SCH data, the A-CSI report is dropped, or kept, or multiplexed with the PUSCH transmission, based on a priority order, and/or a content of the A-CSI report.

In embodiments of the present disclosure, the A-CSI report comprises at least one repetition.

In embodiments of the present disclosure, wherein the A-CSI report is transmitted in every PUCCH repetition, if the PUCCH repetition is configured.

In embodiments of the present disclosure, the A-CSI report with repetition has a same or different priority with an A-CSI report without repetition.

In embodiments of the present disclosure, if transmission resources of a repetition of the A-CSI report overlap with a resource for a PUSCH transmission for UL-SCH data, the repetition of the A-CSI report is dropped, or kept, or multiplexed with the PUSCH transmission, based on a priority order, and/or a content of the A-CSI report.

In embodiments of the present disclosure, a first bitmap is configured with each bit indicating whether a corresponding repetition of the A-CSI report is allowed to be dropped; and a second bitmap is configured with each bit indicating whether a corresponding repetition of the PUSCH transmission is allowed to be dropped, if the PUSCH transmission has at least one repetition.

For example, a plurality of further detailed embodiments may be further listed below, for A-CSI on PUCCH with and without repetition.

NR Rel-15 supports P/SP CSI on PUCCH format 2, 3, 4. A-CSI can only be carried on PUSCH. Meanwhile NR Rel-15 also supports PUCCH repetition for format 1, 3, 4.

In the methods provided in the present disclosure, A-CSI report can be carried on PUCCH and be repeated on PUCCH.

In embodiments of the present disclosure, to configure and trigger A-CSI report on PUCCH, one or more of the following can be signaled in either layer one DCI and/or higher layer signaling, e.g. RRC or MAC CE: the PUCCH resource configuration for A-CSI transmission, CSI request, whether A-CSI is on PUSCH or PUCCH.

In embodiments of the present disclosure, grant providing UL resources in DCI to indicate A-CSI is on PUCCH or PUSCH can be done in one or multiple ways. As Alt 1, a new DCI field to indicate it alone. E.g. Flag of CSI on PUCCH is used, and a value 1 indicates CSI is on PUCCH. As Alt 2, it is jointly encoded with CSI request field. As Alt 3, a new DCI field is used to indicate A-CSI report on PUCCH. With the new field, no additional signalling is needed to indicate if CSI is on PUCCH or PUSCH.

In embodiments of the present disclosure, A-CSI can be transmitted on PUCCH with PUCCH format 2, 3, or 4.

In embodiments of the present disclosure, different CSI report quantities and frequency granularity can be supported on PUCCH. For example, a mapping of report quantities on PUCCH formats is shown in below table, wherein "x" means supported.

| A-CSI report | PUCCH format 2 | PUCCH format 3 | PUCCH format 4 |
|---|---|---|---|
| Type I WB CSI | x | x | x |
| Type I SB CSI | | x | x |
| Type II WB CSI | | x | x |
| Type II SB CSI | | | |
| Type II Part 1 only | | x | x |

In embodiments of the present disclosure, if A/SP/P CSI reports collide on PUCCH in a slot exceeding the higher layer parameter maxCodeRate, one of multiple methods can be applied until the CSI report code rate is less or equal to the one configured by maxCodeRate.

As Alt 1, R15 rule is reused that the UE may omit a portion of CSI reports beginning with the lowest priority. Priority of A-CSI on PUCCH is added in existing priority order. Or as option 1, A-CSI on PUSCH>A-CSI on PUCCH>SP CSI on PUSCH>SP CSI on PUCCH>P CSI on PUCCH. Or as option 2: A-CSI on PUSCH>SP-CSI on PUSCH>A-CSI on PUCCH>SP CSI on PUCCH>P CSI on PUCCH.

If there is no overlapping between PUCCH and PUSCH and CSI reports are only carried on PUCCH, the above two options are the same. If PUCCH overlaps with PUSCH, CSI reports configured on PUCCH will be multiplexed on PUSCH. If gNB prioritizes A-CSI over SP and P CSI, Alt 1 is more suitable. If gNB prioritizes CSI on PUSCH over CSI on PUCCH, Alt2 is better.

As Alt 2, it is to drop A-CSI.

As Alt 3, it is to keep A-CSI only and drop other CSI reports.

As Alt 4, it is to delay A-CSI to next PUCCH transmission occasion.

Time requirement for the delay of transmission is configured. If delay exceeds time requirement, just drop the A-CSI on this PUCCH transmission occasion.

As Alt 5, omission rule depends on the CSI report content. For example, if CSI Type 2 is prioritized, A/SP/P-CSI is prioritized if it carries Type 2 CSI report.

In embodiments of the present disclosure, if A-CSI on PUCCH overlaps with UL-SCH dynamic and/or configured grant in a slot, and if PHY priority is indicated, the lower priority one is dropped. If they have the same PHY priority or PHY priority is not indicated, one or more of below methods applies.

For example, it may be configured by RRC/DCI or predetermined according to priority order. For example, A-CSI on PUCCH or PUSCH is dropped. For example, A-CSI is multiplexed on dynamically granted PUSCH, if it meets timeline check. Otherwise one is dropped. For example, A-CSI is multiplexed on configured granted PUSCH, if UE has no UL-SCH data in this slot and it meets timeline check. Otherwise one is dropped. For example, up to UE implementation, gNB will try to receive A-CSI and PUSCH scheduled.

In NR up to Rel-16, periodical CSI and semi-persistent CSI can be carried on PUCCH format 2, which doesn't support repetition. Methods in the present disclosure may address such problem and also supports A-CSI repetition on PUCCH format 2, 3, 4.

In embodiments of the present disclosure, if A-CSI is scheduled on PUCCH format 2, 3 or 4 and repetition is configured, or if P/SP-CSI is configured on PUCCH format 2 and repetition is configured, CSI report is sent in every PUCCH repetition. If there is other type of UCI, R15 principle of no multiplexing different UCI types and UCI priority rule HARQ-ACK>SR>CSI with higher priority>CSI with lower priority are reused.

In embodiments of the present disclosure, A-CSI on PUCCH with repetition can have the same priority as A-CSI on PUCCH, as stated in above embodiment "if A/SP/P CSI reports collide on PUCCH in a slot exceeding the higher layer parameter maxCodeRate, one of multiple methods can be applied until the CSI report code rate is less or equal to the one configured by maxCodeRate". Or A-CSI repetition on PUCCH can have higher priority than without repetition, like below.

There may be Alt 1: A-CSI on PUSCH>A-CSI on PUCCH with repetition>=A-CSI on PUCCH>SP CSI on PUSCH>SP CSI on PUCCH>P CSI on PUCCH, or Alt 2: A-CSI on PUSCH>SP-CSI on PUSCH>A-CSI on PUCCH with repetition>=A-CSI on PUCCH>SP CSI on PUCCH>P CSI on PUCCH.

In embodiments of the present disclosure, if A-CSI repetition on PUCCH overlaps with UL-SCH with or without repetition in a slot, one or more of below methods applies.

For example, methods as stated in above embodiments "if A-CSI on PUCCH overlaps with UL-SCH dynamic and/or configured grant in a slot, and if PHY priority is indicated, the lower priority one is dropped. If they have the same PHY priority or PHY priority is not indicated, one or more of below methods applies configured by RRC/DCI or predetermined according to priority order."

Some rule/bitmap specifies which A-CSI/PUSCH repetition can be dropped in the case of collision. E.g. gNB configures that PUCCH repetition with odd index can be omitted if colliding with PUSCH.

Figures 8A, 8B, 8C:
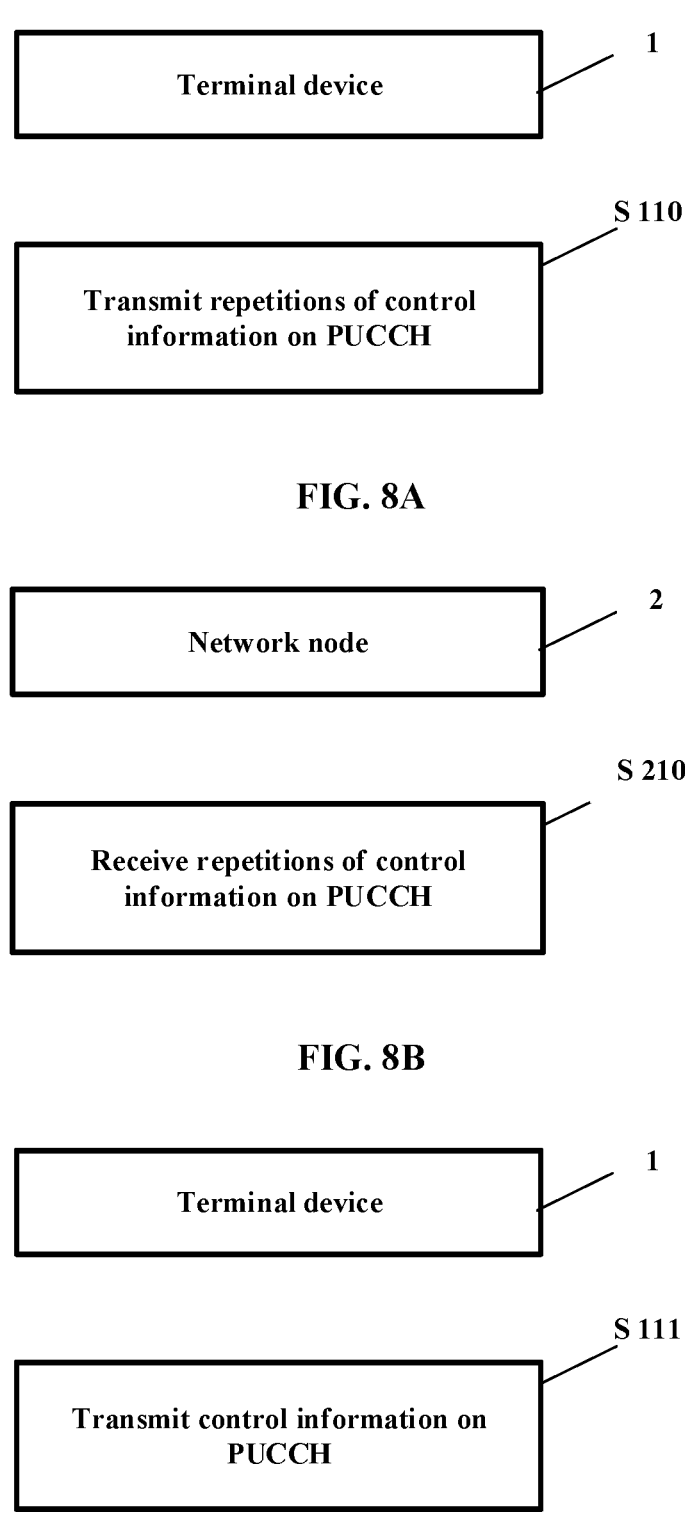
FIG. 8A is an exemplary flow chart for a method performed at a terminal device for transmitting repetitions of control information on PUCCH, according to embodiments of the present disclosure.
FIG. 8B is an exemplary flow chart for a method performed at a network node for transmitting repetitions of control information on PUCCH, according to embodiments of the present disclosure.
FIG. 8C is an exemplary flow chart for a method performed at a terminal device for transmitting control information on PUCCH, according to embodiments of the present disclosure.

FIG. 8A is an exemplary flow chart for a method performed at a terminal device for transmitting repetitions of control information on PUCCH, according to embodiments of the present disclosure; FIG. 8B is an exemplary flow chart for a method performed at a network node for transmitting repetitions of control information on PUCCH, according to embodiments of the present disclosure.

As shown in FIG. 8A, the method performed at a terminal device comprises: transmitting (S110) repetitions of control information on PUCCH; wherein the repetitions are configured via RRC signalling and activated by DCI.

As shown in FIG. 8B, the method performed at a network node comprises: receiving (S210) repetitions of control information on PUCCH; wherein the repetitions are configured via RRC signalling and activated by DCI.

In embodiments of the present disclosure, a configuration for the repetitions includes at least one of: an inter-repetition frequency hopping, an inter-slot frequency hopping, a number of repetitions, a frequency and time domain pattern, a gap in frequency domain and/or time domain between repetitions, or a transmitter chain.

In embodiments of the present disclosure, the repetitions are with PUCCH format 0, or PUCCH format 2.

In embodiments of the present disclosure, the control information comprises any of: a SR, acknowledge information of HARQ, P CSI, SP CSI, or A-CSI.

Figure 8D:
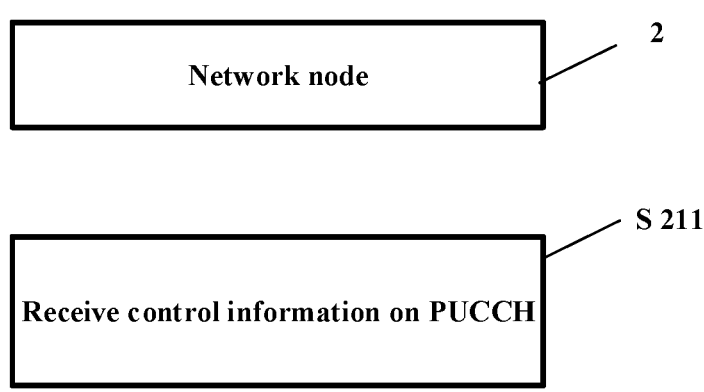
FIG. 8D is an exemplary flow chart for a method performed at a network node for transmitting control information on PUCCH, according to embodiments of the present disclosure.

FIG. 8C is an exemplary flow chart for a method performed at a terminal device for transmitting control information on PUCCH, according to embodiments of the present disclosure; FIG. 8D is an exemplary flow chart for a method performed at a network node for transmitting control information on PUCCH, according to embodiments of the present disclosure.

As shown in FIG. 8C, the method performed at a terminal device comprises: transmitting (S111) control information on PUCCH; wherein transmission resources for the control information on the PUCCH are configured with larger than 16 physical resource blocks, PRB, or more than one slot; and/or wherein a plurality sets of PUCCH resources of the same format are concatenated for the control information; and/or wherein the control information is transmitted with a PUCCH format other than PUCCH format 0 to format 4.

As shown in FIG. 8D, the method performed at a network node comprises: receiving (S211) control information on PUCCH.

For example, a plurality of further detailed embodiments may be further listed below for PUCCH repetition enhancement.

For example, UCI on PUCCH repetition can be SR, HARQ-ACK, A/P/SP-CSI.

In embodiments of the present disclosure, PUCCH format 0, 2 repetition can be configured by RRC and repetition can be activated by DCI. UE can use RRC configured resources for corresponding PUCCH formats in one resource set. Inter-repetition and inter-slot frequency hopping can be supported for PUCCH format 0, 2 repetition. Number of repetitions for PUCCH format 0, 2 can be 7, besides 2, 4, 8.

Figure 8E:
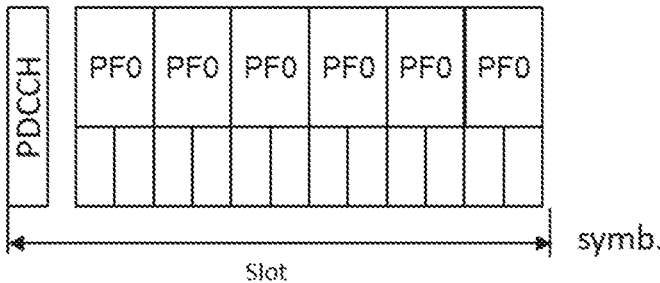
FIG. 8E show an example for a pattern of PUCCH transmission.

FIG. 8E show an example for a pattern of PUCCH transmission.

For example, UE is provided by higher layers with 6 PUCCH resources for PUCCH format 0 in a slot, each with 2 OFDM symbols and 1 PRB, as illustrated in below figure. If UE is configured with PUCCH repetition for format 0 with the first PUCCH transmission in earliest PF0 resource in a slot, UE uses following configured PF0 resources for remaining repetitions.

In embodiments of the present disclosure, for all PUCCH formats, a frequency and time domain pattern can be RRC/DCI configured or predefined. If multiple repetitions use the same OFDM symbols, one repetition uses a number of contiguous PRB according to its UCI payload after another repetition in the configured PUCCH resources for a particular format in the resource set according to a time and frequency domain pattern.

Figure 8F:
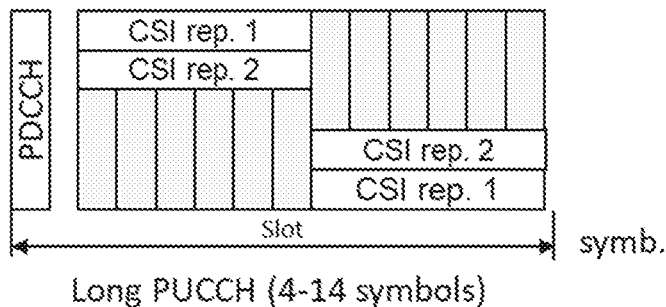
FIG. 8F show another example for a pattern of PUCCH transmission.

FIG. 8F show another example for a pattern of PUCCH transmission.

For example, eight repetitions are scheduled in 4 slots with two repetitions FDMed in a slot. As illustrated in below figure, with intra-slot hopping enabled, two repetitions overlap in the same symbols in a slot and occupy contiguous frequency domain resources.

Motivation of frequency and time domain repetition pattern is to reduce UCI latency so that UCI, e.g. CSI report, is not obsolete in fast changing environment. When PUCCH uses small number of PRB, energy per resource element (EPRE) is not badly degraded.

In embodiments of the present disclosure, a gap in frequency domain and/or time domain between 2 repetitions can be configured by DCI or RRC or predetermined.

In embodiments of the present disclosure, each frequency domain repetition can be transmitted with a different Tx chain. Repetitions should be separated in frequency domain so that channel estimation doesn't average between repetitions.

A benefit is that Precoding resource block group, PRG, doesn't need to be defined in UL.

In embodiments of the present disclosure, one or more of below methods can be supported. For example, for a new or an existing PUCCH format, PUCCH resource can be configured with larger than 16 PRB, or more than one slot. For example, multiple PUCCH resources of the same format can be concatenated for one UCI.

In NR up to Rel-16, Type II SB CSI can't be supported on PUCCH. One of the reasons is the large CSI payload size. This problem can be solved by PUCCH format with larger frequency or time domain resources. Ordinary UCI payload size can also benefit from larger resources due to lower code rate. In addition, more frequency domain resources can take advantage of frequency domain diversity, while more time domain resources are beneficial from UE transmission power perspective.

The methods provided in this disclosure may enhance the performance of CSI transmission.

For example, one proposed solution allows dynamic retransmission of CSI report so that gNB can do soft combining to improve successful decoding rate. gNB can specify whole or part of CSI to be retransmitted to reduce payload.

Another proposed solution allows UE to report if channel condition changes or if a newly measured CSI report is the same as previous one or part of it remains the same. If the indicator is sent with CSI report, it allows BS to do soft combining. If the indicator is sent alone, it reduces CSI payload when part of CSI has no change.

Other proposed solutions allow CSI repetition on PUSCH and PUCCH to improve robustness.

Figure 9A:
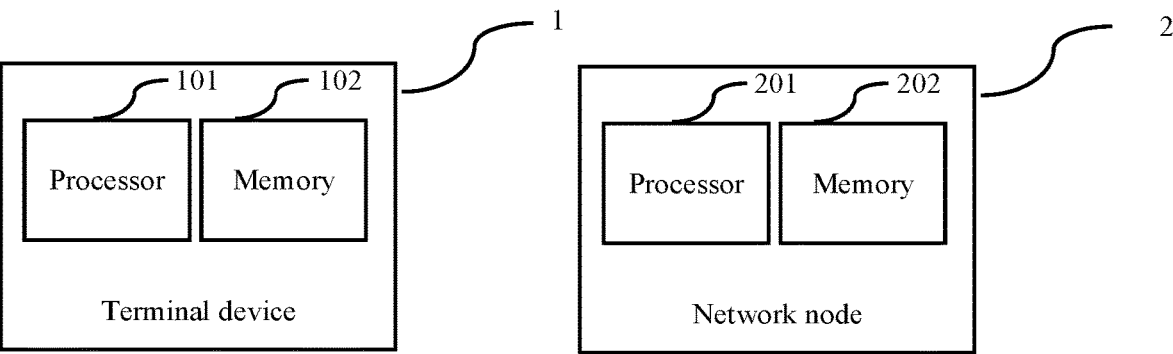
FIG. 9A is a block diagram showing exemplary apparatuses suitable for practicing the network node and the terminal device according to embodiments of the disclosure.

FIG. 9A is a block diagram showing exemplary apparatuses suitable for practicing the network node and the terminal device according to embodiments of the disclosure.

As shown in FIG. 9A, the terminal device 1 may comprise: a processor 101; and a memory 102. The memory 102 contains instructions executable by the processor 101, whereby the network node is operative to perform the method according to any of the above embodiments, such as these shown in FIG. 2A-8F.

As shown in FIG. 9A, the network node 2 may comprise: a processor 201; and a memory 202. The memory 202 contains instructions executable by the processor 201, whereby the terminal device is operative to perform the method according to any embodiment of the above embodiments, such as these shown in FIG. FIG. 2A-8F.

The processors 101, 201 may be any kind of processing component, such as one or more microprocessor or microcontrollers, as well as other digital hardware, which may include digital signal processors (DSPs), special-purpose digital logic, and the like. The memories 102, 202 may be any kind of storage component, such as read-only memory (ROM), random-access memory, cache memory, flash memory devices, optical storage devices, etc.

Figure 9B:
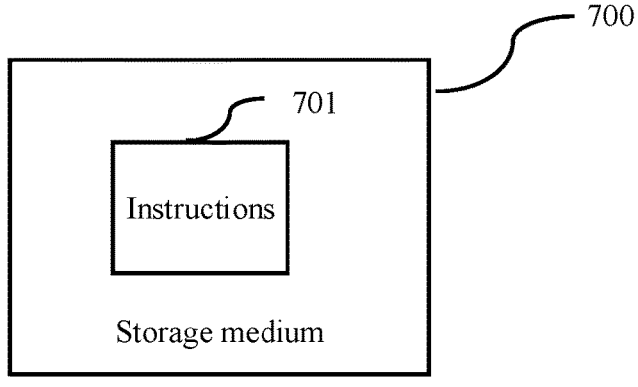
FIG. 9B is a block diagram showing an apparatus readable storage medium, according to embodiments of the present disclosure.

FIG. 9B is a block diagram showing an apparatus readable storage medium, according to embodiments of the present disclosure.

As shown in FIG. 9B, the computer-readable storage medium 700, or any other kind of product, storing instructions 701 which when executed by at least one processor, cause the at least one processor to perform the method according to any one of the above embodiments, such as these shown in FIG. 2A-8F.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 9C:
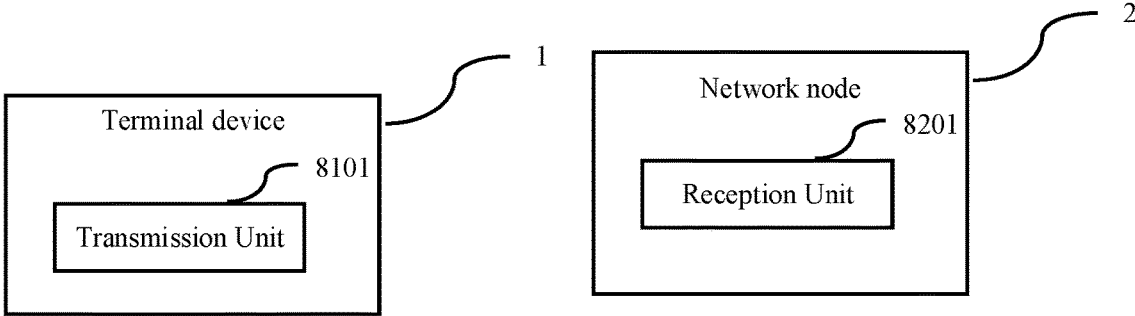
FIG. 9C is a schematic showing units for the network node and the terminal device, according to embodiments of the present disclosure.

FIG. 9C is a schematic showing units for the network node and the terminal device, according to embodiments of the present disclosure.

As shown in FIG. 9C, the terminal device 1 may comprise: a transmission unit 8101.

In embodiments of the present disclosure, the terminal device is operative to perform the method according to any of the above embodiments, such as those shown in FIG. 2A-8F.

As shown in FIG. 9C, the network node 2 may comprise: a reception unit 8201.

In embodiments of the present disclosure, the network node 2 is operative to perform the method according to any of the above embodiments, such as these shown in FIG. 2A-8F.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 1 and the terminal device 2, may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Figure 10:
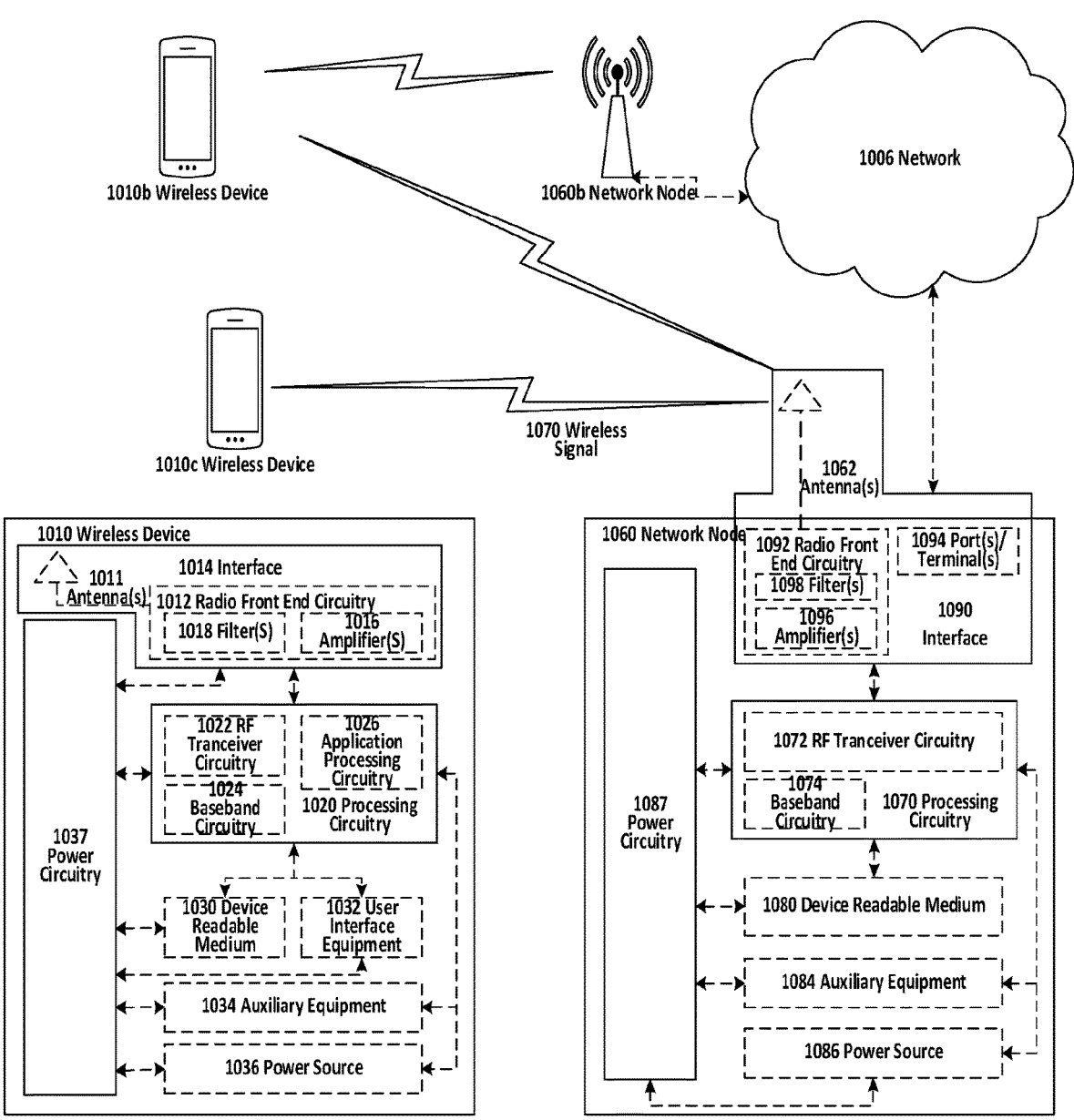
FIG. 10 is a schematic showing a wireless network in accordance with some embodiments.

FIG. 10 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 (corresponding to network node 2) and 1060b, and WDs 1010, 1010b, and 1010c (corresponding to terminal device 1). In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
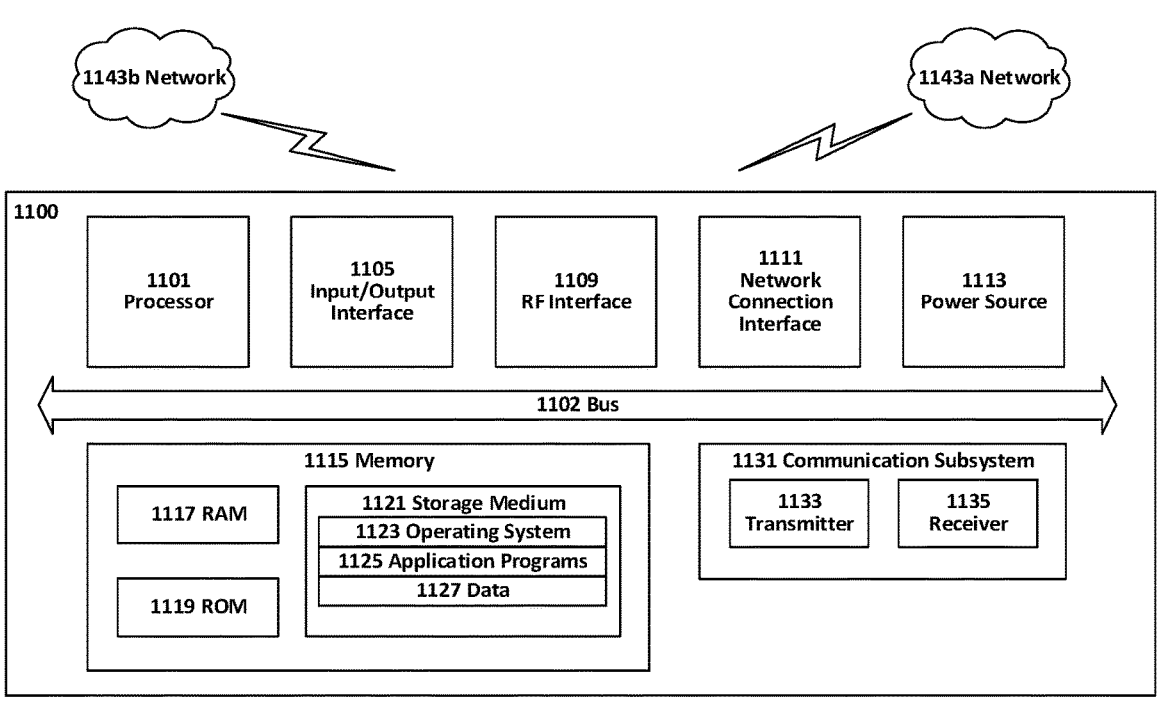
FIG. 11 is a schematic showing a user equipment in accordance with some embodiments.

FIG. 11 is a schematic showing a user equipment in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143a. Network 1143a may encompass wired and/or wireless networks such as a local-area network (LAN), a wide-area network (WAN), a computer network, a wireless network, a telecommunications network, another like network or any combination thereof. For example, network 1143a may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143*b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
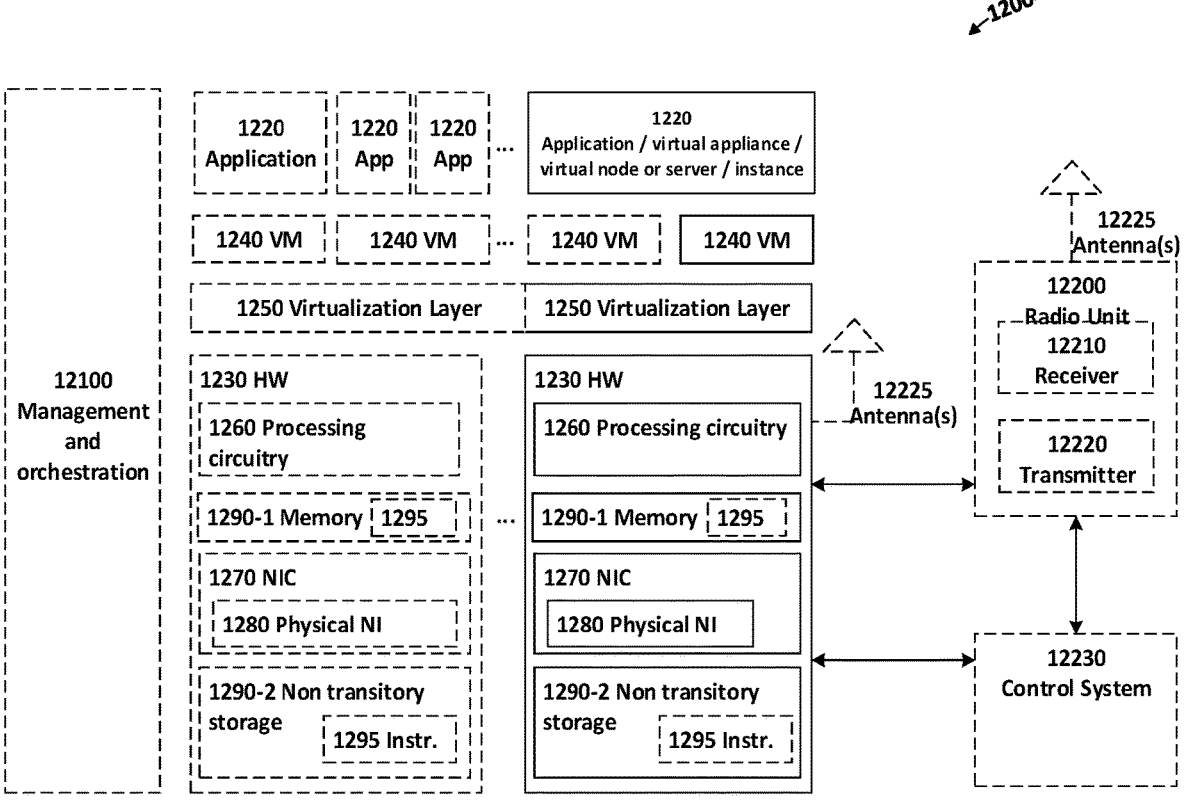
FIG. 12 is a schematic showing a virtualization environment in accordance with some embodiments.

FIG. 12 is a schematic showing a virtualization environment in accordance with some embodiments.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 13:
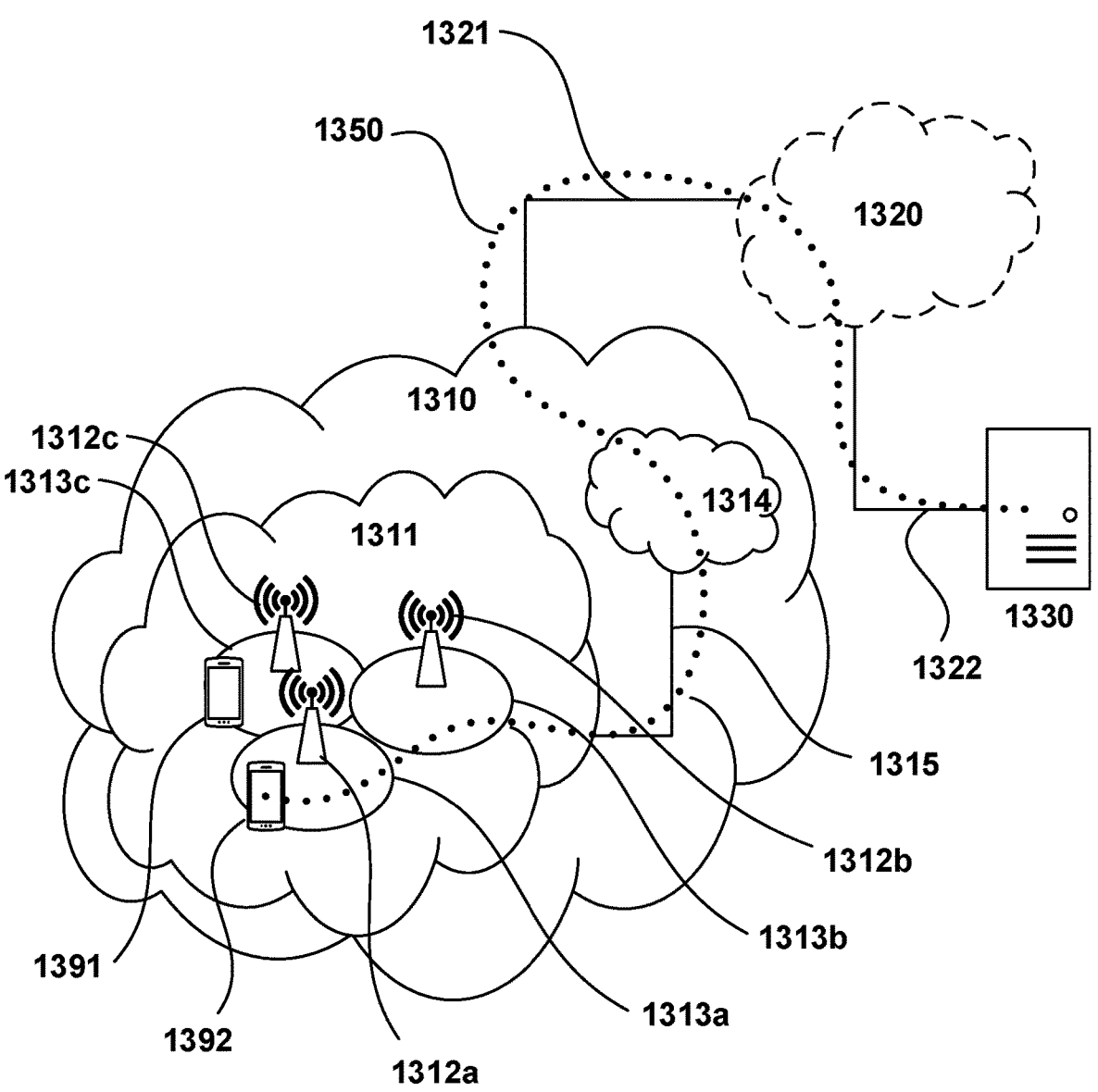
FIG. 13 is a schematic showing a telecommunication network connected via an intermediate network to a host computer in accordance with some embodiments.

FIG. 13 is a schematic showing a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312*a*, 1312*b*, 1312*c*, such as NBs, eNBs, gNBs or other types of wireless access points, each defining a corresponding coverage area 1313*a*, 1313*b*, 1313*c*. Each base station 1312*a*, 1312*b*, 1312*c* is connectable to core network 1314 over a wired or wireless connection 1315. A first UE 1391 located in coverage area 1313*c* is configured to wirelessly connect to, or be paged by, the corresponding base station 1312*c*. A second UE 1392 in coverage area 1313*a* is wirelessly connectable to the corresponding base station 1312*a*. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
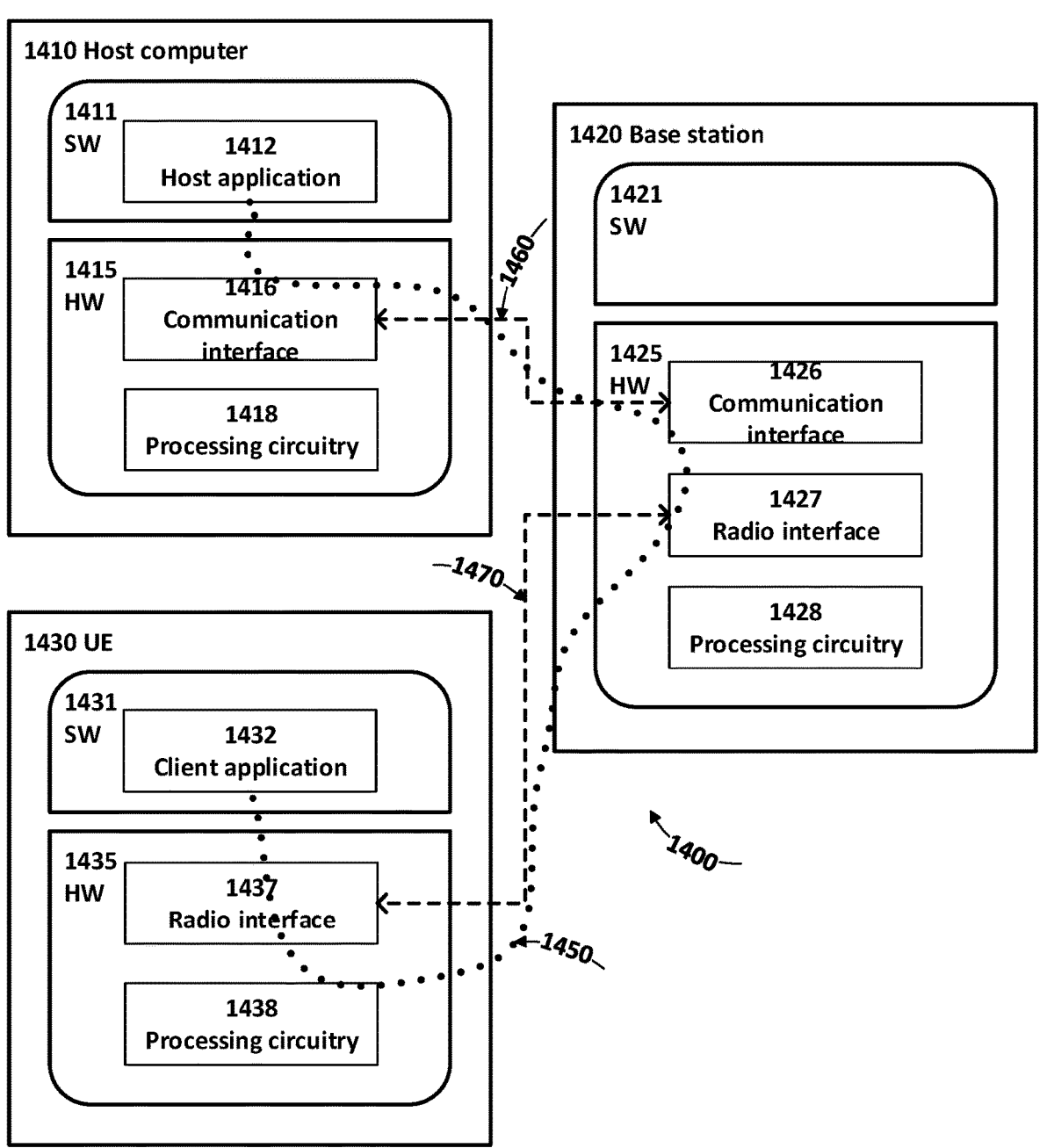
FIG. 14 is a schematic showing a host computer communicating via a base station with a user equipment over a partially wireless connection in accordance with some embodiments.

FIG. 14 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
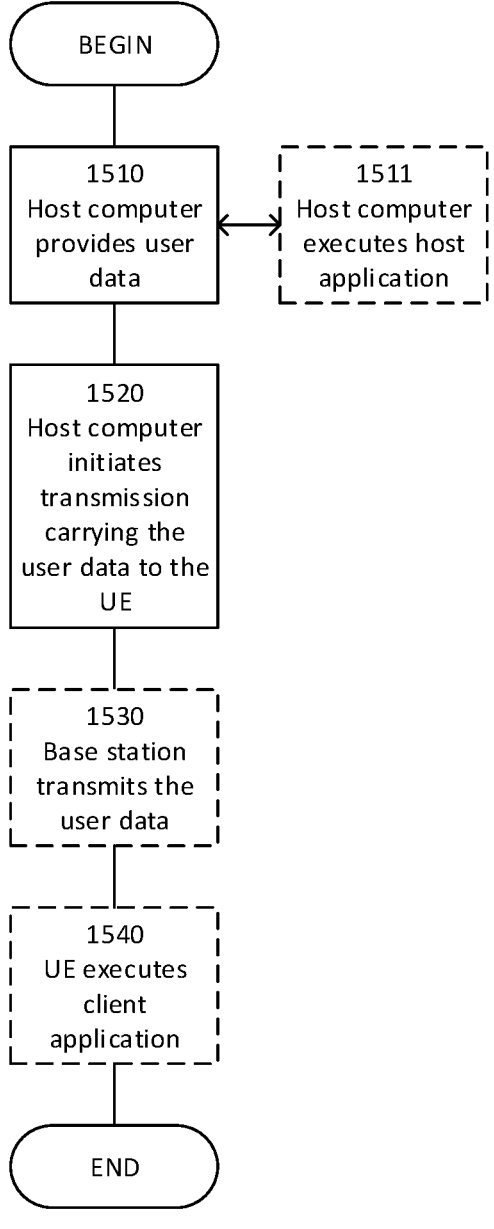
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
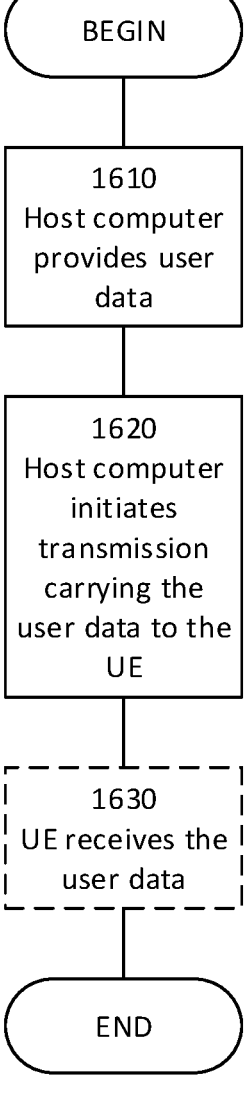
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
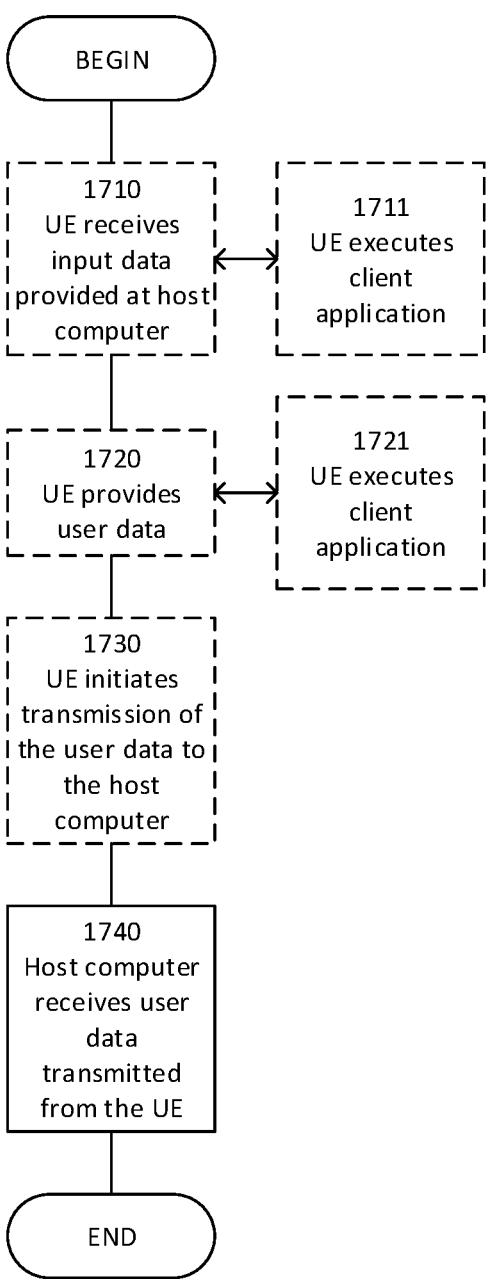
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
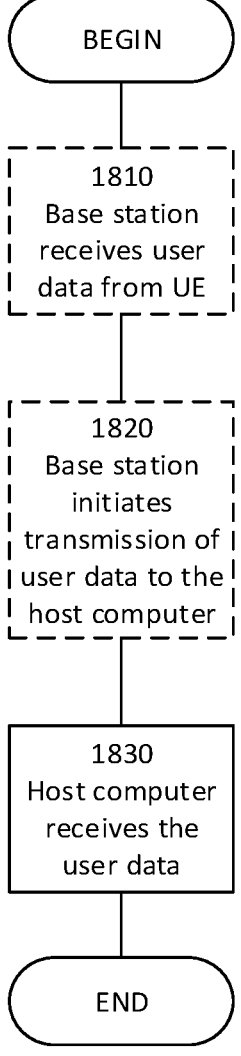
FIG. 18 is a schematic showing methods implemented in a communication system including a host computer, a base station and a user equipment in accordance with some embodiments.

FIG. 18 is a schematic showing methods implemented in a communication system including a host computer, a base station and a user equipment in accordance with some embodiments.

The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

| Abbreviation | Explanation |
|---|---|
| CSI | channel state information |
| NDI | new data indicator |
| TDD | time duplex mode |
| BS | Base station |
| CRC | Cyclic Redundancy Check |
| CRM | Contention Resolution Message |
| DCI | Downlink Control Information |
| DL | Downlink |
| DM-RS | Demodulation Reference Signal |
| eMTC | Enhanced Machine Type Communication |
| FH | Frequency Hopping |
| FR1 | Frequency Range 1 |
| FR2 | Frequency Range 2 |
| HARQ | Hybrid Automated Retransmission Request |
| MAC | Medium Access Control |
| NB-IoT | Narrow-Band Internet of Things |
| NR-U | NR unlicensed |
| PDCCH | Physical Downlink Control Channel |
| PUSCH | Physical Uplink Shared Data Channel |
| PRACH | Physical Random Access Channel |
| PRB | Physical Resource Block, i.e. 12 consecutive subcarriers |
| RACH | Random Access Channel |
| RA | Random Access |
| RAR | Random Access Response |
| RO | PRACH occasion |
| RSRP | Reference Signal Received Power |
| TB | Transport Block |
| RNTI | Radio Network Temporary Indentifier |
| TxD | Transmit Diversity |
| UE | User Equipment |
| UL | Uplink |
| gNB | (Base station) |

The invention claimed is:

1. A method performed at a terminal device, comprising:
transmitting a first channel state information (CSI) report; and
transmitting a second CSI report,
wherein the second CSI report is a repetition of the first CSI report,
wherein the first CSI report and the second CSI report are transmitted on physical uplink shared channel (PUSCH), and without uplink shared channel (UL-SCH) data, wherein the first CSI report and the second CSI report are arranged to occupy continuous symbol positions.

2. The method according to claim 1, wherein the first CSI report and the second CSI report are arranged to be transmitted in a first slot and a second slot respectively.

3. The method according to claim 1,
wherein if transmission resources of the at least one CSI report of the first CSI report and the second CSI report cross over a slot border, or overlap with at least one symbol position invalid for CSI report, the at least one CSI report is omitted; or
wherein if transmission resources of the at least one CSI report of the first CSI report and the second CSI report cross over a slot border, or overlap with at least one symbol position invalid for CSI report, the at least one symbol position of the transmission resources is omitted, and excluded from resources for the at least one CSI report.

4. The method according to claim 1, further comprising:
receiving a configuration about at least one of:
a number of repetitions of a CSI report;
allocated transmission resources for at least one repetition of a CSI report;
a frequency hopping manner of repetitions of a CSI report;
a precoder cycling manner of repetitions of a CSI report;

redundant versions (RV) of repetitions of a CSI report;
physical priority indexes of repetitions of a CSI report; or
a manner for processing a collision with invalid symbol positions.

5. The method according to claim 1,
wherein transmission resources of at least one CSI report of the first CSI report and the second CSI report overlap with a resource for one or more PUSCH transmissions for UL-SCH data, in a slot.

6. The method according to claim 1,
wherein transmission resources of at least one CSI report of the first CSI report and the second CSI report overlap with a resource for a physical uplink control channel (PUCCH) transmission.

7. The method according to claim 6,
wherein the at least one CSI report or the PUCCH transmission is dropped according to a priority order.

8. The method according to claim 6,
wherein at least a portion of the at least one CSI report is multiplexed with the PUCCH transmission; or
wherein the PUCCH transmission is multiplexed on the PUSCH, if the at least one CSI report is arranged on the PUSCH.

9. The method according to claim 6,
wherein the PUCCH transmission is for a scheduling request, or acknowledge information of hybrid automatic retransmission request (HARQ).

10. A method performed at a network node, comprising:
receiving a first channel state information (CSI) report; and
receiving a second CSI report,
wherein the second CSI report is a repetition of the first CSI report,
wherein the first CSI report and the second CSI report are transmitted on physical uplink shared channel (PUSCH), and without uplink shared channel (UL-SCH) data, wherein the first CSI report and the second CSI report are arranged to occupy continuous symbol positions.

11. The method according to claim 10,
wherein the first CSI report and the second CSI report are arranged to be transmitted in a first slot and a second slot respectively.

12. The method according to claim 10,
wherein if transmission resources of the at least one CSI report of the first CSI report and the second CSI report cross over a slot border, or overlap with at least one symbol position invalid for CSI report, the at least one CSI report is omitted; or
wherein if transmission resources of the at least one CSI report of the first CSI report and the second CSI report cross over a slot border, or overlap with at least one symbol position invalid for CSI report, the at least one symbol position of the transmission resources is omitted, and excluded from resources for the at least one CSI report.

13. The method according to claim 12,
wherein the at least one symbol position invalid for CSI report comprises at least one of: a downlink symbol, or an invalid symbol indicated by a downlink control information (DCI).

14. The method according to claim 10, further comprising:
transmitting a configuration about at least one of:
a number of repetitions of a CSI report;
allocated transmission resources for at least one repetition of a CSI report;

a frequency hopping manner of repetitions of a CSI report;

a precoder cycling manner of repetitions of a CSI report;

redundant versions (RV) of repetitions of a CSI report;

physical priority indexes of repetitions of a CSI report; or a manner for processing a collision with invalid symbol positions.

15. The method according to claim 10, wherein transmission resources of at least one CSI report of the first CSI report and the second CSI report overlap with a resource for one or more PUSCH transmissions for UL-SCH data, in a slot.

16. The method according to claim 10, wherein transmission resources of at least one CSI report of the first CSI report and the second CSI report overlap with a resource for a physical uplink control channel (PUCCH) transmission.

17. The method according to claim 16, further comprising at least one of:

wherein the at least one CSI report or the PUCCH transmission is dropped according to a priority order;

wherein at least a portion of the at least one CSI report is multiplexed with the PUCCH transmission;

wherein the PUCCH transmission is multiplexed on the PUSCH, if the at least one CSI report is arranged on the PUSCH; or wherein the PUCCH transmission is for a scheduling request, or acknowledge information of hybrid automatic retransmission request (HARQ).

18. A terminal device, comprising:

a processor; and a memory containing instructions executable by the processor to operate the terminal device to:

transmit a first channel state information (CSI) report; and transmit a second CSI report, wherein the second CSI report is a repetition of the first CSI report, and wherein the first CSI report and the second CSI report are transmitted on physical uplink shared channel (PUSCH), and without uplink shared channel (UL-SCH) data, wherein the first CSI report and the second CSI report are arranged to occupy continuous symbol positions.

* * * * *